United States Patent
Kwon et al.

(10) Patent No.: US 12,451,172 B2
(45) Date of Patent: Oct. 21, 2025

(54) MEMORY DEVICE SUPPORTING PARALLEL COMPRESSION READ OPERATION AND MEMORY SYSTEM INCLUDING THE SAME

(71) Applicant: SK hynix Inc., Gyeonggi-do (KR)

(72) Inventors: Chan Keun Kwon, Gyeonggi-do (KR); Hyeon Cheon Seol, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 177 days.

(21) Appl. No.: 18/458,152

(22) Filed: Aug. 30, 2023

(65) Prior Publication Data

US 2024/0347082 A1  Oct. 17, 2024

(30) Foreign Application Priority Data

Apr. 17, 2023  (KR) .................. 10-2023-0050058

(51) Int. Cl.
*G11C 8/00* (2006.01)
*G11C 7/10* (2006.01)
*G11C 7/22* (2006.01)

(52) U.S. Cl.
CPC ............ *G11C 7/1069* (2013.01); *G11C 7/222* (2013.01); *G11C 2207/2281* (2013.01)

(58) Field of Classification Search
CPC .................................................. G11C 7/222
See application file for complete search history.

(56) References Cited

U.S. PATENT DOCUMENTS

| 9,602,092 B2 | 3/2017 | Bhatia | |
|---|---|---|---|
| 2012/0230137 A1* | 9/2012 | Lee | G11C 29/28 365/219 |
| 2024/0062843 A1* | 2/2024 | Adachi | G11C 29/42 |

FOREIGN PATENT DOCUMENTS

KR  10-2275497 B1  7/2021

* cited by examiner

*Primary Examiner* — Hoai V Ho
(74) *Attorney, Agent, or Firm* — IP & T GROUP LLP

(57) ABSTRACT

A memory system comprising a first memory device configured to compress, into first compression data, data read from a first memory region included therein, and output the first compression data through first selection lines among first output lines in response to a first clock, a second memory device configured to compress, into second compression data, data read from a second memory region included therein, and output the second compression data through second selection lines among second output lines in response to a second clock; and a first parallel transmission unit configured to simultaneously connect the first and second selection lines to third output lines, select, as a selection clock, one having a lagging phase to the other between the first clock and the second clock, and transmit the first and second compression data in parallel through the third output lines in response to the selection clock.

20 Claims, 24 Drawing Sheets

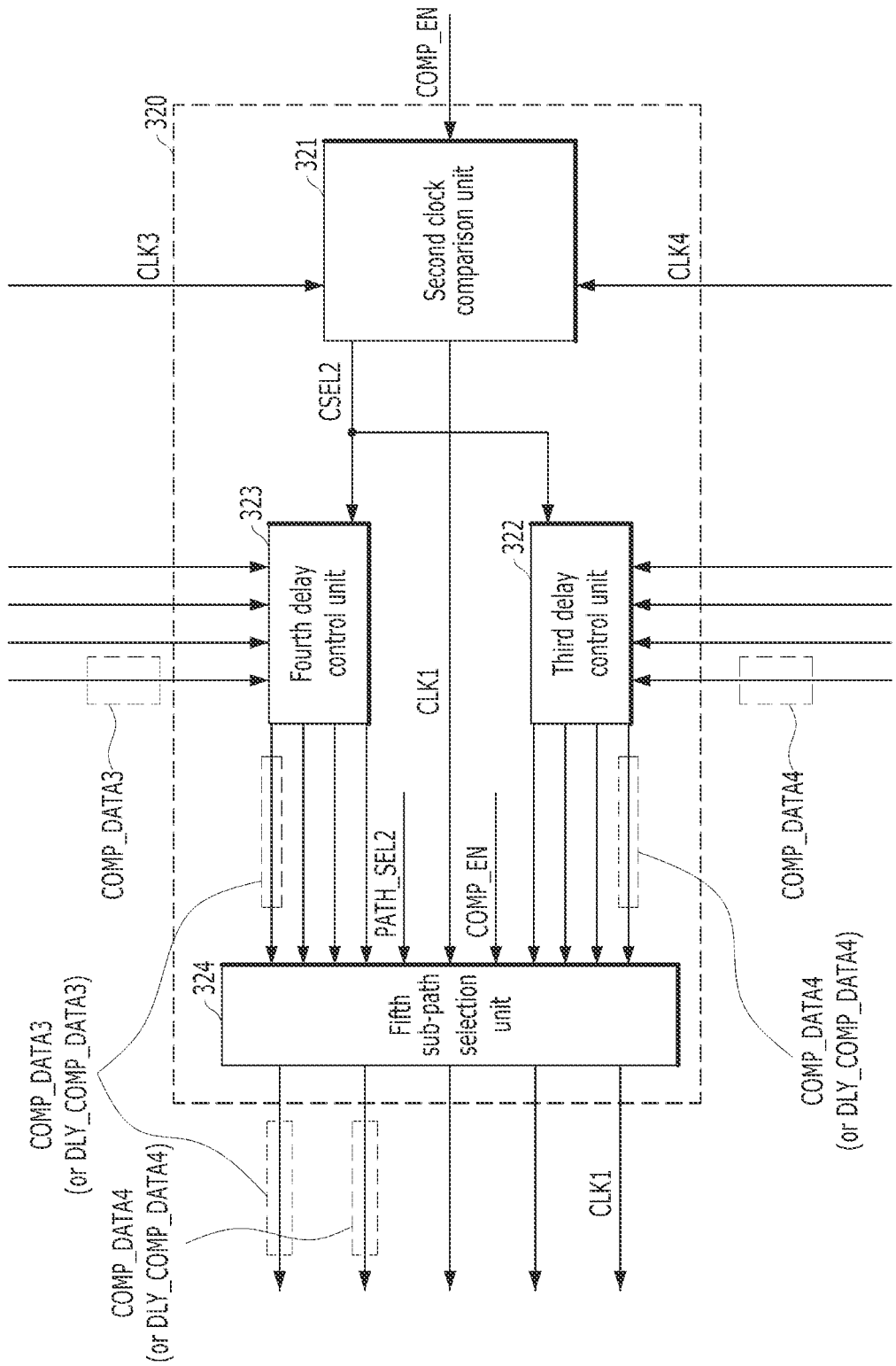

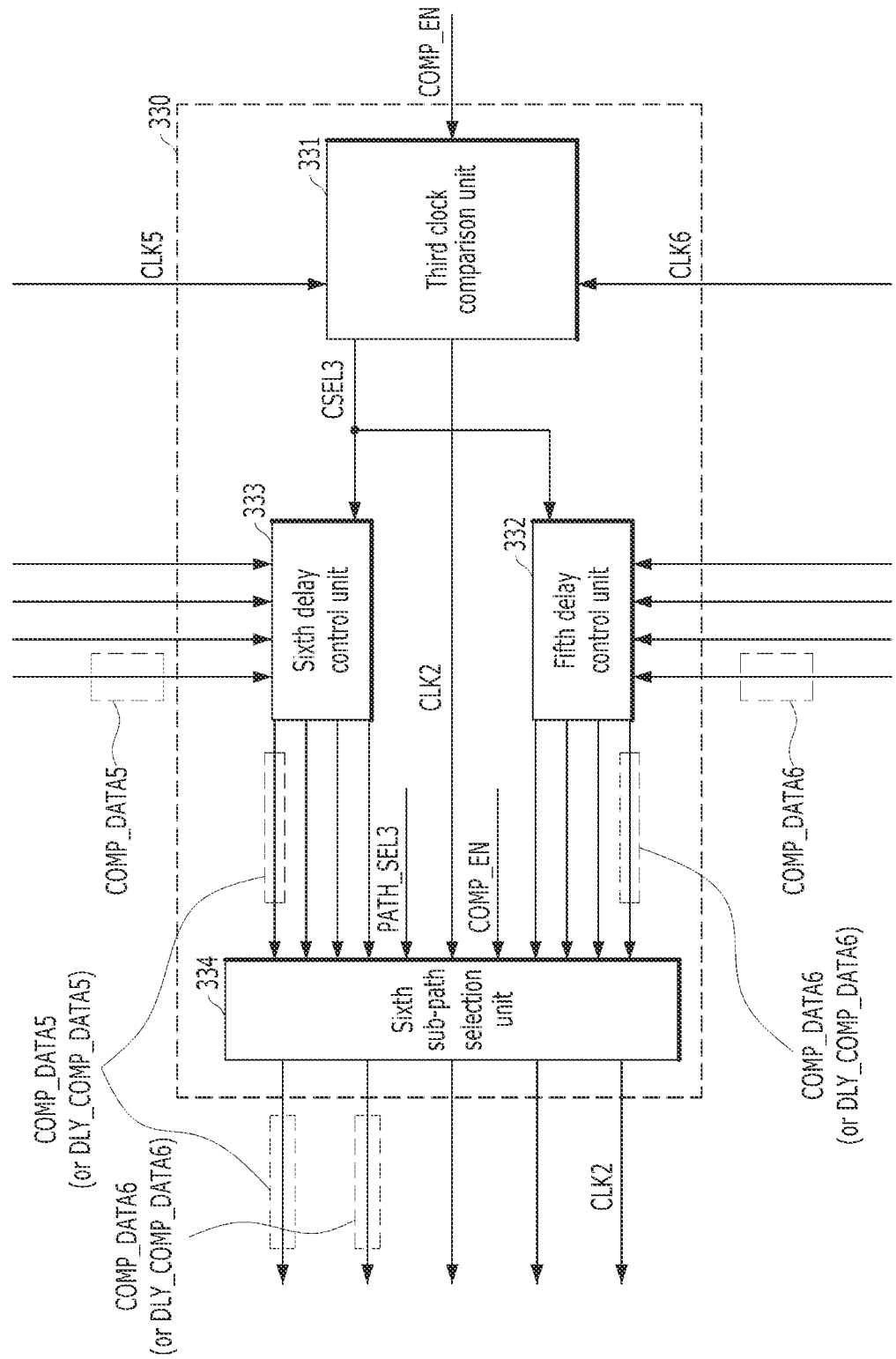

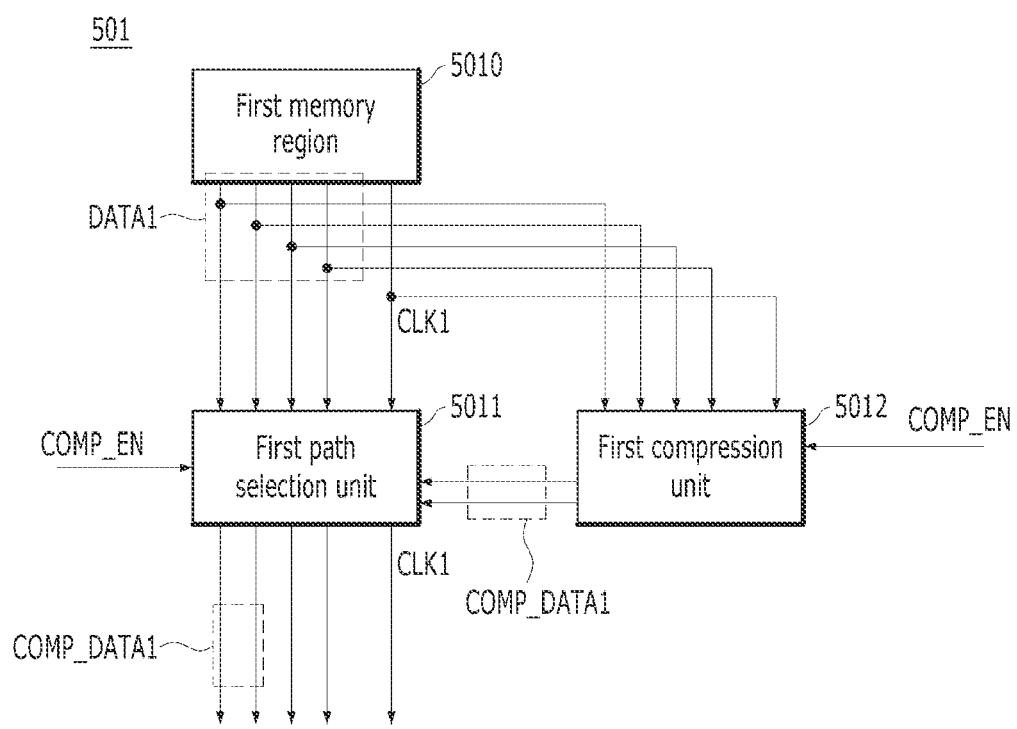

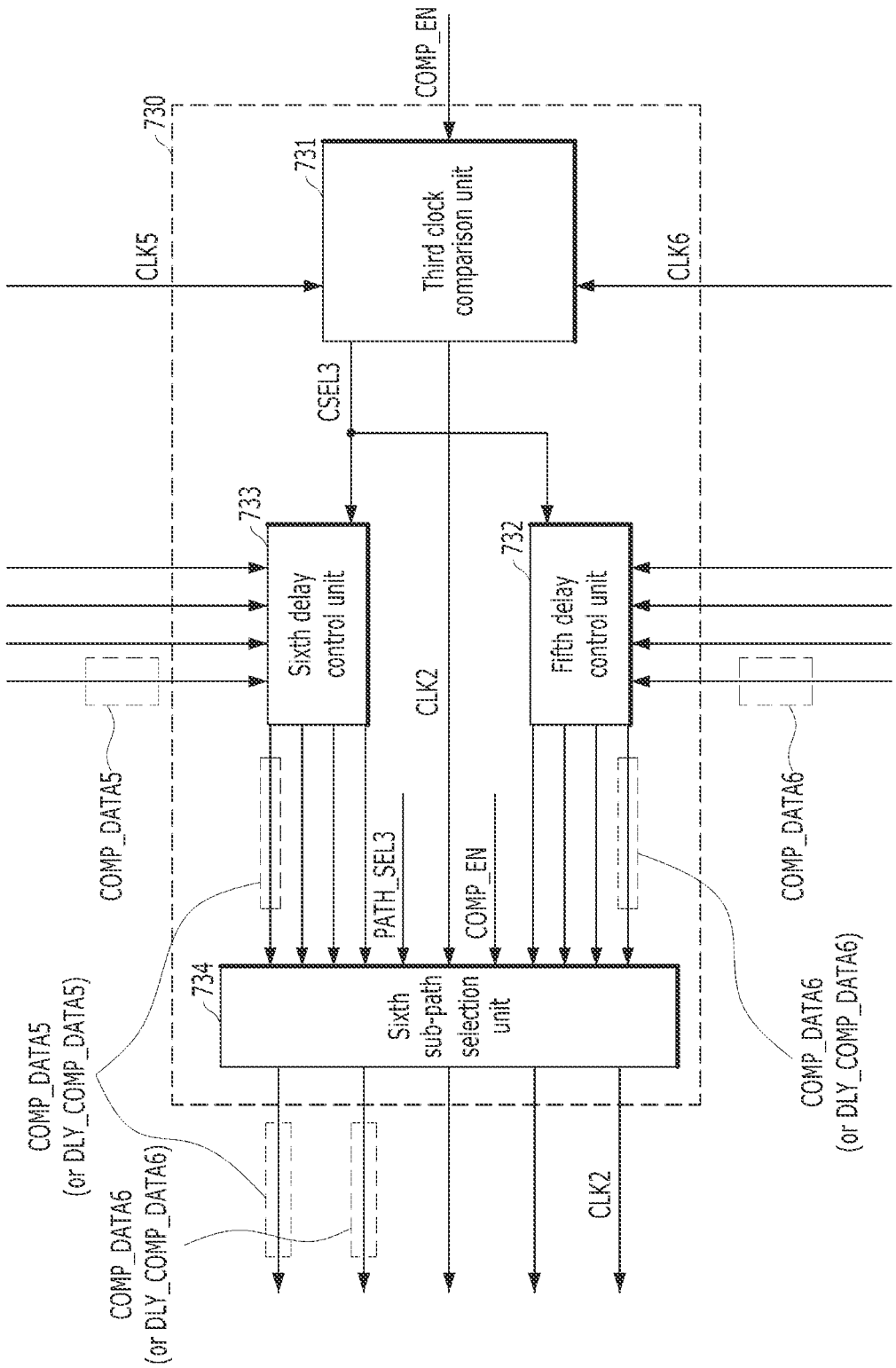

MEMORY DEVICE SUPPORTING PARALLEL COMPRESSION READ OPERATION AND MEMORY SYSTEM INCLUDING THE SAME

CROSS-REFERENCE TO RELATED APPLICATION

This application claims priority under 35 U.S.C. § 119 to Korean Patent Application No. 10-2023-0050058 filed on Apr. 17, 2023, which is incorporated herein by reference in its entirety.

BACKGROUND

1. Field

Various embodiments of the present disclosure relate to a memory device, and particularly, to a memory device supporting a parallel compression read operation and a memory system including the same.

2. Discussion of the Related Art

Memory systems are storage devices embodied using a semiconductor such as silicon (Si), germanium (Ge), gallium arsenide (GaAs), indium phosphide (InP), or the like. The memory systems are classified into a volatile memory device and a nonvolatile memory device. The volatile memory device is a memory device in which data stored therein is lost when power supply is interrupted. Representative examples of the volatile memory device include static RAM (SRAM), dynamic RAM (DRAM), synchronous DRAM (SDRAM), etc. The nonvolatile memory device is a memory device in which data stored therein is retained even when power supply is interrupted. Representative examples of the nonvolatile memory device include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), a ferroelectric RAM (FRAM), etc. Flash memories are chiefly classified into a NOR-type memory and NAND-type memory.

Data that are read from the memory device may be transmitted through a data line. The number of data lines may be fixed to a predetermined number due to a physical restriction. In general, a predetermined number of data lines may be shared and used by multiple memory devices or multiple memory regions included in one memory device.

In general, an operation of using a data line by sharing the data line may mean an operation of multiple memory devices or multiple memory regions included in one memory device exclusively using a predetermined number of data lines for a set time in a set order through time division.

However, in a specific operation mode such as a parallel compression read operation, multiple memory devices or multiple memory regions included in one memory device may use a predetermined number of data lines simultaneously by each dividing the data lines by a predetermined number in a way to output data read from each of the multiple memory devices or the multiple memory regions included in one memory device by compressing the data. For example, four memory devices may use eight data lines simultaneously by dividing the eight data lines by two in a way to output data read from each of the four memory devices by compressing the data by ¼.

SUMMARY

Various embodiments of the present disclosure are directed to providing a memory device capable of efficiently performing a parallel compression read operation of compressing and simultaneously outputting data that are read from multiple memory devices or multiple memory regions included in one memory device, and a memory system including the same.

Technical problems to be solved by the present disclosure are not limited to the above-mentioned problems, and the other unmentioned problems will be clearly understood from the following description by those skilled in the art.

An aspect of an embodiment of the present disclosure includes a memory device which may include: a first memory region connected to first lines and configured to read data from the first memory region in response to a first clock; a second memory region connected to second lines and configured to read data from the second memory region in response to a second clock; a first transmission unit configured to: compress the data read from the first memory region into first compression data, and transmit, in response to the first clock, the first compression data through first selection lines among the first lines; a second transmission unit configured to: compress the data read from the second memory region into second compression data, and transmit, in response to the second clock, the second compression data through second selection lines among the second lines; and a first parallel transmission unit configured to: simultaneously connect the first and second selection lines to third lines, select, as a selection clock, one having a lagging phase to the other between the first and second clocks, and transmit the first and second compression data in parallel through the third lines in response to the selection clock.

An aspect of an embodiment of the present disclosure includes a memory system which may include: a first memory device configured to: compress, into first compression data, data read from a first memory region included therein, and output the first compression data through first selection lines among first output lines in response to a first clock; a second memory device configured to: compress, into second compression data, data read from a second memory region included therein, and output the second compression data through second selection lines among second output lines in response to a second clock; and a first parallel transmission unit configured to: simultaneously connect the first and second output lines to third output lines, select, as a selection clock, one having a lagging phase to the other between the first clock and the second clock, and transmit the first and second compression data in parallel through the third output lines in response to the selection clock.

This technology can properly adjust timing at which data that are read/compressed from different memory devices or different memory regions are combined in parallel when the read/compressed data are combined and transmitted in parallel, in a parallel compression read operation of simultaneously compressing and outputting data that are read from multiple memory devices or multiple memory regions included in one memory device.

Accordingly, the occurrence of an error when compression data is transmitted in a parallel compression read operation can be minimized.

BRIEF DESCRIPTION OF THE DRAWINGS

FIG. 4E is a diagram for describing a detailed construction of a second parallel transmission unit, among the components of the memory device according to the first embodiment of the present disclosure, which is disclosed in FIG. 3A.

FIG. 4F is a diagram for describing a detailed construction of a third parallel transmission unit, among the components of the memory device according to the first embodiment of the present disclosure, which is disclosed in FIG. 3B.

FIG. 6A is a diagram for describing a detailed construction of a first memory device, among the components of the memory system according to the second embodiment of the present disclosure, which is disclosed in FIG. 5.

FIG. 8F is a diagram for describing a detailed construction of a third parallel transmission unit, among the components of the memory system according to the second embodiment of the present disclosure, which is disclosed in FIG. 7B.

DETAILED DESCRIPTION

Figure 1:
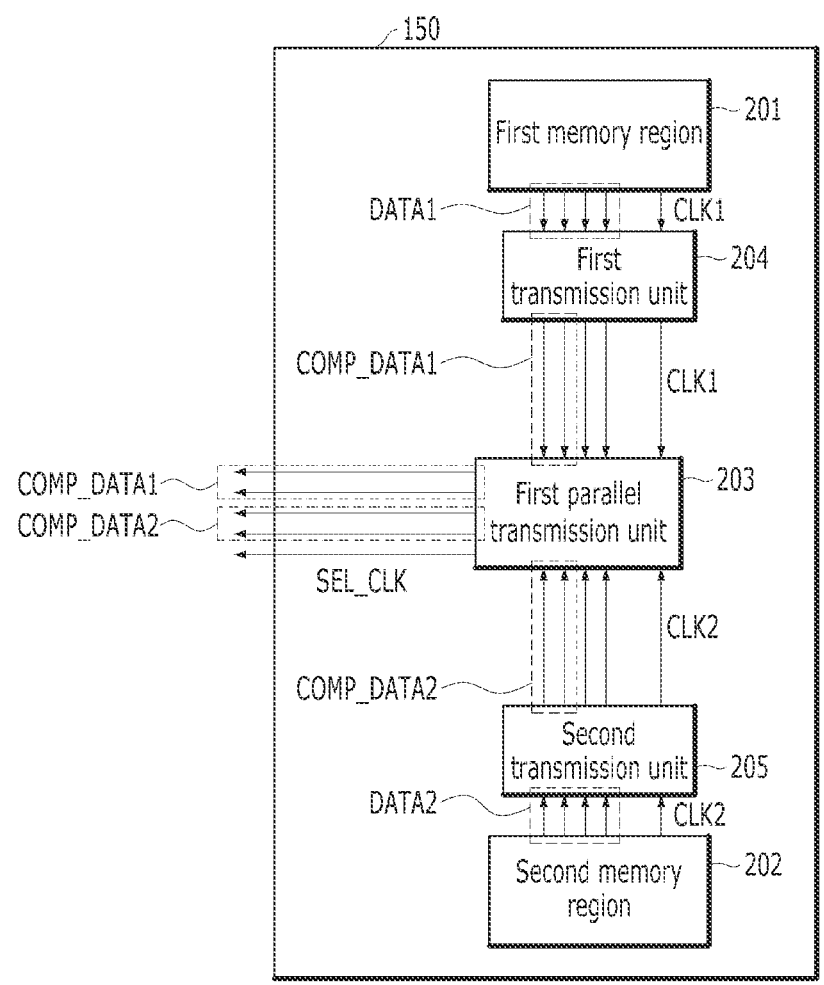
FIG. 1 is a diagram for describing an example of a memory device according to a first embodiment of the present disclosure, which performs a compression read operation.

Various embodiments of the present disclosure are described below with reference to the accompanying drawings. Elements and features of the disclosure, however, may be configured or arranged differently to form other embodiments, which may be variations of any of the disclosed embodiments.

In this disclosure, references to various features (e.g., elements, structures, modules, components, steps, operations, characteristics, etc.) included in "one embodiment," "example embodiment," "an embodiment," "another embodiment," "some embodiments," "various embodiments," "other embodiments," "alternative embodiment," and the like are intended to mean that any such features are included in one or more embodiments of the present disclosure, but may or may not necessarily be combined in the same embodiments.

In this disclosure, the terms "comprise," "comprising," "include," and "including" are open-ended. As used in the appended claims, these terms specify the presence of the stated elements and do not preclude the presence or addition of one or more other elements. The terms in a claim do not foreclose the apparatus from including additional components (e.g., an interface unit, circuitry, etc.).

In this disclosure, various units, circuits, or other components may be described or claimed as "configured to" perform a task or tasks. In such contexts, "configured to" is used to connote structure by indicating that the blocks/units/circuits/components include structure (e.g., circuitry) that performs one or more tasks during operation. As such, the block/unit/circuit/component can be said to be configured to perform the task even when the specified block/unit/circuit/component is not currently operational (e.g., is not turned on nor activated). The block/unit/circuit/component used with the "configured to" language includes hardware, for example, circuits, memory storing program instructions executable to implement the operation, etc. Additionally, "configured to" can include a generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that implement or perform one or more tasks.

As used in this disclosure, the term 'circuitry' or 'logic' refers to all of the following: (a) hardware-only circuit implementations (such as implementations in only analog and/or digital circuitry) and (b) combinations of circuits and software (and/or firmware), such as (as applicable): (i) to a combination of processor(s) or (ii) to portions of processor (s)/software (including digital signal processor(s)), software, and memory (ies) that work together to cause an apparatus, such as a mobile phone or server, to perform various functions and (c) circuits, such as a microprocessor(s) or a portion of a microprocessor(s), that require software or firmware for operation, even if the software or firmware is not physically present. This definition of 'circuitry' or 'logic' applies to all uses of this term in this application, including in any claims. As a further example, as used in this application, the term "circuitry" or "logic" also covers an implementation of merely a processor (or multiple processors) or a portion of a processor and its (or their) accompanying software and/or firmware. The term "circuitry" or "logic" also covers, for example, and if applicable to a particular claim element, an integrated circuit for a storage device.

As used herein, the terms "first," "second," "third," and so on are used as labels for nouns that the terms precede, and do not imply any type of ordering (e.g., spatial, temporal, logical, etc.). The terms "first" and "second" do not necessarily imply that the first value must be written before the second value. Further, although the terms may be used herein to identify various elements, these elements are not limited by these terms. These terms are used to distinguish one element from another element that otherwise have the same or similar names. For example, a first circuitry may be distinguished from a second circuitry.

Further, the term "based on" is used to describe one or more factors that affect a determination. This term does not foreclose additional factors that may affect a determination. That is, a determination may be solely based on those factors or based, at least in part, on those factors. For example, the phrase "determine A based on B." While in this case, B is a factor that affects the determination of A, such a phrase does not foreclose the determination of A from also being based on C. In other instances, A may be determined based solely on B.

Herein, an item of data, a data item, a data entry or an entry of data may be a sequence of bits. For example, the data item may include the contents of a file, a portion of the file, a page in memory, an object in an object-oriented program, a digital message, a digital scanned image, a part of a video or audio signal, metadata or any other entity which can be represented by a sequence of bits. According to an embodiment, the data item may include a discrete object. According to another embodiment, the data item may include a unit of information within a transmission packet between two different components.

First Embodiment

FIG. 1 is a diagram for describing an example of a memory device according to a first embodiment of the present disclosure, which performs a compression read operation.

Referring to FIG. 1, a memory device 150 according to the first embodiment of the present disclosure may include a first memory region 201, a second memory region 202, a first transmission unit 204, a second transmission unit 205, and a first parallel transmission unit 203.

Specifically, the first memory region 201 and the second memory region 202 may be disposed in regions that are physically divided. In this case, the two regions being physically divided and disposed may mean that the two regions that have been physically divided are in the state in which the two regions have at least a set interval or more. In this case, the set interval may mean an interval of a degree in which another physical component may be disposed and may be adjusted in any degree depending on the type or size of the memory device 150.

Furthermore, each of the first memory region 201 and the second memory region 202 may include multiple memory cells (not illustrated) for storing data. In this case, data that are input from the outside may be stored in at least one region of the first memory region 201 and the second memory region 202 through a program operation. Furthermore, data that are stored in at least one region of the first memory region 201 and the second memory region 202 may be output through a read operation. At this time, the first memory region 201 and the second memory region 202 may operate in a fully independent form. For example, an operation of reading data from the first memory region 201 and an operation of programming data into the second memory region 202 may be performed in parallel. As another example, an operation of reading data from the first memory region 201 and an operation of reading data from the second memory region 202 may be performed in parallel.

More specifically, the first memory region 201 may be connected to first lines and may read data that have been stored in the first memory region 201, in response to a first clock CLK1. Furthermore, the first memory region 201 may output, through the first lines, data DATA1 that have been internally read. In this case, the first lines may be a line for connecting the first memory region 201 and the first parallel transmission unit 203.

Furthermore, the second memory region 202 may be connected to second lines and may read data that have been stored in the second memory region 202, in response to the second clock CLK2. Furthermore, the second memory region 202 may output, through the second lines, data DATA2 that have been internally read. In this case, the second lines may be a line for connecting the second memory region 202 and the first parallel transmission unit 203.

Furthermore, the first transmission unit 204 may transmit data that are transmitted through the first lines between the first memory region 201 and the first parallel transmission unit 203.

More specifically, in a read operation included in a normal mode, the first transmission unit 204 may transmit data that have been read from the first memory region 201 to the first parallel transmission unit 203 through the first lines in response to the first clock CLK1 so that the data are output to the outside of the memory device 150. For example, in a read operation included in the normal mode, the first transmission unit 201 may transmit the data DATA1 that are read from the first memory region 201 and that are output through four first lines to the first parallel transmission unit 203 through the four first lines.

Furthermore, in a compression read mode, the first transmission unit 204 may compress the data DATA1 read from the first memory region 201 into first compression data COMP_DATA1, and may transmit the first compression data COMP_DATA1 to the first parallel transmission unit 203 through first selection lines, among the first lines, in response to the first clock CLK1. In the compression read mode, the first transmission unit 204 may generate the first compression data COMP_DATA1 by compressing the data DATA1 read from the first memory region 201 at a compression ratio of 1 to N, and may transmit the first compression data COMP_DATA1 through the first selection lines by selecting, as the first selection lines, a 1/N number of the first lines. In this case, N may be a natural number equal to or greater than 2. For example, when N is 2, in the compression read mode, the first transmission unit 204 may generate the first compression data COMP_DATA1 by compressing the data DATA1 read from the first memory region 201 at a compression ratio of 1 to 2, that is, 50%, and may transmit the first compression data COMP_DATA1 through the first selection lines by selecting two first lines, among four first lines, as the first selection lines.

Furthermore, the second transmission unit 205 may transmit data that are transmitted through the second lines between the second memory region 202 and the first parallel transmission unit 203.

More specifically, in a read operation included in the normal mode, the second transmission unit 205 may transmit data that have been read from the second memory region 202 to the first parallel transmission unit 203 through the second lines in response to the second clock CLK2 so that the data are output to the outside of the memory device 150. For example, in a read operation included in the normal mode, the second transmission unit 202 may transmit data DATA2 that are read from the second memory region 202 and that are output through four second lines to the first parallel transmission unit 203 through the four second lines.

Furthermore, in the compression read mode, the second transmission unit 205 may compress the data DATA2 read from the second memory region 202 into second compression data COMP_DATA2, and may transmit the second compression data COMP_DATA2 to the first parallel transmission unit 203 through second selection lines, among the second lines, in response to the second clock CLK2. In this case, in the compression read mode, the second transmission unit 205 may generate the second compression data COMP_DATA2 by compressing the data DATA2 read from the second memory region 202 at a compression ratio of 1 to N, and may transmit the second compression data COMP_DATA2 through the second selection lines by selecting, as the second selection lines, a 1/N number of the second lines. In this case, N may be a natural number equal to or greater than 2. For example, when N is 2, in the compression read mode, the second transmission unit 205 may generate the second compression data COMP_DATA2 by compressing the data DATA2 read from the second memory region 202 at a compression ratio of 1 to 2, that is, 50%, and may transmit the second compression data COMP_DATA2 through the second selection lines by selecting two second lines, among the four second lines, as the second selection lines.

Furthermore, the first parallel transmission unit 203 may be connected to the first lines, the second lines, and third lines, and may enable the third lines to be selectively coupled to the first lines and the second lines. In this case, the number of first lines, the number of second lines, and the number of third lines may be the same number, that is, at least two. For example, as illustrated in FIG. 1, each of the number of first lines, the number of second lines, and the number of third lines may be four. Furthermore, the third lines may be connected to another component that is present outside the memory device 150, for example, a memory controller (not illustrated)

More specifically, in a read operation included in the normal mode, the first parallel transmission unit 203 may connect the first lines and the third lines and simultaneously might not connect the second lines and the third lines so that data that have been read from the first memory region 201 and that have been transmitted through the first lines are output to the outside of the memory device 150. For example, in a read operation included in the normal mode, the first parallel transmission unit 203 may connect four first lines and four third lines, and simultaneously might not connect four second lines to the four third lines.

Furthermore, in a read operation included in the normal mode, the first parallel transmission unit 203 may connect the second lines and the third lines and simultaneously might not connect the first lines and the third lines so that data that have been read from the second memory region 202 and that have been transmitted through the second lines are output to the outside of the memory device 150. For example, in a read operation included in the normal mode, the first parallel transmission unit 203 may connect the four second lines and the four third lines, and simultaneously might not connect the four first lines and the four third lines.

That is, in the read operation included in the normal mode, the first parallel transmission unit 203 may operate in a time division form so that an interval in which the first lines are connected to the third lines and an interval in which the second lines are connected to the third lines do not overlap. Accordingly, the third lines can be selectively coupled to the first lines and the second lines.

Furthermore, in the compression read mode, the first parallel transmission unit 203 may connect partial lines of the third lines and the first selection lines and simultaneously connect remaining lines of the third lines and the second selection lines, may select, as a selection clock SEL_CLK, one having a lagging phase to the other between the first clock CLK1 and the second clock CLK2, and may transmit the first compression data COMP_DATA1 and the second compression data COMP_DATA2 in parallel through the third lines in response to the selection clock SEL_CLK. In this case, the number of first selection lines, the number of second selection lines, the number of the partial lines of the third lines, and the number of the remaining lines of the third lines may be the same number. For example, as illustrated in FIG. 1, each of the number of first selection lines, the number of second selection lines, the number of the partial lines of the third lines, and the number of the remaining lines of the third lines may be two.

For example, in the compression read mode, the first parallel transmission unit 203 may transmit the first compression data COMP_DATA1 through the partial lines of the third lines, by connecting two lines that have been selected as the first selection lines, among the four first lines, and two partial lines of the third lines, and may simultaneously transmit the second compression data COMP_DATA2 through the remaining lines of the third lines, by connecting two lines that have been selected as the second selection lines, among the four second lines, and two remaining lines of the third lines. That is, the first parallel transmission unit 203 may transmit the first compression data COMP_DATA1 that have been transmitted through the first selection lines and the second compression data COMP_DATA2 that have been transmitted through the second selection lines in parallel, through the third lines.

In particular, the first parallel transmission unit 203 may compare the phase of the first clock CLK1 that has been used to load the first compression data COMP_DATA1 onto the first selection lines and the phase of the second clock CLK2 that has been used to load the second compression data COMP_DATA2 onto the second selection lines, may select, as the selection clock SEL_CLK, one having a lagging phase to the other between the first clock CLK1 and the second clock CLK2, and may then transmit the first compression data COMP_DATA1 to the partial lines of the third lines in response to the selection clock SEL_CLK and transmit the second compression data COMP_DATA2 to the remaining lines of the third lines in response to the selection clock SEL_CLK. That is, the first parallel transmission unit 203 may load the first compression data COMP_DATA1 and the second compression data COMP_DATA2 onto the third lines in response to the selection clock SEL_CLK.

Furthermore, the first parallel transmission unit 203 may adjust timing at which the first compression data COMP_DATA1 are loaded onto the partial lines of the third lines or timing at which the second compression data COMP_DATA2 are loaded onto the remaining lines of the third lines, depending on which one of the first clock CLK1 and the second clock CLK2 is selected as the selection clock SEL_CLK.

More specifically, when the first clock CLK1 is selected as the selection clock SEL_CLK, the first parallel transmission unit 203 may delay the timing at which the second compression data COMP_DATA2 are loaded onto the remaining lines of the third lines by a first amount. That is, when the first clock CLK1 is selected as the selection clock SEL_CLK, the first parallel transmission unit 203 may load, onto the partial lines of the third lines, the first compression data COMP_DATA1 that have been transmitted through the first selection lines in response to the selection clock SEL_CLK, may delay the second compression data COMP_DATA2 that have been transmitted through the second selection lines by the first amount, and may load the delayed second compression data onto the remaining lines of the third lines in response to the selection clock SEL_CLK. In this case, the first amount may correspond to a difference between the phases of the first clock CLK1 and the second clock CLK2 or may be predetermined.

Furthermore, when the second clock CLK2 is selected as the selection clock SEL_CLK, the first parallel transmission unit 203 may delay the timing at which the first compression data COMP_DATA1 are loaded onto the partial lines of the third lines by a second amount. That is, when the second clock CLK2 is selected as the selection clock SEL_CLK, the first parallel transmission unit 203 may load, onto the remaining lines of the third lines, the second compression data COMP_DATA2 that have been transmitted through the second selection lines in response to the selection clock SEL_CLK, may delay the first compression data COMP_DATA1 that have been transmitted through the first selection lines by the second amount, and may then load the delayed first compression data onto the partial lines of the third lines in response to the selection clock SEL_CLK. In this case, the second amount may correspond to a difference between the phases of the first clock CLK1 and the second clock CLK2 or may be predetermined.

The memory device 150 may further include a first clock generation unit (not illustrated) for generating the first clock CLK1 and a second clock generation unit (not illustrated) for generating the second clock CLK2. In this case, the first clock generation unit may be disposed within the first memory region 201 or in a region that is physically adjacent to the first memory region 201. Furthermore, the second clock generation unit may be disposed within the second memory region 202 or in a region that is physically adjacent to the second memory region 202. For example, if the first clock generation unit is disposed within the first memory region 201, as illustrated in FIG. 1, the first clock CLK1 generated from the first memory region 201 may be transmitted to the first transmission unit 204 and the first parallel transmission unit 203. Likewise, if the second clock generation unit is disposed within the second memory region 202, as illustrated in FIG. 1, the second clock CLK2 generated from the second memory region 202 may be transmitted to the second transmission unit 205 and the first parallel transmission unit 203. As another example, if the first clock generation unit is disposed in the region that is physically adjacent to the first memory region 201, unlike in FIG. 1, the first clock CLK1 generated by the first clock generation unit that is disposed to be physically adjacent to the first memory region 201 may be input to the first memory region 201, the first transmission unit 204, and the first parallel transmission unit 203. Likewise, if the second clock generation unit is disposed in the region that is physically adjacent to the second memory region 202, unlike in the drawing, the second clock CLK2 generated by the second clock generation unit that is disposed to be physically adjacent to the second memory region 202 may be input to the second memory region 202, the second transmission unit 205, and the first parallel transmission unit 203.

Furthermore, according to an embodiment, the memory device 150 may be a volatile memory device, such as double data rate synchronous dynamic random access memory (DDR SDRAM), low power double data rate4 (LPDDR4) SDRAM, graphics double data rate (GDDR) SDRAM, low power DDR (LPDDR), or Rambus dynamic random access memory (RDRAM). According to another embodiment, the memory device 150 may be a nonvolatile memory device, such as NAND flash memory, vertical NAND flash memory, NOR flash memory, resistive random access memory (RRAM), phase-change random access memory (PRAM), magnetoresistive random access memory (MRAM), ferroelectric random access memory (FRAM), or spin transfer torque random access memory (STT-RAM).

For example, each of the first and second memory regions 201 and 202 disclosed in FIG. 1 may be a plane including multiple memory blocks (not illustrated). Furthermore, each of the first and second lines that are connected to the first and second memory regions 201 and 202, respectively, may be a way that is connected to one plane. Furthermore, the third lines that are selectively coupled to the first and second lines may be a channel that is selectively coupled to one of at least two ways.

Figure 2A:
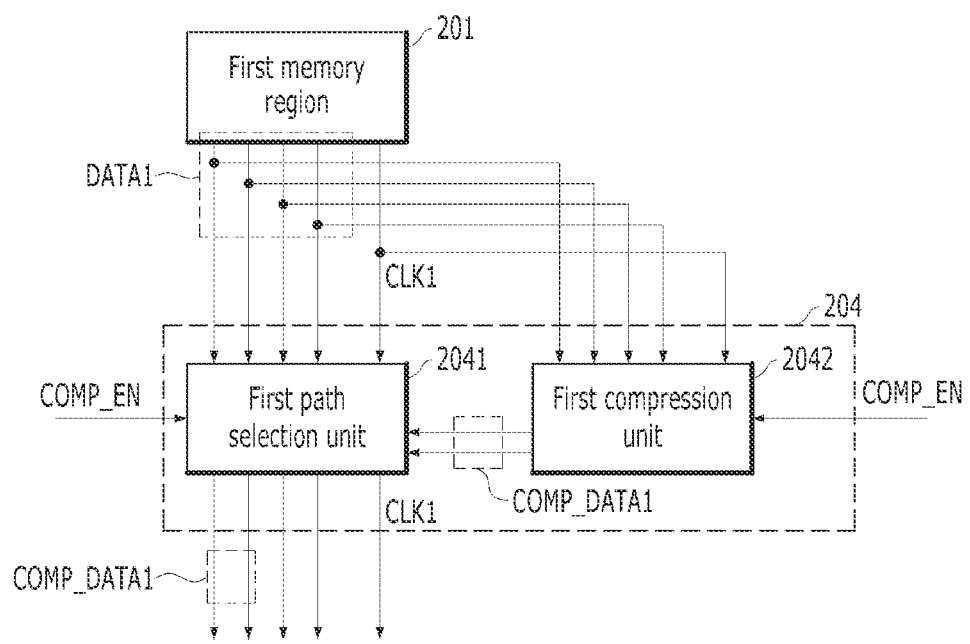
FIG. 2A is a diagram for describing a detailed construction of a first transmission unit, among the components of the memory device according to the first embodiment of the present disclosure, which is disclosed in FIG. 1.

FIG. 2A is a diagram for describing a detailed construction of the first transmission unit, among the components of the memory device according to the first embodiment of the present disclosure, which is disclosed in FIG. 1.

Referring to FIG. 2A, the first transmission unit 204 may include a first path selection unit 2041 and a first compression unit 2042.

Specifically, the first compression unit 2042 may be activated in the compression read mode in which a compression enable signal COMP_EN is activated, and may output the first compression data COMP_DATA1 to the first path selection unit 2041 by compressing the data DATA1 read from the first memory region 201 into the first compression data COMP_DATA1 in the activated state. That is, in the compression read mode, the first compression unit 2042 may generate the first compression data COMP_DATA1 by compressing the data DATA1 read from the first memory region 201 at a compression ratio of 1 to N, and may output the generated first compression data COMP_DATA1 to the first path selection unit 2041. In this case, N may be a natural number equal to or greater than 2. For example, when N is 2, in the compression read mode, the first compression unit 2042 may generate the first compression data COMP_DATA1 by compressing the data DATA1 read from the first memory region 201 at a compression ratio of 1 to 2, that is, 50%.

Furthermore, the first compression unit 2042 may be deactivated in the normal mode in which the compression enable signal COMP_EN is deactivated.

Furthermore, in a read operation included in the normal mode in which the compression enable signal COMP_EN is deactivated, the first path selection unit 2041 may transmit the data DATA1 read from the first memory region 201 to the first parallel transmission unit 203 through the first lines in response to the first clock CLK1 so that the data DATA1 are output to the outside of the memory device 150. For example, in a read operation included in the normal mode in which the compression enable signal COMP_EN is deactivated, the first path selection unit 2041 may transmit the data DATA1 that are read from the first memory region 201 and that are output through the four first lines to the first parallel transmission unit 203 through the four first lines.

Furthermore, in the compression read mode in which the compression enable signal COMP_EN is activated, the first path selection unit 2041 may transmit, to the first parallel transmission unit 203, the first compression data COMP_DATA1 transmitted by the first compression unit 2042 through the first selection lines, among the first lines, in response to the first clock CLK1. That is, in the compression read mode, the first path selection unit 2041 may select, as the first selection lines, a 1/N number of the first lines and may load the first compression data COMP_DATA1 transmitted by the first compression unit 2042 onto the first selection lines in response to the first clock CLK1. In this case, N may be a natural number equal to or greater than 2. For example, when N is 2, the first path selection unit 2041 may load the first compression data COMP_DATA1 onto the first selection lines by selecting two first lines, among four first lines, as the first selection lines.

Figure 2B:
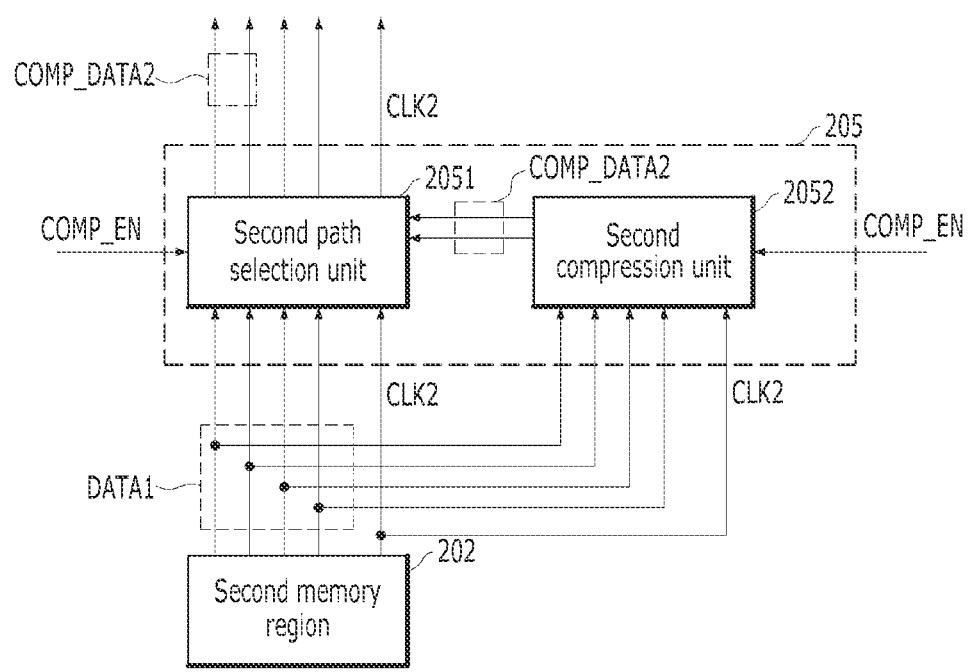
FIG. 2B is a diagram for describing a detailed construction of a second transmission unit, among the components of the memory device according to the first embodiment of the present disclosure, which is disclosed in FIG. 1.

FIG. 2B is a diagram for describing a detailed construction of the second transmission unit, among the components of the memory device according to the first embodiment of the present disclosure, which is disclosed in FIG. 1.

Referring to FIG. 2B, the second transmission unit 205 may include a second path selection unit 2051 and a second compression unit 2052.

Specifically, the second compression unit 2052 may be activated in the compression read mode in which the compression enable signal COMP_EN is activated, and may output the second compression data COMP_DATA2 to the second path selection unit 2051 by compressing the data DATA2 read from the second memory region 202 into the second compression data COMP_DATA2 in the activated state. That is, in the compression read mode, the second compression unit 2052 may generate the second compression data COMP_DATA2 by compressing the data DATA2 read from the second memory region 202 at a compression ratio of 1 to N, and may output the generated second compression data COMP_DATA2 to the second path selection unit 2051. In this case, N may be a natural number equal to or greater than 2. For example, when N is 2, in the compression read mode, the second compression unit 2052 may generate the second compression data COMP_DATA2 by compressing the data DATA2 read from the second memory region 202 at a compression ratio of 1 to 2, that is, 50%.

Furthermore, the second compression unit 2052 may be deactivated in the normal mode in which the compression enable signal COMP_EN is deactivated.

Furthermore, in a read operation included in the normal mode in which the compression enable signal COMP_EN is deactivated, the second path selection unit 2051 may transmit the data DATA2 read from the second memory region 202 to the first parallel transmission unit 203 through the second lines in response to the second clock CLK2 so that the data DATA2 are output to the outside of the memory device 150. For example, in a read operation included in the normal mode in which the compression enable signal COMP_EN is deactivated, the second path selection unit 2051 may transmit the data DATA2 that are read from the second memory region 202 and that are output through four second lines to the first parallel transmission unit 203 through the four second lines.

Furthermore, in the compression read mode in which the compression enable signal COMP_EN is activated, the second path selection unit 2051 may transmit the second compression data COMP_DATA2 transmitted by the second compression unit 2052 to the first parallel transmission unit 203 through the second selection lines, among the second lines, in response to the second clock CLK2. That is, in the compression read mode, the second path selection unit 2051 may select, as the second selection lines, a 1/N number of the second lines and may load the second compression data COMP_DATA2 transmitted by the second compression unit 2052 onto the second selection lines in response to the second clock CLK2. In this case, N may be a natural number equal to or greater than 2. For example, when N is 2, the second path selection unit 2051 may load the second compression data COMP_DATA2 onto the second selection lines by selecting two second lines, among four second lines, as the second selection lines.

Figure 2C:
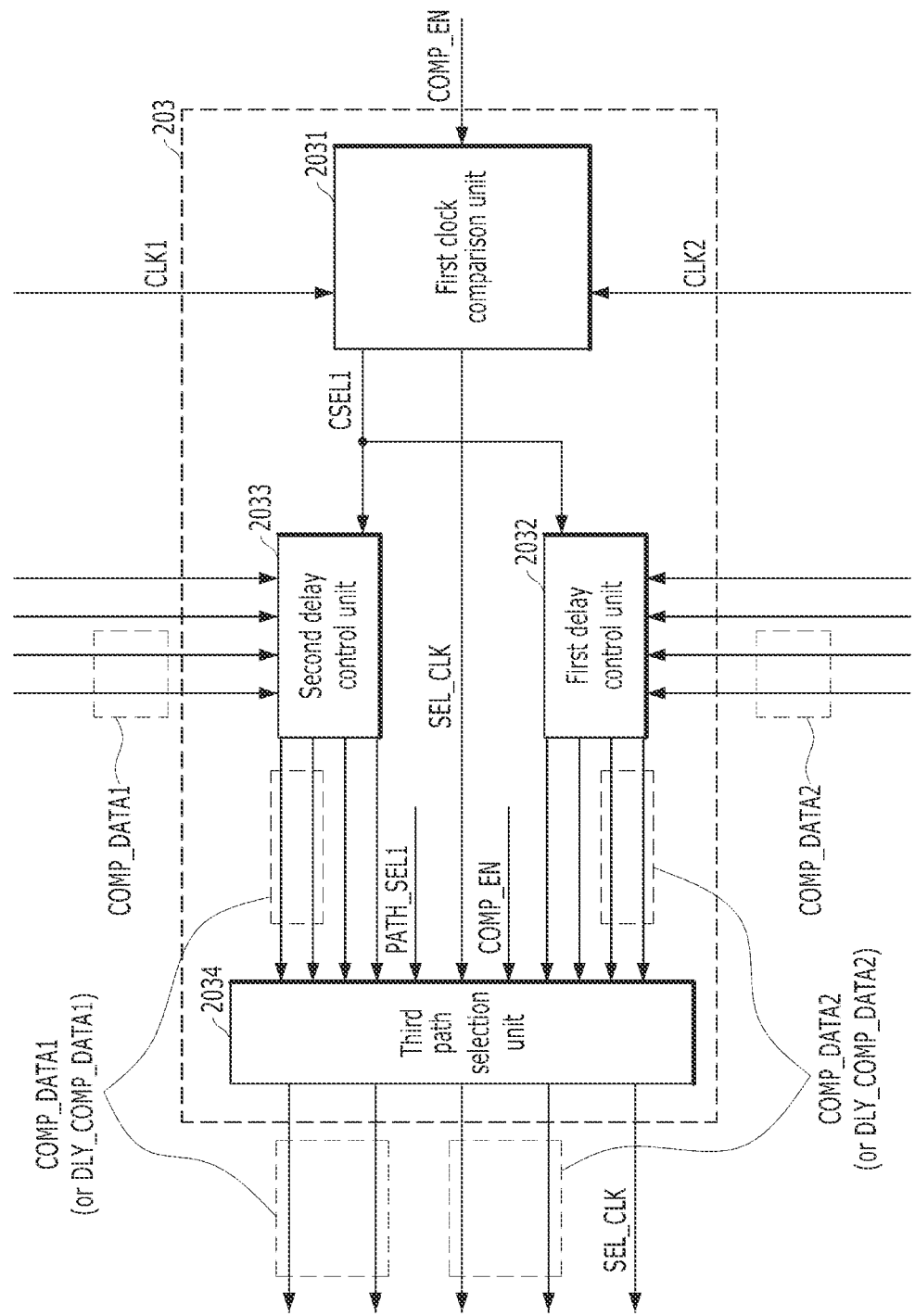
FIG. 2C is a diagram for describing a detailed construction of a first parallel transmission unit, among the components of the memory device according to the first embodiment of the present disclosure, which is disclosed in FIG. 1.

FIG. 2C is a diagram for describing a detailed construction of the first parallel transmission unit, among the components of the memory device according to the first embodiment of the present disclosure, which is disclosed in FIG. 1.

Referring to FIG. 2C, the first parallel transmission unit 203 may include a first clock comparison unit 2031, a first delay control unit 2032, a second delay control unit 2033, and a third path selection unit 2034.

Specifically, in the compression read mode in which the compression enable signal COMP_EN is activated, the first clock comparison unit 2031 may compare the phases of the first clock CLK1 and the second clock CLK2, and may output the selection clock SEL_CLK to the third path selection unit 2034 by selecting, as the selection clock SEL_CLK, one having a lagging phase to the other between the first clock CLK1 and the second clock CLK2. That is, in the compression read mode, the first clock comparison unit 2031 may compare the phase of the first clock CLK1 that has been used to load the first compression data COMP_DATA1 onto the first selection lines and the phase of the second clock CLK2 that has been used to load the second compression data COMP_DATA2 onto the second selection lines, and may select, as the selection clock SEL_CLK, one having a lagging phase to the other between the first clock CLK1 and the second clock CLK2. At this time, the first clock comparison unit 2031 may control operations of the first delay control unit 2032 and the second delay control unit 2033 by generating a first selection result signal CSEL1. According to an embodiment, the first clock comparison unit 2031 may generate the first selection result signal CSEL1 the value of which is adjusted based on which one of the first clock CLK1 and the second clock CLK2 has been selected as the selection clock SEL_CLK, and may output the first selection result signal CSEL1 to the first delay control unit 2032 and the second delay control unit 2033. According to another embodiment, the first clock comparison unit 2031 may generate the first selection result signal CSEL1 the value of which is adjusted based on which one of the first clock CLK1 and the second clock CLK2 has been selected as the selection clock SEL_CLK and a difference between the phases of the first clock CLK1 and the second clock CLK2, and may output the first selection result signal CSEL1 to the first delay control unit 2032 and the second delay control unit 2033.

Furthermore, the first clock comparison unit 2031 may be deactivated in the normal mode in which the compression enable signal COMP_EN is deactivated, may generate the first selection result signal CSEL1 having an initial value in the deactivated state, and may output the first selection result signal CSEL1 to the first delay control unit 2032 and the second delay control unit 2033.

Furthermore, the first delay control unit 2032 may output the second compression data COMP_DATA2 by delaying the second compression data COMP_DATA2 by the first amount in response to the first selection result signal CSEL1. Specifically, the first delay control unit 2032 may delay the second compression data COMP_DATA2 that have been transmitted through the second selection lines by the first amount, in response to the first selection result signal CSEL1 having a value corresponding to the first clock CLK1 being selected as the selection clock SEL_CLK, and may output the delayed second compression data DLY_COMP_DATA2 to the third path selection unit 2034. Furthermore, the first delay control unit 2032 may output the second compression data COMP_DATA2 that have been transmitted through the second selection lines, to the third path selection unit 2034, in response to the first selection result signal CSEL1 having a value corresponding to the second clock CLK2 being selected as the selection clock SEL_CLK. According to an embodiment, the first delay control unit 2032 may delay the second compression data COMP_DATA2 by the first amount. According to another embodiment, the first delay control unit 2032 may adjust the first amount in response to the first selection result signal CSEL1, and may delay the second compression data COMP_DATA2 by the adjusted first amount. Furthermore, the first delay control unit 2032 may output data that have been transmitted through the second lines, to the third path selection unit 2034, in response to the first selection result signal CSEL1 having the initial value.

Furthermore, the second delay control unit 2033 may output the first compression data COMP_DATA1 by delaying the first compression data COMP_DATA1 by the second amount in response to the first selection result signal CSEL1. That is, the second delay control unit 2033 may delay the first compression data COMP_DATA1 that have been transmitted through the first selection lines, by the first amount, in response to the first selection result signal CSEL1 having a value corresponding to the second clock CLK2 being selected as the selection clock SEL_CLK, and may then output the delayed first compression data DLY_COMP_DATA1 to the third path selection unit 2034. Furthermore, the second delay control unit 2033 may output the first compression data COMP_DATA1 that have been transmitted through the first selection lines, to the third path selection unit 2034 in response to the first selection result signal CSEL1 having a value corresponding to the first clock CLK1 being selected as the selection clock SEL_CLK. According to an embodiment, the second delay control unit 2033 may delay the first compression data COMP_DATA1 by the second amount. According to another embodiment, the second delay control unit 2033 may adjust the second amount in response to the first selection result signal CSEL1, and may delay the first compression data COMP_DATA1 by the adjusted second amount. Furthermore, the second delay control unit 2033 may output data that have been transmitted through the first lines, to the third path selection unit 2034, in response to the first selection result signal CSEL1 having the initial value.

Furthermore, in a read operation included in the normal mode in which the compression enable signal COMP_EN is deactivated, the third path selection unit 2034 may connect the first lines and the third lines in response to a first path selection signal PATH_SEL1 having a first value, and might not connect the second lines and the third lines. For example, in a read operation included in the normal mode in which the compression enable signal COMP_EN is deactivated, the third path selection unit 2034 may connect four first lines and four third lines and simultaneously might not connect four second lines to the four third lines, in response to the first path selection signal PATH_SEL1 having the first value.

Furthermore, in a read operation included in the normal mode in which the compression enable signal COMP_EN is deactivated, the third path selection unit 2034 may connect the second lines and the third lines and might not connect the first lines and the third lines, in response to the first path selection signal PATH_SEL1 having a second value. For example, in a read operation included in the normal mode in which the compression enable signal COMP_EN is deactivated, the third path selection unit 2034 may connect four second lines and four third lines and simultaneously might not connect four first lines and the four third lines, in response to the first path selection signal PATH_SEL1 having the second value.

Furthermore, in the compression read mode in which the compression enable signal COMP_EN is activated, the third path selection unit 2034 may connect the first selection lines, among the first lines, and the partial lines of the third lines and connect the second selection lines, among the second lines, and the remaining lines of the third lines, regardless of a value of the first path selection signal PATH_SEL1. For example, in the compression read mode in which the compression enable signal COMP_EN is activated, the third path selection unit 2034 may connect two lines selected as the first selection lines, among four first lines, and two partial lines of the third lines, and connect two lines that have been selected as the second selection lines, among four second lines, and two remaining lines of the third lines, regardless of a value of the first path selection signal PATH_SEL1.

For reference, the compression enable signal COMP_EN and the first path selection signal PATH_SEL1 may each be a signal that is input from the outside of the memory device 150, and may be a signal the activation of which is controlled through a memory register set (MRS) within the memory device 150.

Figure 3A:
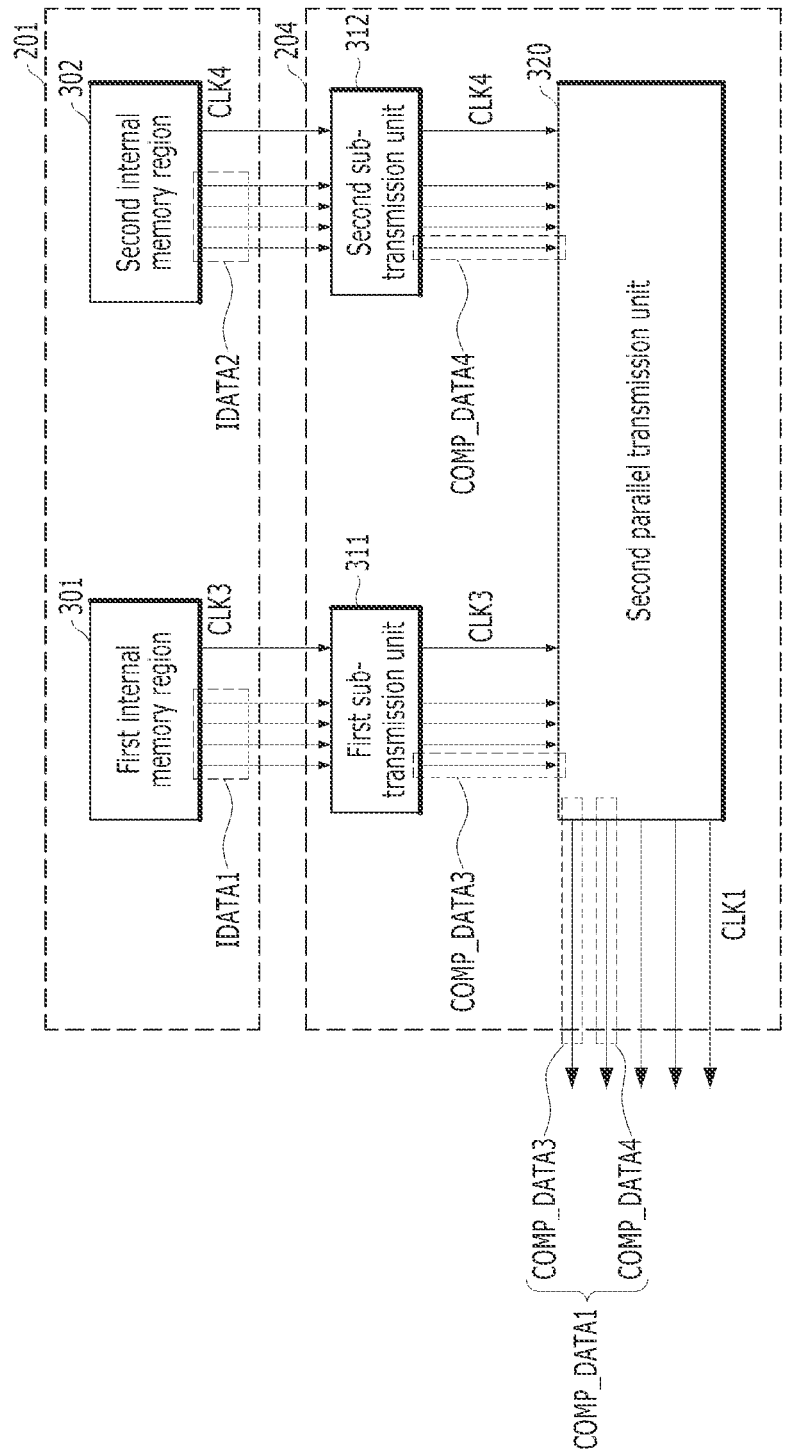
FIGS. 3A and 3B are diagrams for describing other examples of the memory device according to the first embodiment of the present disclosure, which performs a compression read operation.
Figure 3B:
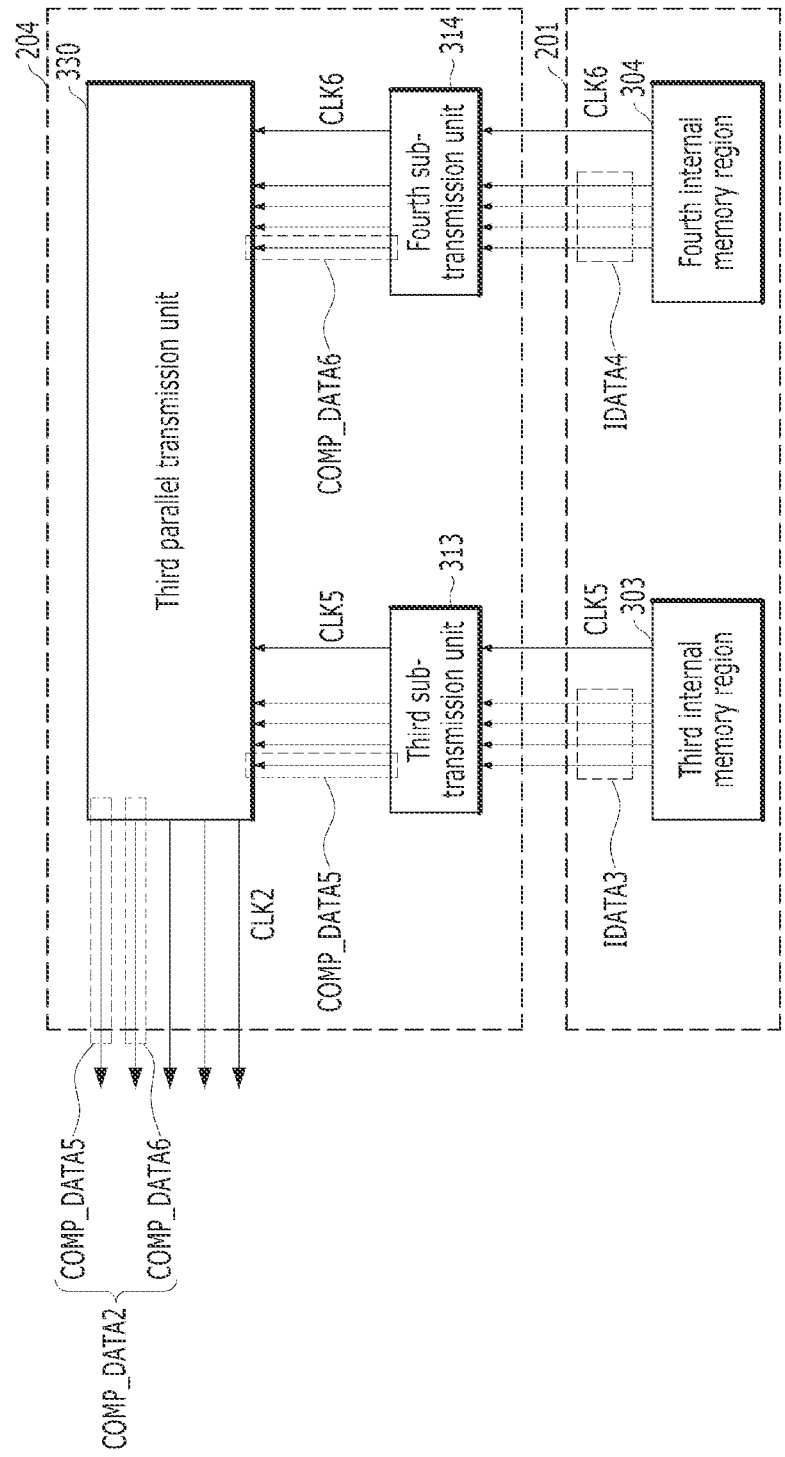

FIGS. 3A and 3B are diagrams for describing other examples of the memory device according to the first embodiment of the present disclosure, which performs a compression read operation.

FIG. 3A illustrates a construction of the first memory region 201 and the first transmission unit 204, which has another form, among the components of the memory device 150 disclosed in FIG. 1. That is, the first memory region 201 and the first transmission unit 204 disclosed in FIG. 1 may be substituted with components 301, 302, 311, 312, and 320 disclosed in FIG. 3A.

FIG. 3B illustrates a construction of the second memory region 202 and the second transmission unit 205, which has another form, among the components of the memory device 150 disclosed in FIG. 1. That is, the second memory region 202 and the second transmission unit 205 disclosed in FIG. 1 may be substituted with components 303, 304, 313, 314, and 330 disclosed in FIG. 3B.

First, referring to FIG. 3A along with FIG. 1, the first memory region 201 in FIG. 1 may be substituted with a first internal memory region 301 and a second internal memory region 302 in FIG. 3A. Furthermore, the first transmission unit 204 in FIG. 1 may be substituted with a first sub-transmission unit 311, a second sub-transmission unit 312, and a second parallel transmission unit 320 in FIG. 3A.

Furthermore, referring to FIG. 3B along with FIG. 1, the first memory region 201 in FIG. 1 may be substituted with a third internal memory region 303 and a fourth internal memory region 304 in FIG. 3B. Furthermore, the first transmission unit 204 in FIG. 1 may be substituted with a third sub-transmission unit 313, a fourth sub-transmission unit 314, and a third parallel transmission unit 330 in FIG. 3B.

Accordingly, it may be seen that data COMP_DATA1 and a clock CLK1 that are output by the second parallel transmission unit 320 in FIG. 3A are the same as the data COMP_DATA1 and the clock CLK1 that are transmitted from the first transmission unit 204 to the first parallel transmission unit 203 in FIG. 1. Furthermore, it may be seen that data COMP_DATA2 and a clock CLK2 that are output by the third parallel transmission unit 330 in FIG. 3B are the same as the data COMP_DATA2 and the clock CLK2 that are transmitted from the second transmission unit 205 to the first parallel transmission unit 203 in FIG. 1. That is, operations of the components 301, 302, 311, 312, and 320 disclosed in FIG. 3A and the components 303, 304, 313, 314, and 330 disclosed in FIG. 3B, and an operation of the first parallel transmission unit 203 disclosed in FIG. 1 may be performed in a connected form. For reference, the detailed construction and operation of the first parallel transmission unit 203 have already been described with reference to FIG. 1, and thus will be omitted hereinafter.

Referring to FIGS. 3A and 3B along with FIG. 1, the construction and operation of the first memory region 201 disclosed in FIG. 1 may be similar to a construction and operation of each of the first internal memory region 301 disclosed in FIG. 3A and the third internal memory region 303 disclosed in FIG. 3B.

Furthermore, the construction and operation of the second memory region 202 disclosed in FIG. 1 may be similar to the construction and operation of each of the second internal memory region 302 disclosed in FIG. 3A and the fourth internal memory region 304 disclosed in FIG. 3B.

Specifically, each of the first internal memory region 301, the second internal memory region 302, the third internal memory region 303, and the fourth internal memory region 304 may include multiple memory cells (not illustrated) for storing data. In this case, data that are input from the outside through a program operation may be stored in at least one region, among the first to fourth internal memory regions 301, 302, 303, and 304. Furthermore, data that have been stored in at least one region, among the first to fourth internal memory regions 301, 302, 303, and 304, may be output through a read operation. At this time, the first to fourth internal memory regions 301, 302, 303, and 304 may operate in a fully independent form.

Furthermore, analogous to the first memory region 201 and the second memory region 202 being disposed in regions that are physically divided in FIG. 1, the first internal memory region 301 and the second internal memory region 302 may be disposed in regions that are physically divided in FIG. 3A, and the third internal memory region 303 and the second internal memory region 304 may be disposed in regions that are physically divided in FIG. 3B. For example, the first internal memory region 301 may be disposed on one side of the first memory region 201, and the second internal memory region 302 may be disposed on the other side of the first memory region 201. Likewise, the third internal memory region 303 may be disposed on one side of the second memory region 202, and the fourth internal memory region 304 may be disposed on the other side of the second memory region 202. In this case, one side and the other side may be regions that are physically divided.

Furthermore, analogous to the first memory region 201 reading the data DATA1 that have been stored in the first memory region 201 in response to the first clock CLK1 and outputting the read data through the first lines in FIG. 1, the first internal memory region 301 may read data IDATA1 that have been stored in the first internal memory region 301 in response to a third clock CLK3 and output the read data through first sub-lines in FIG. 3A, and the third internal memory region 303 may read data IDATA3 that have been stored in the third internal memory region 303 in response to a fifth clock CLK5 and output the read data through third sub-lines in FIG. 3B.

Furthermore, analogous to the second memory region 202 reading the data DATA2 that have been stored in the second memory region 202 in response to the second clock CLK2 and outputting the read data through the second lines in FIG. 1, the second internal memory region 302 may read data IDATA2 that have been stored in the second internal memory region 302 in response to a fourth clock CLK4 and output the read data through second sub-lines in FIG. 3A, and the fourth internal memory region 304 may read data IDATA4 that have been stored in the fourth internal memory region 304 in response to a sixth clock CLK6 and output the read data through fourth sub-lines in FIG. 3B.

Furthermore, the construction and operation of the first transmission unit 204 disclosed in FIG. 1 may be similar to a construction and operation of each of the first sub-transmission unit 311 disclosed in FIG. 3A and the third sub-transmission unit 313 disclosed in FIG. 3B.

Furthermore, the construction and operation of the second transmission unit 205 disclosed in FIG. 1 may be similar to a construction and operation of each of the second sub-transmission unit 312 disclosed in FIG. 3A and the fourth sub-transmission unit 314 disclosed in FIG. 3B.

Specifically, analogous to the first transmission unit 204 disclosed in FIG. 1 transmitting data that are transmitted through the first lines between the first memory region 201 and the first parallel transmission unit 203, the first sub-transmission unit 311 disclosed in FIG. 3A may transmit data that are transmitted through the first sub-lines between the first internal memory region 301 and the second parallel transmission unit 320, and the third sub-transmission unit 313 disclosed in FIG. 3B may transmit data that are transmitted through the third sub-lines between the third internal memory region 303 and the third parallel transmission unit 330.

Furthermore, analogous to the second transmission unit 205 disclosed in FIG. 1 transmitting data that are transmitted through the second lines between the second memory region 202 and the first parallel transmission unit 203, the second sub-transmission unit 312 disclosed in FIG. 3A may transmit data that are transmitted through the second sub-lines between the second internal memory region 302 and the second parallel transmission unit 320, and the fourth sub-transmission unit 314 disclosed in FIG. 3B may transmit data that are transmitted through the fourth sub-lines between the fourth internal memory region 304 and the third parallel transmission unit 330.

More specifically, in a read operation included in the normal mode, the first sub-transmission unit 311 may transmit, to the second parallel transmission unit 320, data that have been read from the first internal memory region 301 through the first sub-lines in response to the third clock CLK3. Furthermore, in a read operation included in the normal mode, the second sub-transmission unit 312 may transmit, to the second parallel transmission unit 320, data that have been read from the second internal memory region 302 through the second sub-lines in response to the fourth clock CLK4. Furthermore, in a read operation included in the normal mode, the third sub-transmission unit 313 may transmit, to the third parallel transmission unit 330, data that have been read from the third internal memory region 303 through the third sub-lines in response to the fifth clock CLK5. Furthermore, in a read operation included in the normal mode, the fourth sub-transmission unit 314 may transmit, to the third parallel transmission unit 330, data that have been read from the fourth internal memory region 304 through the fourth sub-lines in response to the sixth clock CLK6.

Furthermore, in the compression read mode, the first sub-transmission unit 311 may compress the data IDATA1 read from the first internal memory region 301 into third compression data COMP_DATA3, and may transmit the third compression data COMP_DATA3 to the second parallel transmission unit 320 through third selection lines, among the first sub-lines, in response to the third clock CLK3. Furthermore, in the compression read mode, the second sub-transmission unit 312 may compress the data IDATA2 read from the second internal memory region 302 into fourth compression data COMP_DATA4, and may transmit the fourth compression data COMP_DATA4 to the second parallel transmission unit 320 through fourth selection lines, among the second sub-lines, in response to the fourth clock CLK4. Furthermore, in the compression read mode, the third sub-transmission unit 313 may compress the data IDATA3 read from the third internal memory region 303 into fifth compression data COMP_DATA5, and may transmit the fifth compression data COMP_DATA5 to the third parallel transmission unit 330 through fifth selection lines, among the third sub-lines, in response to the fifth clock CLK5. Furthermore, in the compression read mode, the fourth sub-transmission unit 314 may compress the data IDATA4 read from the fourth internal memory region 304 into sixth compression data COMP_DATA6, and may transmit the sixth compression data COMP_DATA6 to the third parallel transmission unit 330 through sixth selection lines, among the fourth sub-lines, in response to the sixth clock CLK6.

In this case, in the compression read mode, each of the first to fourth sub-transmission units 311, 312, 313, and 314 may generate each of the third to sixth compression data COMP_DATA3, COMP_DATA4, COMP_DATA5, and COMP_DATA6 by compressing each of the data IDATA1, IDATA2, IDATA3, and IDATA4 read from the internal memory regions 301, 302, 303, and 304 that have been connected to the first to fourth sub-transmission units 311, 312, 313, and 314, respectively, at a compression ratio of 1 to M, and may transmit each of the third to sixth compression data COMP_DATA3, COMP_DATA4, COMP_DATA5, and COMP_DATA6 through each of the third to sixth selection lines by selecting a 1/M number of sub-lines from each of the first to fourth sub-lines as each of the third to sixth selection lines. In this case, M may be a natural number greater than N, and N may be a natural number equal to or greater than 2. In this case, considering that each of the first and second transmission units 204 and 205 disclosed in FIG. 1 has generated each of the first and second compression data COMP_DATA1 and COMP_DATA2 by compressing each of the data DATA1 and DATA2 read from the memory regions 201 and 202 that have been connected to the first and second transmission units 204 and 205, respectively, at the compression ratio of 1 to N, it may be seen that the compression ratio of each of the first to fourth sub-transmission units 311, 312, 313, and 314 disclosed in FIGS. 3A and 3B is higher than the compression ratio of each of the first and second transmission units 204 and 205 disclosed in FIG. 1. For example, when N is 2 and M is 4, in the compression read mode, each of the first to fourth sub-transmission units 311, 312, 313, and 314 may generate each of the third to sixth compression data COMP_DATA3, COMP_DATA4, COMP_DATA5, and COMP_DATA6 by compressing each of the data IDATA1, IDATA2, IDATA3, and IDATA4 read from the internal memory regions 301, 302, 303, and 304 that have been connected to the first to fourth sub-transmission units 311, 312, 313, and 314, respectively, at a compression ratio of 1 to 4, that is, 25%, and may transmit each of the third to sixth compression data COMP_DATA3, COMP_DATA4, COMP_DATA5, and COMP_DATA6 through each of the third to sixth selection lines by selecting one sub-line from each of the first to fourth sub-lines, each one having four sub-lines, as each of the third to sixth selection lines.

Furthermore, the construction and operation of the first parallel transmission unit 203 disclosed in FIG. 1 may be similar to a construction and operation of each of the second parallel transmission unit 320 disclosed in FIG. 3A and the third parallel transmission unit 330 disclosed in FIG. 3B.

Specifically, analogous to the first parallel transmission unit 203 disclosed in FIG. 1 being connected to the first lines, the second lines, and the third lines and having the third lines selectively coupled to the first lines and the second lines, the second parallel transmission unit 320 may connect the first sub-lines and the second sub-lines to the first lines so that the first lines are selectively coupled to the first sub-lines and the second sub-lines, and the third parallel transmission unit 330 may connect the third sub-lines and the fourth sub-lines to the second lines so that the second lines are selectively coupled to the third sub-lines and the fourth sub-lines. In this case, it has been described that the number of first lines, the number of second lines, and the number of third lines are the same in FIG. 1. Accordingly, the number of first sub-lines, the number of second sub-lines, the number of third sub-lines, the number of fourth sub-lines, the number of first lines, the number of second lines, and the number of third lines may be the same number, that is, at least two. For example, as illustrated in FIGS. 1 and 3A and 3B, each of the number of first sub-lines, the number of second sub-lines, the number of third sub-lines, the number of fourth sub-lines, the number of first lines, the number of second lines, and the number of third lines may be four.

More specifically, in a read operation included in the normal mode, the second parallel transmission unit 320 may output data that have been read from the first internal memory region 301 and that have been transmitted through the first sub-lines, to the first parallel transmission unit 203 through the first lines, by connecting the first sub-lines and the first lines and simultaneously not connecting the second sub-lines and the first lines. Furthermore, in a read operation included in the normal mode, the second parallel transmission unit 320 may output data that have been read from the second internal memory region 302 and that have been transmitted through the second sub-lines, to the first parallel transmission unit 203 through the first lines, by connecting the second sub-lines and the first lines and simultaneously not connecting the first sub-lines and the first lines. That is, in the read operation included in the normal mode, the second parallel transmission unit 320 may operate in a time division form so that an interval in which the first sub-lines are connected to the first lines and an interval in which the second sub-lines are connected to the first lines do not overlap. Accordingly, the first lines can be selectively coupled to the first sub-lines and the second sub-lines.

Furthermore, in the compression read mode, the second parallel transmission unit 320 may connect partial lines of the first selection lines, among the first lines, and the third selection lines and simultaneously connect remaining lines of the first selection lines, among the first lines, and the fourth selection lines, may select, as the first clock CLK1, one having a lagging phase to the other between the third clock CLK3 and the fourth clock CLK4, and may transmit the third compression data COMP_DATA3 and the fourth compression data COMP_DATA4 in parallel through the first selection lines, among the first lines, in response to the first clock CLK1. That is, the second parallel transmission unit 320 may transmit the third compression data COMP_DATA3 that have been transmitted through the third selection lines and the fourth compression data COMP_DATA4 that have been transmitted through the fourth selection lines in parallel, through the first selection lines, among the first lines. Accordingly, the third compression data COMP_DATA3 and the fourth compression data COMP_DATA4 may be data corresponding to the first compression data COMP_DATA1 described with reference to FIG. 1. That is, the first compression data COMP_DATA1 may be data in which the third compression data COMP_DATA3 and the fourth compression data COMP_DATA4 have been combined in parallel. In this case, the number of third selection lines, the number of fourth selection lines, the number of the partial lines, among the first selection lines, and the number of the remaining lines, among the first selection lines may be the same number. For example, the number of third selection lines, the number of fourth selection lines, the number of the partial lines, among the first selection lines, and the number of the remaining lines, among the first selection lines, may each be one.

In particular, the second parallel transmission unit 320 may compare the phase of the third clock CLK3 that has been used to load the third compression data COMP_DATA3 onto the third selection lines and the phase of the fourth clock CLK4 that has been used to load the fourth compression data COMP_DATA4 onto the fourth selection lines, may select, as the first clock CLK1, one having a lagging phase to the other between the third clock CLK3 and the fourth clock CLK4, and may then transmit the third compression data COMP_DATA3 to the partial lines of the first selection lines, among the first lines, in response to the first clock CLK1 and transmit the fourth compression data COMP_DATA4 to the remaining lines of the first selection lines, among the first lines, in response to the first clock CLK1. That is, the second parallel transmission unit 320 may load the first compression data COMP_DATA1 in which the third compression data COMP_DATA3 and the fourth compression data COMP_DATA4 have been combined in parallel onto the first selection lines, among the first lines, in response to the first clock CLK1.

Furthermore, when the third clock CLK3 is selected as the first clock CLK1, the second parallel transmission unit 320 may delay timing at which the fourth compression data COMP_DATA4 are loaded onto the remaining lines of the first selection lines, among the first lines, by a third amount. That is, when the third clock CLK3 is selected as the first clock CLK1, the second parallel transmission unit 320 may load the third compression data COMP_DATA3 that have been transmitted through the third selection lines onto the partial lines of the first selection lines, among the first lines, in response to the first clock CLK1, may delay the fourth compression data COMP_DATA4 that have been transmitted through the fourth selection lines by the third amount, and may then load the delayed fourth compression data onto the remaining lines of the first selection lines, among the first lines, in response to the first clock CLK1. In this case, the third amount may correspond to a difference between the phases of the third clock CLK3 and the fourth clock CLK4 or may be predetermined.

Furthermore, when the fourth clock CLK4 is selected as the first clock CLK1, the second parallel transmission unit 320 may delay timing at which the third compression data COMP_DATA3 are loaded onto the partial lines of the first selection lines, among the first lines, by a fourth amount. That is, when the fourth clock CLK4 is selected as the first clock CLK1, the second parallel transmission unit 320 may load the fourth compression data COMP_DATA4 that have been transmitted through the fourth selection lines onto the remaining lines of the first selection lines, among the first lines, in response to the first clock CLK1, may delay the third compression data COMP_DATA3 that have been transmitted through the third selection lines by the fourth amount, and may then load the delayed third compression data onto the partial lines of the first selection lines, among the first lines, in response to the first clock CLK1. In this case, the fourth amount may correspond to a difference between the phases of the third clock CLK3 and the fourth clock CLK4 or may be predetermined.

Furthermore, in a read operation included in the normal mode, the third parallel transmission unit 330 may output data that have been read from the third internal memory region 303 and that have been transmitted through the third sub-lines, to the first parallel transmission unit 203 through the second lines, by connecting the third sub-lines and the second lines and simultaneously not connecting the fourth sub-lines and the second lines. Furthermore, in a read operation included in the normal mode, the third parallel transmission unit 330 may output data that have been read from the fourth internal memory region 304 and that have been transmitted through the fourth sub-lines, to the first parallel transmission unit 203 through the second lines, by connecting the fourth sub-lines and the second lines and simultaneously not connecting the third sub-lines and the second lines. That is, in the read operation included in the normal mode, the third parallel transmission unit 330 may operate in a time division form so that an interval in which the third sub-lines are connected to the second lines and an interval in which the fourth sub-lines are connected to the second lines do not overlap. Accordingly, the second lines can be selectively coupled to the third sub-lines and the fourth sub-lines. Furthermore, in the compression read mode, the third parallel transmission unit 330 may connect partial lines of the second selection lines, among the second lines, and the fifth selection lines and simultaneously connect remaining lines of the second selection lines, among the second lines, and the sixth selection lines, may select, as the second clock CLK2, one having a lagging phase to the other between the fifth clock CLK5 and the sixth clock CLK6, and may transmit the fifth compression data COMP_DATA5 and the sixth compression data COMP_DATA6 in parallel through the second selection lines, among the second lines, in response to the second clock CLK2. That is, the third parallel transmission unit 330 may transmit the fifth compression data COMP_DATA5 that have been transmitted through the fifth selection lines and the sixth compression data COMP_DATA6 that have been transmitted through the sixth selection lines in parallel through the second selection lines, among the second lines. Accordingly, the fifth compression data COMP_DATA5 and the sixth compression data COMP_DATA6 may be data corresponding to the second compression data COMP_DATA2 described with reference to FIG. 1. That is, the second compression data COMP_DATA2 may be data in which the fifth compression data COMP_DATA5 and the sixth compression data COMP_DATA6 have been combined in parallel. In this case, the number of fifth selection lines, the number of sixth selection lines, the number of the partial lines, among the second selection lines, and the number of the remaining lines, among the second selection lines, may be the same number. For example, the number of fifth selection lines, the number of sixth selection lines, the number of the partial lines, among the second selection lines, and the number of the remaining lines, among the second selection lines, may each be one.

In particular, the third parallel transmission unit 330 may compare the phase of the fifth clock CLK5 that has been used to load the fifth compression data COMP_DATA5 onto the fifth selection lines and the phase of the sixth clock CLK6 that has been used to load the sixth compression data COMP_DATA6 onto the sixth selection lines, may select, as the second clock CLK2, one having a lagging phase to the other between the fifth clock CLK5 and the sixth clock CLK6, and may then transmit the fifth compression data COMP_DATA5 to the partial lines of the second selection lines, among the second lines, in response to the second clock CLK2 and transmit the sixth compression data COMP_DATA6 to the remaining lines of the second selection lines, among the second lines, in response to the second clock CLK2. That is, the third parallel transmission unit 330 may load the second compression data COMP_DATA2 in which the fifth compression data COMP_DATA5 and the sixth compression data COMP_DATA6 have been combined in parallel onto the second selection lines, among the second lines, in response to the second clock CLK2.

Furthermore, when the fifth clock CLK5 is selected as the second clock CLK2, the third parallel transmission unit 330 may delay timing at which the sixth compression data COMP_DATA6 are loaded onto the remaining lines of the second selection lines, among the second lines, by the third amount. That is, when the fifth clock CLK5 is selected as the second clock CLK2, the third parallel transmission unit 330 may load the fifth compression data COMP_DATA5 that have been transmitted through the fifth selection lines onto the partial lines of the second selection lines, among the second lines, in response to the second clock CLK2, may delay the sixth compression data COMP_DATA6 that have been transmitted through the sixth selection lines by the third amount, and may then load the delayed fourth compression data onto the remaining lines of the second selection lines, among the second lines, in response to the second clock CLK2. In this case, the third amount may correspond to a difference between the phases of the fifth clock CLK5 and the sixth clock CLK6 or may be predetermined.

Furthermore, when the sixth clock CLK6 is selected as the second clock CLK2, the third parallel transmission unit 330 may delay timing at which the fifth compression data COMP_DATA5 are loaded onto the partial lines of the second selection lines, among the second lines, by the fourth amount. That is, when the sixth clock CLK6 is selected as the second clock CLK2, the third parallel transmission unit 330 may load the sixth compression data COMP_DATA6 that have been transmitted through the sixth selection lines onto the remaining lines of the second selection lines, among the second lines, in response to the second clock CLK2, may delay the fifth compression data COMP_DATA5 that have been transmitted through the fifth selection lines by the fourth amount, and may then load the delayed third compression data onto the partial lines of the second selection lines, among the second lines, in response to the second clock CLK2. In this case, the fourth amount may correspond to a difference between the phases of the fifth clock CLK5 and the sixth clock CLK6 or may be predetermined.

The memory device 150 may further include a third clock generation unit (not illustrated) for generating the third clock CLK3, a fourth clock generation unit (not illustrated) for generating the fourth clock CLK4, a fifth clock generation unit (not illustrated) for generating the fifth clock CLK5, and a sixth clock generation unit (not illustrated) for generating the sixth clock CLK6. In this case, the third clock generation unit may be disposed within the first internal memory region 301 or in a region that is physically adjacent to the first internal memory region 301. Furthermore, the fourth clock generation unit may be disposed within the second internal memory region 302 or in a region that is physically adjacent to the second internal memory region 302. In this case, the fifth clock generation unit may be disposed within the third internal memory region 303 or in a region that is physically adjacent to the third internal memory region 303. Furthermore, the sixth clock generation unit may be disposed within the fourth internal memory region 304 or in a region that is physically adjacent to the fourth internal memory region 304.

For example, if the third clock generation unit is disposed within the first internal memory region 301, as illustrated in FIG. 3A, the third clock CLK3 generated from the first internal memory region 301 may be transmitted to the first sub-transmission unit 311 and the second parallel transmission unit 320. Likewise, if the fourth clock generation unit is disposed within the second internal memory region 302, as illustrated in FIG. 3A, the fourth clock CLK4 generated from the second internal memory region 302 may be transmitted to the second sub-transmission unit 312 and the second parallel transmission unit 320. Furthermore, if the fifth clock generation unit is disposed within the third internal memory region 303, as illustrated in FIG. 3B, the fifth clock CLK5 generated from the third internal memory region 303 may be transmitted to the third sub-transmission unit 313 and the third parallel transmission unit 330. Likewise, if the sixth clock generation unit is disposed within the fourth internal memory region 304, as illustrated in FIG. 3B, the sixth clock CLK6 generated from the fourth internal memory region 304 may be transmitted to the fourth sub-transmission unit 314 and the third parallel transmission unit 330.

As another example, if the third clock generation unit is disposed in the region that is physically adjacent to the first internal memory region 301, unlike in FIG. 3A, the third clock CLK3 generated by the third clock generation unit that is disposed to be physically adjacent to the first internal memory region 301 may be input to the first internal memory region 301, the first sub-transmission unit 311, and the second parallel transmission unit 320. Likewise, if the fourth clock generation unit is disposed in the region that is physically adjacent to the second internal memory region 302, unlike in FIG. 3A, the fourth clock CLK4 generated by the fourth clock generation unit that is disposed to be physically adjacent to the second internal memory region 302 may be input to the second internal memory region 302, the second sub-transmission unit 312, and the second parallel transmission unit 320. Furthermore, if the fifth clock generation unit is disposed in the region that is physically adjacent to the third internal memory region 303, unlike in FIG. 3B, the fifth clock CLK5 generated by the fifth clock generation unit that is disposed to be physically adjacent to the third internal memory region 303 may be input to the third internal memory region 303, the third sub-transmission unit 313, and the third parallel transmission unit 330. Likewise, if the sixth clock generation unit is disposed in the region that is physically adjacent to the fourth internal memory region 304, unlike in FIG. 3B, the sixth clock CLK6 generated by the sixth clock generation unit that is disposed to be physically adjacent to the fourth internal memory region 304 may be input to the fourth internal memory region 304, the fourth sub-transmission unit 314, and the third parallel transmission unit 330.

For example, each of the first to fourth internal memory regions 301, 302, 303, and 304 disclosed in FIGS. 3A and 3B may be a plane including multiple memory blocks (not illustrated). Furthermore, each of the first to fourth sub-lines that are connected to the first to fourth internal memory regions 301, 302, 303, and 304, respectively, may be a data line that is connected to one plane. Furthermore, each of the first lines that are selectively coupled to the first and second sub-lines and the second lines that are selectively coupled to the third and fourth sub-lines may be a way that is selectively coupled to at least two data lines.

Figure 4A:
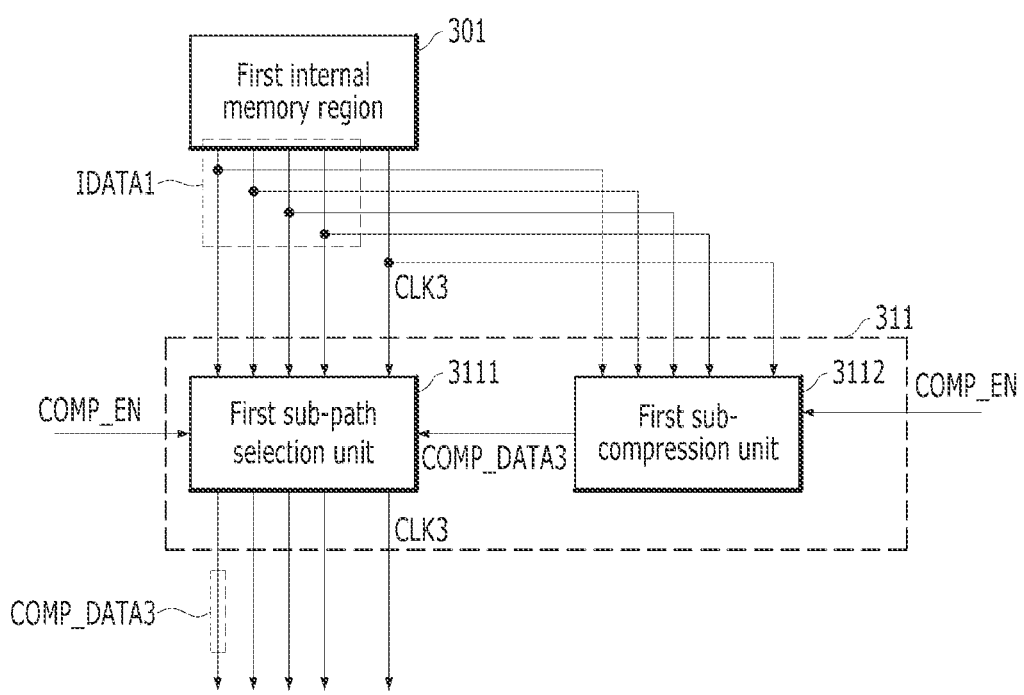
FIG. 4A is a diagram for describing a detailed construction of a first sub-transmission unit, among the components of the memory device according to the first embodiment of the present disclosure, which is disclosed in FIG. 3A.

FIG. 4A is a diagram for describing a detailed construction of the first sub-transmission unit, among the components of the memory device according to the first embodiment of the present disclosure, which is disclosed in FIG. 3A.

Figure 4B:
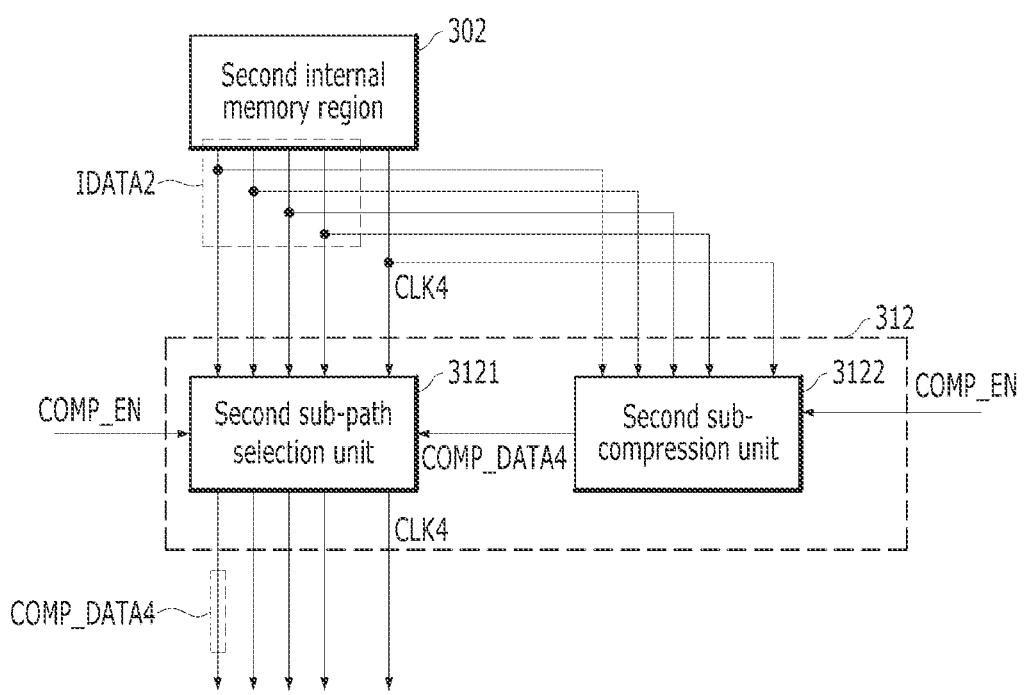
FIG. 4B is a diagram for describing a detailed construction of a second sub-transmission unit, among the components of the memory device according to the first embodiment of the present disclosure, which is disclosed in FIG. 3A.

FIG. 4B is a diagram for describing a detailed construction of the second sub-transmission unit, among the components of the memory device according to the first embodiment of the present disclosure, which is disclosed in FIG. 3A.

Figure 4C:
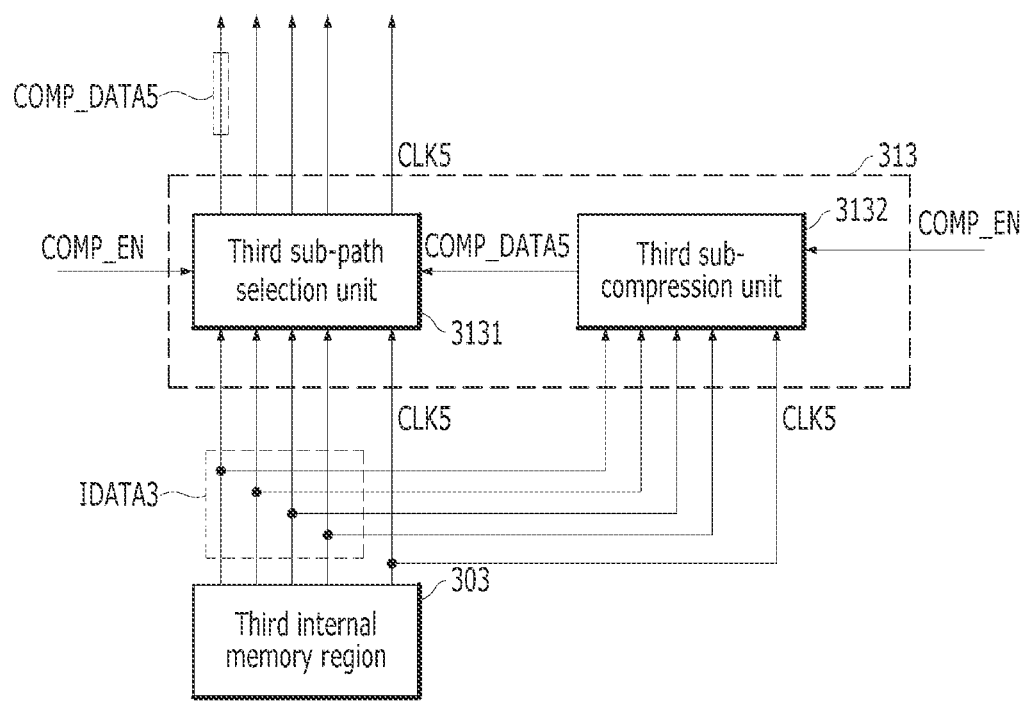
FIG. 4C is a diagram for describing a detailed construction of a third sub-transmission unit, among the components of the memory device according to the first embodiment of the present disclosure, which is disclosed in FIG. 3B.

FIG. 4C is a diagram for describing a detailed construction of the third sub-transmission unit, among the components of the memory device according to the first embodiment of the present disclosure, which is disclosed in FIG. 3B.

Figure 4D:
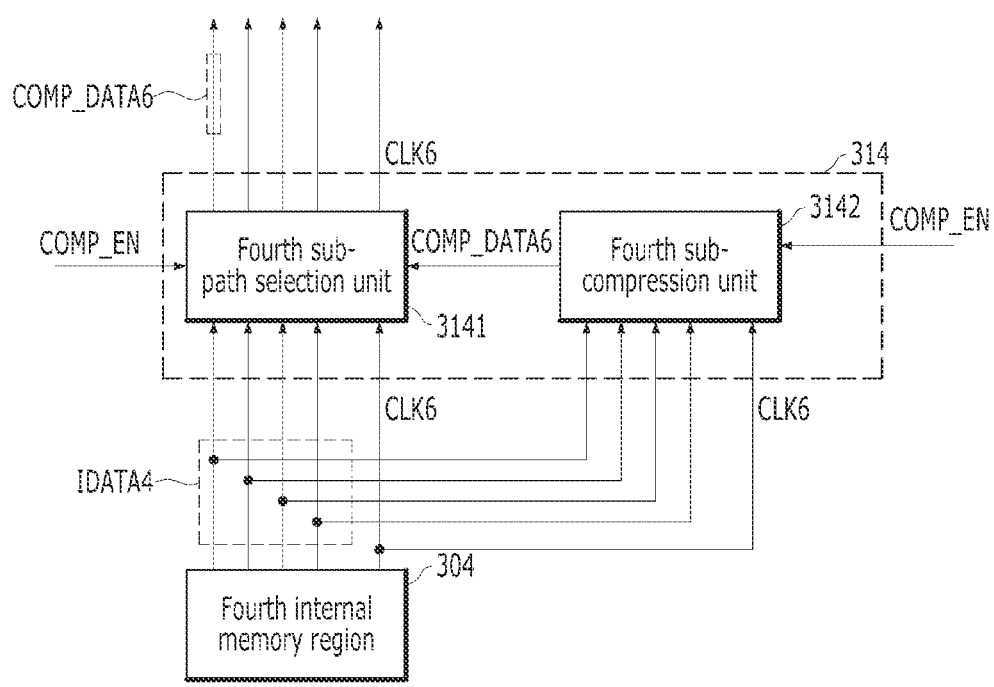
FIG. 4D is a diagram for describing a detailed construction of a fourth sub-transmission unit, among the components of the memory device according to the first embodiment of the present disclosure, which is disclosed in FIG. 3B.

FIG. 4D is a diagram for describing a detailed construction of the fourth sub-transmission unit, among the components of the memory device according to the first embodiment of the present disclosure, which is disclosed in FIG. 3B.

As described with reference to FIGS. 3A and 3B, the construction and operation of each of the first sub-transmission unit 311 disclosed in FIG. 3A and the third sub-transmission unit 313 disclosed in FIG. 3B may be similar to the construction and operation of the first transmission unit 204 disclosed in FIG. 1. Accordingly, a construction and operation of each of the first sub-transmission unit 311 that has been materialized in FIG. 4A and the third sub-transmission unit 313 disclosed in FIG. 4C may be similar to the construction and operation of the first transmission unit 204 that has been materialized in FIG. 2A.

Furthermore, the construction and operation of each of the second sub-transmission unit 312 disclosed in FIG. 3A and the fourth sub-transmission unit 314 disclosed in FIG. 3B may be similar to the construction and operation of the second transmission unit 205 disclosed in FIG. 1. Accordingly, a construction and operation of each of the second sub-transmission unit 312 that has been materialized in FIG. 4B and the fourth sub-transmission unit 314 disclosed in FIG. 4D may be similar to the construction and operation of the second transmission unit 205 that has been materialized in FIG. 2B.

Referring to FIGS. 4A to 4D, the first sub-transmission unit 311 may include a first sub-path selection unit 3111 and a first sub-compression unit 3112. Furthermore, the second sub-transmission unit 312 may include a second sub-path selection unit 3121 and a second sub-compression unit 3122. Furthermore, the third sub-transmission unit 313 may include a third sub-path selection unit 3131 and a first sub-compression unit 3132. Furthermore, the fourth sub-transmission unit 314 may include a fourth sub-path selection unit 3141 and a first sub-compression unit 3142.

Specifically, the first to fourth sub-compression units 3112, 3122, 3132, and 3142 may each be activated in the compression read mode in which the compression enable signal COMP_EN is activated, and may output the third to sixth compression data COMP_DATA3, COMP_DATA4, COMP_DATA5, and COMP_DATA6 to the first to fourth sub-path selection units 3111, 3121, 3131, and 3141, respectively, by compressing the data IDATA1, IDATA2, IDATA3, and IDATA4 read from the first to fourth internal memory regions 301, 302, 303, and 304 into the third to sixth compression data COMP_DATA3, COMP_DATA4, COMP_DATA5, and COMP_DATA6, respectively, in the activated state. That is, in the compression read mode, each of the first to fourth sub-compression units 3112, 3122, 3132, and 3142 may generate each of the third to sixth compression data COMP_DATA3, COMP_DATA4, COMP_DATA5, and COMP_DATA6 by compressing each of the data IDATA1, IDATA2, IDATA3, and IDATA4 read from the first to fourth internal memory regions 301, 302, 303, and 304, respectively, at a compression ratio of 1 to M, and may output each of the generated third to sixth compression data COMP_DATA3, COMP_DATA4, COMP_DATA5, and COMP_DATA6 to each of the first to fourth sub-path selection units 3111, 3121, 3131, and 3141. In this case, N may be a natural number equal to or greater than 2, and M may be a natural number greater than N. In this case, considering that each of the first and second compression units 2042 and 2052 disclosed in FIGS. 2A and 2B has generated each of the first and second compression data COMP_DATA1 and COMP_DATA2 by compressing each of the data DATA1 and DATA2 read from the memory regions 201 and 202 that have been connected to the first and second compression units 2042 and 2052, respectively, at the compression ratio of 1 to N, it may be seen that the compression ratio of each of the first to fourth sub-transmission units 311, 312, 313, and 314 disclosed in FIGS. 4A to 4D is higher than the compression ratio of each of the first and second compression units 2042 and 2052 disclosed in FIGS. 2A and 2B. For example, when N is 2 and M is 4, in the compression read mode, each of the first to fourth sub-compression units 3112, 3122, 3132, and 3142 may generate each of the third to sixth compression data COMP_DATA3, COMP_DATA4, COMP_DATA5, and COMP_DATA6 by compressing each of the read data IDATA1, IDATA2, IDATA3, and IDATA4 read from the first to fourth internal memory regions 301, 302, 303, and 304, respectively, at a compression ratio of 1 to 4, that is, 25%.

Furthermore, the first to fourth sub-compression units 3112, 3122, 3132, and 3142 may each be deactivated in the normal mode in which the compression enable signal COMP_EN is deactivated.

Furthermore, in a read operation included in the normal mode in which the compression enable signal COMP_EN is deactivated, the first and second sub-path selection units 3111 and 3121 and the third and fourth sub-path selection units 3131 and 3141 may transmit the data IDATA1 and IDATA2 and the data IDATA3 and IDATA4 read from the first and second internal memory regions 301 and 302 and the third and fourth internal memory regions 303 and 304, respectively, to the second and third parallel transmission units 320 and 330, respectively, through the first and second sub-lines and the third and fourth sub-lines, respectively, in response to the third and fourth clocks CLK3 and CLK4 and the fifth and sixth clocks CLK5 and CLK6, respectively. For example, in a read operation included in the normal mode in which the compression enable signal COMP_EN is deactivated, the first and second sub-path selection units 3111 and 3121 and the third and fourth sub-path selection units 3131 and 3141 may transmit the data IDATA1 and IDATA2 and the data IDATA3 and IDATA4 read from the first and second internal memory regions 301 and 302 and the third and fourth internal memory regions 303 and 304, respectively, through the first and second sub-lines and the third and fourth sub-lines, each one having four sub-lines, respectively, to the second and third parallel transmission units 320 and 330, respectively, which are output through the first and second sub-lines and the third and fourth sub-lines, each one having four sub-lines, respectively.

Furthermore, in the compression read mode in which the compression enable signal COMP_EN is activated, the first and second sub-path selection units 3111 and 3121 and the third and fourth sub-path selection units 3131 and 3141 may transmit the third and fourth compression data COMP_DATA3 and COMP_DATA4 and the fifth and sixth compression data COMP_DATA5 and COMP_DATA6, transmitted by the first and second sub-compression units 3112 and 3122 and the third and fourth sub-compression units 3132 and 3142, respectively, to the second and third parallel transmission units 320 and 330, respectively, through the third and fourth selection lines and the fifth and sixth selection lines, among the first to fourth sub-lines, in response to the third and fourth clocks CLK3 and CLK4 and the fifth and sixth clocks CLK5 and CLK6, respectively. That is, in the compression read mode, each of the first to fourth sub-path selection units 3111, 3121, 3131, and 3141 may select, as each of the third to sixth selection lines, a 1/M number of lines from each of the third to sixth selection lines, and may load each of the third to sixth compression data COMP_DATA3, COMP_DATA4, COMP_DATA5, and COMP_DATA6 transmitted by the first to fourth sub-compression units 3112, 3122, 3132, and 3142, respectively, onto each of the third to sixth selection lines in response to each of the third and sixth clocks CLK3, CLK4, CLK5, and CLK6. In this case, N may be a natural number equal to or greater than 2, and M may be a natural number greater than N. For example, when N is 2 and M is 4, each of the first to fourth sub-path selection units 3111, 3121, 3131, and 3141 may load each of the third to sixth compression data COMP_DATA3, COMP_DATA4, COMP_DATA5, and COMP_DATA6 onto each of the first to fourth sub-lines, by selecting one sub-line from each of the first to fourth sub-lines, each one having four sub-lines, as each of the third to sixth selection lines.

FIG. 4E is a diagram for describing a detailed construction of the second parallel transmission unit, among the components of the memory device according to the first embodiment of the present disclosure, which is disclosed in FIG. 3A.

FIG. 4F is a diagram for describing a detailed construction of the third parallel transmission unit, among the components of the memory device according to the first embodiment of the present disclosure, which is disclosed in FIG. 3B.

As described with reference to FIGS. 3A and 3B, the construction and operation of each of the second parallel transmission unit 320 disclosed in FIG. 3A and the third parallel transmission unit 330 disclosed in FIG. 3B may be similar to the construction and operation of the first parallel transmission unit 203 disclosed in FIG. 1. Accordingly, a construction and operation of each of the second parallel transmission unit 320 that has been materialized in FIG. 4E and the third parallel transmission unit 330 disclosed in FIG. 4F may be similar to the construction and operation of the first parallel transmission unit 203 that has been materialized in FIG. 2C.

Referring to FIGS. 4E and 4F, the second parallel transmission unit 320 may include a second clock comparison unit 321, a third delay control unit 322, a fourth delay control unit 323, and a fifth sub-path selection unit 324. Furthermore, the second parallel transmission unit 330 may include a third clock comparison unit 331, a fifth delay control unit 332, a sixth delay control unit 333, and a sixth sub-path selection unit 334.

Specifically, in the compression read mode in which the compression enable signal COMP_EN is activated, the second and third clock comparison units 321 and 331 may compare the phases of the third and fifth clocks CLK3 and CLK5 and the phases of the fourth and sixth clocks CLK4 and CLK6, respectively, and may output the first and second clocks CLK1 and CLK2 to the fifth and sixth sub-path selection units 324 and 334, respectively, by respectively selecting, as the first and second clocks CLK1 and CLK2, ones having lagging phases to the others between the third clock CLK3 and the fourth clock CLK4 and between the fifth clock CLK5 and the sixth clock CLK6. That is, in the compression read mode, the second and third clock comparison units 321 and 331 may compare the phases of the third and fifth clocks CLK3 and CLK5 that have been used to load the third and fifth compression data COMP_DATA3 and COMP_DATA5 onto the third and fifth selection lines, respectively, and the phases of the fourth and sixth clocks CLK4 and CLK6 that have been used to load the fourth and sixth compression data COMP_DATA4 and COMP_DATA6 onto the fourth and sixth selection lines, respectively, and may respectively select, as the first and second clocks CLK1 and CLK2, ones having lagging phases to the others between the third clock CLK3 and the fourth clock CLK4 and between the fifth clock CLK5 and the sixth clock CLK6. In this case, the second and third clock comparison units 321 and 331 may control operations of the respective third and fifth delay control units 322 and 332 and the respective fourth and sixth delay control units 323 and 333 by generating second and third selection result signals CSEL2 and CSEL3, respectively. According to an embodiment, the second and third clock comparison units 321 and 331 may generate the second and third selection result signals CSEL2 and CSEL3 the values of which are adjusted, respectively, depending on which one of the third and fifth clocks CLK3 and CLK5 and which one of the fourth and sixth clocks CLK4 and CLK6 have been selected as the first and second clocks CLK1 and CLK2, respectively, and may output the second and third selection result signals CSEL2 and CSEL3 to the third and fifth delay control units 322 and 332 and the fourth and sixth delay control units 323 and 333, respectively. According to another embodiment, the second and third clock comparison units 321 and 331 may generate the second and third selection result signals CSEL2 and CSEL3 the values of which are adjusted based on which one of the third and fifth clocks CLK3 and CLK5 and which one of the fourth and sixth clocks CLK4 and CLK6 have been selected as the first and second clocks CLK1 and CLK2, respectively, and a difference between the phases of the third and fifth clocks CLK3 and CLK5 and a difference between the phases of the fourth and sixth clocks CLK4 and CLK6, respectively, and may output the second and third selection result signals CSEL2 and CSEL3 to the third and fifth delay control units 322 and 332 and the fourth and sixth delay control units 323 and 333, respectively.

Furthermore, the second and third clock comparison units 321 and 331 may each be deactivated in the normal mode in which the compression enable signal COMP_EN is deactivated, may generate the second and third selection result signals CSEL2 and CSEL3, each one having an initial value, in the deactivated state, and may output the second and third selection result signals CSEL2 and CSEL3 to the third and fifth delay control units 322 and 332 and the fourth and sixth delay control units 323 and 333, respectively.

Furthermore, the third and fifth delay control units 322 and 332 may output the fourth and sixth compression data COMP_DATA4 and COMP_DATA6 by delaying the fourth and sixth compression data COMP_DATA4 and COMP_DATA6 by the third and fifth amounts, respectively, in response to the second and third selection result signals CSEL2 and CSEL3, respectively. Specifically, the third and fifth delay control units 322 and 332 may delay the fourth and sixth compression data COMP_DATA4 and COMP_DATA6 that have been transmitted through the fourth and sixth selection lines, respectively, by the third and fifth amounts, respectively, in response to the second and third selection result signals CSEL2 and CSEL3 having values corresponding to the third and fifth clocks CLK3 and CLK5 being selected as the first and second clocks CLK1 and CLK2, respectively, and may then output the delayed fourth and sixth compression data DLY_COMP_DATA4 and DLY_COMP_DATA6 to the fifth and sixth sub-path selection units 324 and 334, respectively. Furthermore, the third and fifth delay control units 322 and 332 may output the fourth and sixth compression data COMP_DATA4 and COMP_DATA6 that have been transmitted through the fourth and sixth selection lines to the fifth and sixth sub-path selection units 324 and 334, respectively, in response to the second and third selection result signals CSEL2 and CSEL3 having values corresponding to the fourth and sixth clocks CLK4 and CLK6 being selected as the first and second clocks CLK1 and CLK2, respectively. According to an embodiment, the third and fifth delay control units 322 and 332 may delay the fourth and sixth compression data COMP_DATA4 and COMP_DATA6 by the third and fifth amounts, respectively. According to another embodiment, the third and fifth delay control units 322 and 332 may adjust the third and fifth amounts, respectively, in response to the second and third selection result signals CSEL2 and CSEL3, and may delay the fourth and sixth compression data COMP_DATA4 and COMP_DATA6 by the adjusted third and fifth amounts, respectively. Furthermore, the third and fifth delay control units 322 and 332 may output data that have been transmitted through the first and third sub-lines to the fifth and sixth sub-path selection units 324 and 334, respectively, in response to the second and third selection result signals CSEL2 and CSEL3 having initial values, respectively.

Furthermore, the fourth and sixth delay control units 323 and 333 may output the third and fifth compression data COMP_DATA3 and COMP_DATA5, respectively, by delaying the third and fifth compression data COMP_DATA3 and COMP_DATA5 by fourth and sixth amounts, respectively, in response to the second and third selection result signals CSEL2 and CSEL3, respectively. That is, the fourth and sixth delay control units 323 and 333 may delay the third and fifth compression data COMP_DATA3 and COMP_DATA5 that have been transmitted through the third and fifth selection lines, respectively, by the third and fifth amounts in response to the second and third selection result signals CSEL2 and CSEL3 having values corresponding to the fourth and sixth clocks CLK4 and CLK6 being selected as the first and second clocks CLK1 and CLK2, respectively, and may output the delayed third and fifth compression data DLY_COMP_DATA3 and DLY_COMP_DATA5 to the fifth and sixth sub-path selection units 324 and 334, respectively. Furthermore, the fourth and sixth delay control units 323 and 333 may output the third and fifth compression data COMP_DATA3 and COMP_DATA5 that have been transmitted through the third and fifth selection lines, respectively, to the fifth and sixth sub-path selection units 324 and 334 in response to the second and third selection result signals CSEL2 and CSEL3 having values corresponding to the third and fifth clocks CLK3 and CLK5 being selected as the first and second clocks CLK1 and CLK2, respectively. According to an embodiment, the fourth and sixth delay control units 323 and 333 may delay the third and fifth compression data COMP_DATA3 and COMP_DATA5 by the fourth and sixth amounts, respectively. According to another embodiment, the fourth and sixth delay control units 323 and 333 may adjust the fourth and sixth amounts in response to the second and third selection result signals CSEL2 and CSEL3, respectively, and may delay the third and fifth compression data COMP_DATA3 and COMP_DATA5 by the adjusted fourth and sixth amounts, respectively. Furthermore, the fourth and sixth delay control units 323 and 333 may output data that have been transmitted through the second and fourth sub-lines, respectively, to the fifth and sixth sub-path selection units 324 and 334 in response to the second and third selection result signals CSEL2 and CSEL3 having initial values, respectively.

Furthermore, in a read operation included in the normal mode in which the compression enable signal COMP_EN is deactivated, the fifth and sixth sub-path selection units 324 and 334 may connect the first and third sub-lines and the first and second lines, respectively, and might not connect the second and fourth sub-lines and the first and second lines, respectively, in response to second and third path selection signals PATH_SEL2 and PATH_SEL3 each having the first value, respectively. For example, in a read operation included in the normal mode in which the compression enable signal COMP_EN is deactivated, the fifth and sixth sub-path selection units 324 and 334 may connect the first and third sub-lines, each one having four sub-lines, and the first and second lines, each one having four lines, respectively, and simultaneously might not connect the second and fourth sub-lines, each one having four sub-lines, and the first and second lines, each one having four lines, respectively, in response to the second and third path selection signals PATH_SEL2 and PATH_SEL3 each having the first value, respectively.

Furthermore, in a read operation included in the normal mode in which the compression enable signal COMP_EN is deactivated, the fifth and sixth sub-path selection units 324 and 334 may connect the second and fourth sub-lines and the first and second lines, respectively, and might not connect the first and third sub-lines and the first and second lines, respectively, in response to the second and third path selection signals PATH_SEL2 and PATH_SEL3 having the second values, respectively. For example, in a read operation included in the normal mode in which the compression enable signal COMP_EN is deactivated, the fifth and sixth sub-path selection units 324 and 334 may connect the second and fourth sub-lines, each one having four sub-lines, and the first and second lines, each one having four lines, respectively, and simultaneously might not connect the first and third sub-lines, each one having four sub-lines, and the first and second lines, each one having four lines, respectively, in response to the second and third path selection signals PATH_SEL2 and PATH_SEL3 each having the second value, respectively.

Furthermore, in the compression read mode in which the compression enable signal COMP_EN is activated, the fifth and sixth sub-path selection units 324 and 334 may connect partial lines, among the third and fifth selection lines, and the partial lines, among the first and second selection lines, respectively, and connect remaining lines, among the fourth and sixth selection lines, and the remaining lines, respectively, among the first and second selection lines, regardless of values of the second and third path selection signals PATH_SEL2 and PATH_SEL3, respectively. For example, in the compression read mode in which the compression enable signal COMP_EN is activated, the fifth and sixth sub-path selection units 324 and 334 may connect the third and fifth selection lines and the partial lines, among the first and second selection lines, respectively, and connect the fourth and sixth selection lines and the remaining lines, among the first and second selection lines, respectively, regardless of values of the second and third path selection signals PATH_SEL2 and PATH_SEL3, respectively.

For reference, the compression enable signal COMP_EN and the second and third path selection signals PATH_SEL2 and PATH_SEL3 may each be a signal that is input from the outside of the memory device 150, and may be a signal the activation of which is controlled through a memory register set (MRS) within the memory device 150.

Second Embodiment

Figure 5:
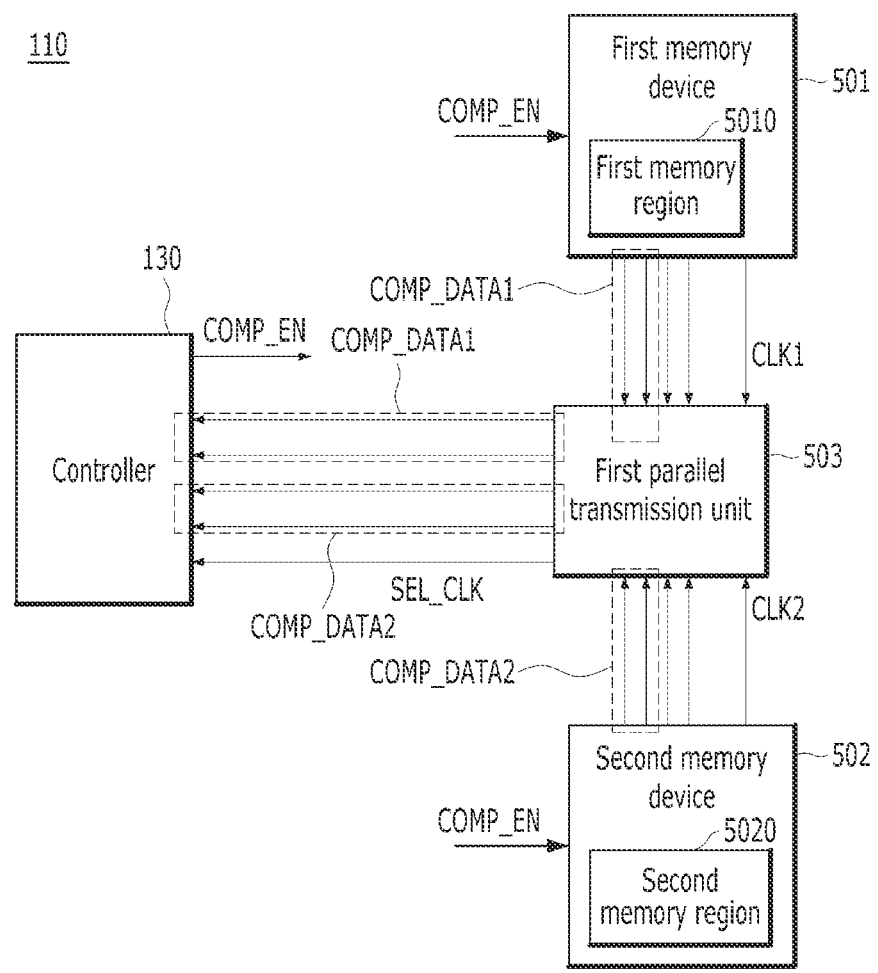
FIG. 5 is a diagram for describing an example of a compression read operation that is performed in a memory system including multiple memory devices according to a second embodiment of the present disclosure.

FIG. 5 is a diagram for describing an example of a compression read operation that is performed in a memory system including multiple memory devices according to a second embodiment of the present disclosure.

Referring to FIG. 5, a memory system 110 according to the second embodiment of the present disclosure may include a first memory device 501, a second memory device 502, and a first parallel transmission unit 503.

Specifically, the first memory device 501 may include a first memory region 5010 including multiple memory cells (not illustrated) for storing data.

Furthermore, the second memory device 502 may include a second memory region 5020 including multiple memory cells (not illustrated) for storing data.

More specifically, the first memory device 501 may be connected to the first lines and may read data stored in the first memory region 5010 within the first memory device 501 in response to a first clock CLK1. Furthermore, the first memory device 501 may output data read from the first memory region 5010 within the first memory device 501 through the first lines. In this case, the first lines may be a line for connecting the first memory device 501 and the first parallel transmission unit 503.

Furthermore, the second memory device 502 may be connected to second lines and may read data stored in the second memory region 5020 within the second memory device 502 in response to a second clock CLK2. Furthermore, the second memory device 502 may output data read from the second memory region 5020 within the second memory device 502 through the second lines. In this case, the second lines may be a line for connecting the second memory device 502 and the first parallel transmission unit 503.

Furthermore, in a read operation included in the normal mode, the first memory device 501 may transmit to the first parallel transmission unit 503, data read from the first memory region 5010 within the first memory device 501 through the first lines in response to the first clock CLK1.

Furthermore, in the compression read mode, the first memory device 501 may compress data read from the first memory region 5010 within the first memory device 501 into first compression data COMP_DATA1, and may transmit the first compression data COMP_DATA1 to the first parallel transmission unit 503 through the first selection lines, among the first lines, in response to the first clock CLK1. In this case, in the compression read mode, the first memory device 501 may generate the first compression data COMP_DATA1 by compressing the data read from the first memory region 5010 at a compression ratio of 1 to N, and may transmit the first compression data COMP_DATA1 through first selection lines by selecting, as the first selection lines, 1/N number of the first lines. In this case, N may be a natural number equal to or greater than 2. For example, when N is 2, in the compression read mode, the first memory device 501 may generate the first compression data COMP_DATA1 by compressing the data read from the first memory region 5010 at a compression ratio of 1 to 2, that is, 50%, and may transmit the first compression data COMP_DATA1 through the first selection lines by selecting two first lines, among four first lines, as the first selection lines.

Furthermore, in a read operation included in the normal mode, the second memory device 502 may transmit to the first parallel transmission unit 503, data read from the second memory region 5020 within the second memory device 502 through the second lines in response to the second clock CLK2.

Furthermore, in the compression read mode, the second memory device 502 may compress data read from the second memory region 5020 within the second memory device 502 into second compression data COMP_DATA2, and may transmit the second compression data COMP_DATA2 to the first parallel transmission unit 503 through second selection lines, among the second lines, in response to the second clock CLK2. In this case, in the compression read mode, the second memory device 502 may generate the second compression data COMP_DATA2 by compressing the data read from the second memory region 502० within the second memory device 502 at a compression ratio of 1 to N, and may transmit the second compression data COMP_DATA2 through the second selection lines by selecting, as the second selection lines, 1/N number of the second lines. In this case, N may be a natural number equal to or greater than 2. For example, when N is 2, in the compression read mode, the second memory device 502 may generate the second compression data COMP_DATA2 by compressing the data read from the second memory region 502० at a compression ratio of 1 to 2, that is, 50%, and may transmit the second compression data COMP_DATA2 through the second selection lines by selecting two second lines, among four second lines, as the second selection lines.

Furthermore, the first parallel transmission unit 503 may be connected to the first lines, the second lines, and third lines, and may have the third lines selectively coupled to the first lines and the second lines. In this case, the number of first lines, the number of second lines, and the number of third lines may be the same number, that is, at least two lines. For example, as illustrated in FIG. 5, each of the number of first lines, the number of second lines, and the number of third lines may be four. Furthermore, the third lines may be connected to a controller 130.

More specifically, in a read operation included in the normal mode, the first parallel transmission unit 503 may output, to the controller 130, data that have been read from the first memory device 501 and that have been transmitted through the first lines by connecting the first lines and the third lines and simultaneously not connecting the second lines and the third lines. For example, in a read operation included in the normal mode, the first parallel transmission unit 503 may connect four first lines and four third lines, and simultaneously might not connect four second lines to the four third lines.

Furthermore, in a read operation included in the normal mode, the first parallel transmission unit 503 may output, to the controller 130, data that have been read from the second memory device 502 and that have been transmitted through the second lines by connecting the second lines and the third lines and simultaneously not connecting the first lines and the third lines. For example, in a read operation included in the normal mode, the first parallel transmission unit 503 may connect four second lines and four third lines, and simultaneously might not connect four first lines and the four third lines.

That is, in the read operation included in the normal mode, the first parallel transmission unit 503 may operate in a time division form so that an interval in which the first lines are connected to the third lines and an interval in which the second lines are connected to the third lines do not overlap. Accordingly, the third lines can be selectively coupled to the first lines and the second lines.

Furthermore, in the compression read mode, the first parallel transmission unit 503 may connect the partial lines of the third lines and the first selection lines and simultaneously connect the remaining lines of the third lines and the second selection lines, may select, as the selection clock SEL_CLK, one having a lagging phase to the other between the first clock CLK1 and the second clock CLK2, and may transmit the first compression data COMP_DATA1 and the second compression data COMP_DATA2 in parallel through the third lines in response to the selection clock SEL_CLK. In this case, the number of first selection lines, the number of second selection lines, the number of the partial lines of the third lines, and the number of the remaining lines of the third lines may be the same number. For example, as illustrated in FIG. 5, each of the number of first selection lines, the number of second selection lines, the number of the partial lines of the third lines, and the number of the remaining lines of the third lines may be two.

For example, in the compression read mode, the first parallel transmission unit 503 may transmit the first compression data COMP_DATA1 through the partial lines of the third lines, by connecting two lines selected as the first selection lines, among four first lines, and two partial lines of the third lines, and may simultaneously transmit the second compression data COMP_DATA2 through the remaining lines of the third lines, by connecting two lines selected as the second selection lines, among four second lines, and two remaining lines of the third lines. That is, the first parallel transmission unit 503 may transmit the first compression data COMP_DATA1 that have been transmitted through the first selection lines and the second compression data COMP_DATA2 that have been transmitted through the second selection lines in parallel through the third lines.

In particular, the first parallel transmission unit 503 may compare the phase of the first clock CLK1 that has been used in the first memory device 501 in order to load the first compression data COMP_DATA1 onto the first selection lines and the phase of the second clock CLK2 that has been used in the second memory device 502 in order to load the second compression data COMP_DATA2 onto the second selection lines, may select, as the selection clock SEL_CLK, one having a lagging phase to the other between the first clock CLK1 and the second clock CLK2, and may then transmit the first compression data COMP_DATA1 to the partial lines of the third lines in response to the selection clock SEL_CLK and transmit the second compression data COMP_DATA2 to the remaining lines of the third lines in response to the selection clock SEL_CLK. That is, the first parallel transmission unit 503 may load the first compression data COMP_DATA1 and the second compression data COMP_DATA2 onto the third lines in response to the selection clock SEL_CLK.

Furthermore, the first parallel transmission unit 503 may adjust timing at which the first compression data COMP_DATA1 are loaded onto the partial lines of the third lines or timing at which the second compression data COMP_DATA2 are loaded onto the remaining lines of the third lines, depending on which one of the first clock CLK1 and the second clock CLK2 is selected as the selection clock SEL_CLK.

More specifically, when the first clock CLK1 is selected as the selection clock SEL_CLK, the first parallel transmission unit 503 may delay the timing at which the second compression data COMP_DATA2 are loaded onto the remaining lines of the third lines by a first amount. That is, when the first clock CLK1 is selected as the selection clock SEL_CLK, the first parallel transmission unit 503 may load the first compression data COMP_DATA1 that have been transmitted through the first selection lines onto the partial lines of the third lines in response to the selection clock SEL_CLK, may delay the second compression data COMP_DATA2 that have been transmitted through the second selection lines by the first amount, and may then load the delayed second compression data onto the remaining lines of the third lines in response to the selection clock SEL_CLK.

In this case, the first amount may correspond to a difference between the phases of the first clock CLK1 and the second clock CLK2 or may be predetermined.

Furthermore, when the second clock CLK2 is selected as the selection clock SEL_CLK, the first parallel transmission unit 503 may delay the timing at which the first compression data COMP_DATA1 are loaded onto the partial lines of the third lines by a second amount. That is, when the second clock CLK2 is selected as the selection clock SEL_CLK, the first parallel transmission unit 503 may load the second compression data COMP_DATA2 that have been transmitted through the second selection lines onto the remaining lines of the third lines in response to the selection clock SEL_CLK, may delay the first compression data COMP_DATA1 that have been transmitted through the first selection lines by the second amount, and may then load the delayed first compression data onto the partial lines of the third lines in response to the selection clock SEL_CLK. In this case, the second amount may correspond to a difference between the phases of the first clock CLK1 and the second clock CLK2 or may be predetermined.

Furthermore, according to an embodiment, the first memory device 501, the second memory device 502, and the controller 130 may be components that are functionally divided. Furthermore, according to an embodiment, the first memory device 501, the second memory device 502, and the controller 130 may be implemented by one semiconductor device chip or multiple semiconductor device chips. According to an embodiment, in the case of the memory system 110 that requires a high degree of integration, the first memory device 501, the second memory device 502, and the controller 130 may be constructed as one semiconductor device chip.

According to an embodiment, the memory system 110 may be implemented by using any of various types of storage devices, such as a solid state drive (SSD), an MMC, an embedded MMC (eMMC), a reduced size MMC (RS-MMC), a multi media card (MMC) having a micro-MMC form, a secure digital (SD) card having an SD, mini-SD, or micro-SD form, a universal serial bus (USB) storage device, a universal flash storage (UFS) device, a compact flash (CF) card, a smart media card, and a memory stick.

Furthermore, the controller 130 may control each of the first memory device 501 and the second memory device 502 in order to perform a read, program, or erase operation corresponding to a command that is input from a host, and may independently control an operation of each of the first memory device 501 and the second memory device 502 regardless of a command that is input from an external device, such as the host.

According to an embodiment, each of the first memory device 501 and the second memory device 502 may be a volatile memory device, such as double data rate synchronous dynamic random access memory (DDR SDRAM), low power double data rate4 (LPDDR4) SDRAM, graphics double data rate (GDDR) SDRAM, low power DDR (LPDDR), or Rambus dynamic random access memory (RDRAM). According to another embodiment, each of the first memory device 501 and the second memory device 502 may be a nonvolatile memory device, such as NAND flash memory, vertical NAND flash memory, NOR flash memory, resistive random access memory (RRAM), phase-change random access memory (PRAM), magnetoresistive random access memory (MRAM), ferroelectric random access memory (FRAM), or spin transfer torque random access memory (STT-RAM).

For example, each of the first and second lines disclosed in FIG. 5 may be a way that is connected to the first memory device 501 and the second memory device 502. Furthermore, the third lines that are selectively coupled to the first lines and the second lines may be a channel that is selectively coupled to the first memory device 501 and the second memory device 502.

FIG. 6A is a diagram for describing a detailed construction of the first memory device, among the components of the memory system according to the second embodiment of the present disclosure, which is disclosed in FIG. 5.

Referring to FIG. 6A, the first memory device 501 may include a first memory region 5010, a first path selection unit 5011, and a first compression unit 5012.

Specifically, the first compression unit 5012 may be activated in the compression read mode in which a compression enable signal COMP_EN is activated, and may output, to the first path selection unit 5011, the first compression data COMP_DATA1 by compressing data DATA1 read from the first memory region 5010 into the first compression data COMP_DATA1 in the activated state. That is, in the compression read mode, the first compression unit 5012 may generate the first compression data COMP_DATA1 by compressing the data DATA1 read from the first memory region 5010 at a compression ratio of 1 to N, and may output the generated first compression data COMP_DATA1 to the first path selection unit 5011. In this case, N may be a natural number equal to or greater than 2. For example, when N is 2, in the compression read mode, the first compression unit 5012 may generate the first compression data COMP_DATA1 by compressing the data DATA1 read from the first memory region 5010 at a compression ratio of 1 to 2, that is, 50%.

Furthermore, the first compression unit 5012 may be deactivated in the normal mode in which the compression enable signal COMP_EN is deactivated.

Furthermore, in a read operation included in the normal mode in which the compression enable signal COMP_EN is deactivated, the first path selection unit 5011 may transmit, to the first parallel transmission unit 503, the data DATA1 read from the first memory region 5010 through the first lines in response to the first clock CLK1. For example, in a read operation included in the normal mode in which the compression enable signal COMP_EN is deactivated, the first path selection unit 5011 may transmit, to the first parallel transmission unit 503, the data DATA1 that are output through four first lines and that are read from the first memory region 5010 through the four first lines.

Furthermore, in the compression read mode in which the compression enable signal COMP_EN is activated, the first path selection unit 5011 may transmit, to the first parallel transmission unit 503, the first compression data COMP_DATA1 that have been transmitted by the first compression unit 5012 through the first selection lines, among the first lines, in response to the first clock CLK1. That is, in the compression read mode, the first path selection unit 5011 may select, as the first selection lines, 1/N number of the first lines and may load the first compression data COMP_DATA1 that have been transmitted by the first compression unit 5012 onto the first selection lines in response to the first clock CLK1. In this case, N may be a natural number equal to or greater than 2. For example, when N is 2, the first path selection unit 5011 may load the first compression data COMP_DATA1 onto the first selection lines by selecting two first lines, among four first lines, as the first selection lines.

Figure 6B:
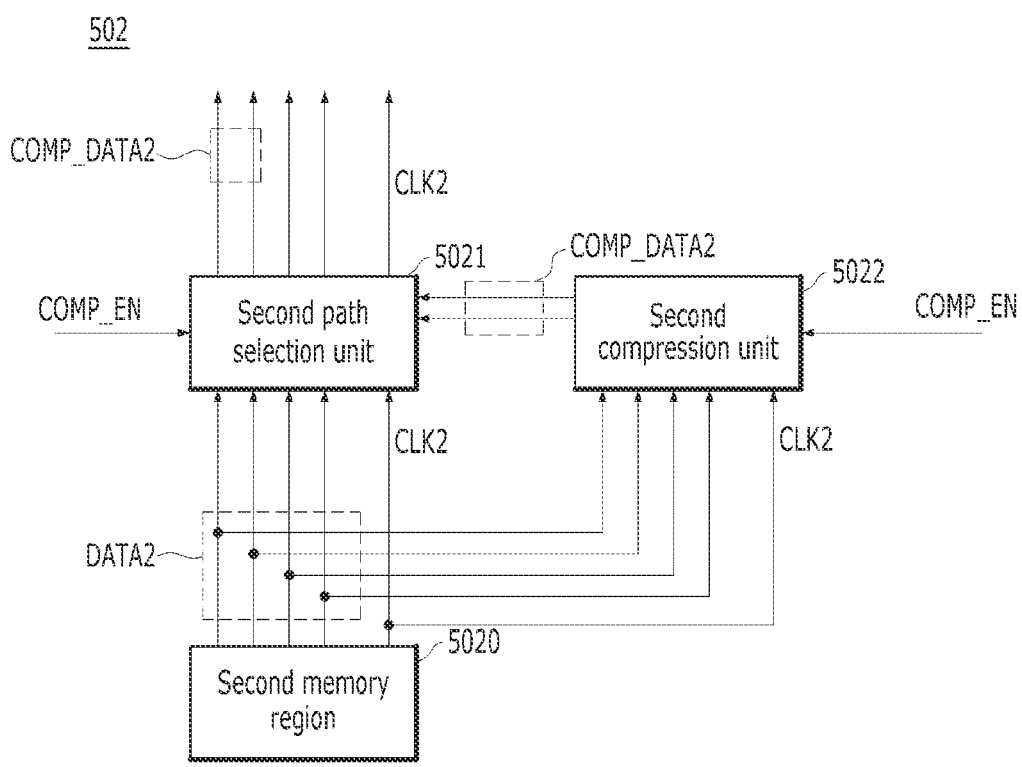
FIG. 6B is a diagram for describing a detailed construction of a second memory device, among the components of the memory system according to the second embodiment of the present disclosure, which is disclosed in FIG. 5.

FIG. 6B is a diagram for describing a detailed construction of the second memory device, among the components of the memory system according to the second embodiment of the present disclosure, which is disclosed in FIG. 5.

Referring to FIG. 6B, the second memory device 502 may include a second memory region 5020, a second path selection unit 5021, and a second compression unit 5022.

Specifically, the second compression unit 5022 may be activated in the compression read mode in which the compression enable signal COMP_EN is activated, and may output the second compression data COMP_DATA2 to the second path selection unit 5021 by compressing data DATA2 read from the second memory region 5020 into the second compression data COMP_DATA2 in the activated state. That is, in the compression read mode, the second compression unit 5022 may generate the second compression data COMP_DATA2 by compressing the data DATA2 read from the second memory region 5020 at a compression ratio of 1 to N, and may output the generated second compression data COMP_DATA2 to the second path selection unit 5021. In this case, N may be a natural number equal to or greater than 2. For example, when N is 2, in the compression read mode, the second compression unit 5022 may generate the second compression data COMP_DATA2 by compressing the data DATA2 read from the second memory region 5020 at a compression ratio of 1 to 2, that is, 50%.

Furthermore, the second compression unit 5022 may be deactivated in the normal mode in which the compression enable signal COMP_EN is deactivated.

Furthermore, in a read operation included in the normal mode in which the compression enable signal COMP_EN is deactivated, the second path selection unit 5021 may transmit, to the first parallel transmission unit 503, the data DATA2 read from the second memory region 5020 through the second lines in response to the second clock CLK2. For example, in a read operation included in the normal mode in which the compression enable signal COMP_EN is deactivated, the second path selection unit 5021 may transmit the data DATA2 that have been read from the second memory device 502 and that have been output through four second lines to the first parallel transmission unit 503 through the four second lines.

Furthermore, in the compression read mode in which the compression enable signal COMP_EN is activated, the second path selection unit 5021 may transmit, to the first parallel transmission unit 503, the second compression data COMP_DATA2 that have been transmitted by the second compression unit 5022 through the second selection lines, among the second lines, in response to the second clock CLK2. That is, in the compression read mode, the second path selection unit 5021 may select, as the second selection lines, 1/N number of the second lines and may load the second compression data COMP_DATA2 that have been transmitted by the second compression unit 5022 onto the second selection lines in response to the second clock CLK2. In this case, N may be a natural number equal to or greater than 2. For example, when N is 2, the second path selection unit 5021 may load the second compression data COMP_DATA2 onto the second selection lines by selecting two second lines, among four second lines, as the second selection lines.

Figure 6C:
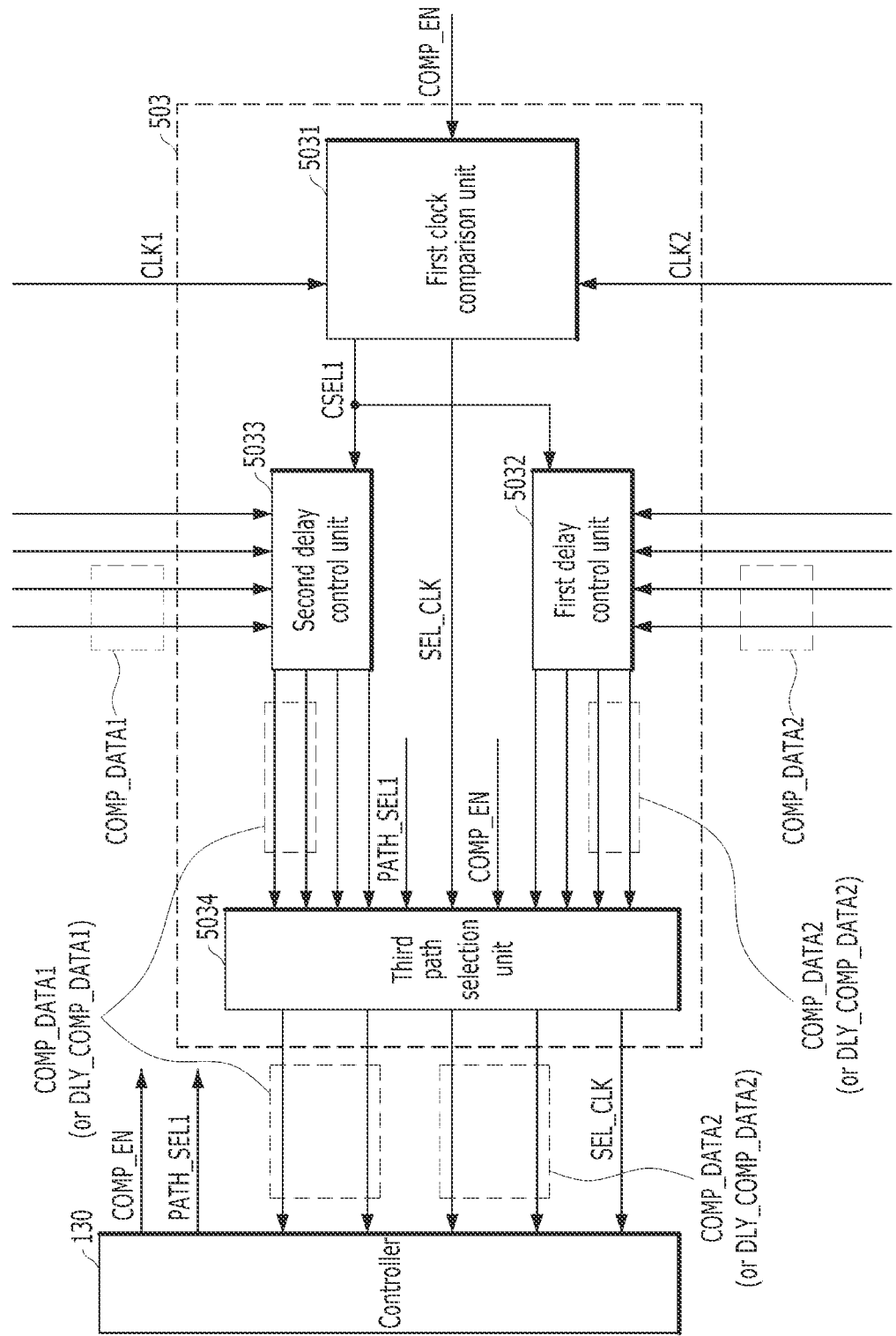
FIG. 6C is a diagram for describing a detailed construction of a first parallel transmission unit, among the components of the memory system according to the second embodiment of the present disclosure, which is disclosed in FIG. 5.

FIG. 6C is a diagram for describing a detailed construction of the first parallel transmission unit, among the components of the memory system according to the second embodiment of the present disclosure, which is disclosed in FIG. 5.

Referring to FIG. 6C, the first parallel transmission unit 503 may include a first clock comparison unit 5031, a first delay control unit 5032, a second delay control unit 5033, and a third path selection unit 5034.

Specifically, in the compression read mode in which the compression enable signal COMP_EN is activated, the first clock comparison unit 5031 may compare the phases of the first clock CLK1 and the second clock CLK2, and may output the selection clock SEL_CLK to the third path selection unit 5034 by selecting, as the selection clock SEL_CLK, one having a lagging phase to the other between the first clock CLK1 and the second clock CLK2. That is, in the compression read mode, the first clock comparison unit 5031 may compare the phase of the first clock CLK1 that has been used in the first memory device 501 in order to load the first compression data COMP_DATA1 onto the first selection lines and the phase of the second clock CLK2 that has been used in the second memory device 502 in order to load the second compression data COMP_DATA2 onto the second selection lines, and may select, as the selection clock SEL_CLK, one having a lagging phase to the other between the first clock CLK1 and the second clock CLK2. In this case, the first clock comparison unit 5031 may control operations of the first delay control unit 5032 and the second delay control unit 5033 by generating a first selection result signal CSEL1. According to an embodiment, the first clock comparison unit 5031 may generate the first selection result signal CSEL1 the value of which is adjusted based on which one of the first clock CLK1 and the second clock CLK2 has been selected as the selection clock SEL_CLK and may output the generated first selection result signal CSEL1 to the first delay control unit 5032 and the second delay control unit 5033. According to another embodiment, the first clock comparison unit 5031 may generate the first selection result signal CSEL1 the value of which is adjusted based on which one of the first clock CLK1 and the second clock CLK2 has been selected as the selection clock SEL_CLK and a difference between the phases of the first clock CLK1 and the second clock CLK2, and may output the generated first selection result signal CSEL1 to the first delay control unit 5032 and the second delay control unit 5033.

Furthermore, the first clock comparison unit 5031 may be deactivated in the normal mode in which the compression enable signal COMP_EN is deactivated, may generate the first selection result signal CSEL1 having an initial value in the deactivated state, and may output the generated first selection result signal CSEL1 to the first delay control unit 5032 and the second delay control unit 5033.

Furthermore, the first delay control unit 5032 may output the second compression data COMP_DATA2 by delaying the second compression data COMP_DATA2 by the first amount in response to the first selection result signal CSEL1. Specifically, the first delay control unit 5032 may delay the second compression data COMP_DATA2 that have been transmitted through the second selection lines by the first amount, in response to the first selection result signal CSEL1 having a value corresponding to the first clock CLK1 being selected as the selection clock SEL_CLK, and may then output the delayed second compression data DLY_COMP_DATA2 to the third path selection unit 5034. Furthermore, the first delay control unit 5032 may output the second compression data COMP_DATA2 that have been transmitted through the second selection lines, to the third path selection unit 5034, in response to the first selection result signal CSEL1 having a value corresponding to the second clock CLK2 being selected as the selection clock SEL_CLK. According to an embodiment, the first delay control unit 5032 may delay the second compression data COMP_DATA2 by the first amount. According to another embodiment, the first delay control unit 5032 may adjust the first amount in response to the first selection result signal CSEL1, and may delay the second compression data COMP_DATA2 by the adjusted first amount. Furthermore, the first delay control unit 5032 may output, to the third path selection unit 5034, data that have been transmitted through the second lines, in response to the first selection result signal CSEL1 having an initial value.

Furthermore, the second delay control unit 5033 may output the first compression data COMP_DATA1 by delaying the first compression data COMP_DATA1 by the second amount in response to the first selection result signal CSEL1. That is, the second delay control unit 5033 may delay the first compression data COMP_DATA1 that have been transmitted through the first selection lines by the first amount, in response to the first selection result signal CSEL1 having a value corresponding to the second clock CLK2 being selected as the selection clock SEL_CLK, and may then output the delayed first compression data DLY_COMP_DATA1 to the third path selection unit 5034. Furthermore, the second delay control unit 5033 may output, to the third path selection unit 5034, the first compression data COMP_DATA1 that have been transmitted through the first selection lines, in response to the first selection result signal CSEL1 having a value corresponding to the first clock CLK1 being selected as the selection clock SEL_CLK. According to an embodiment, the second delay control unit 5033 may delay the first compression data COMP_DATA1 by the second amount. According to another embodiment, the second delay control unit 5033 may adjust the second amount in response to the first selection result signal CSEL1, and may delay the first compression data COMP_DATA1 by the adjusted second amount. Furthermore, the second delay control unit 5033 may output, to the third path selection unit 5034, data that have been transmitted through the first lines in response to the first selection result signal CSEL1 having an initial value.

Furthermore, in a read operation included in the normal mode in which the compression enable signal COMP_EN is deactivated, the third path selection unit 5034 may connect the first lines and the third lines and might not connect the second lines and the third lines, in response to a first path selection signal PATH_SEL1 having a first value. For example, in a read operation included in the normal mode in which the compression enable signal COMP_EN is deactivated, the third path selection unit 5034 may connect four first lines and four third lines and simultaneously might not connect four second lines to the four third lines, in response to the first path selection signal PATH_SEL1 having the first value.

Furthermore, in a read operation included in the normal mode in which the compression enable signal COMP_EN is deactivated, the third path selection unit 5034 may connect the second lines and the third lines and might not connect the first lines and the third lines, in response to the first path selection signal PATH_SEL1 having a second value. For example, in a read operation included in the normal mode in which the compression enable signal COMP_EN is deactivated, the third path selection unit 5034 may connect four second lines and four third lines and simultaneously might not connect four first lines and the four third lines, in response to the first path selection signal PATH_SEL1 having the second value.

Furthermore, in the compression read mode in which the compression enable signal COMP_EN is activated, the third path selection unit 5034 may connect the first selection lines, among the first lines, and the partial lines of the third lines and connect the second selection lines, among the second lines, and the remaining lines of the third lines, regardless of a value of the first path selection signal PATH_SEL1. For example, in the compression read mode in which the compression enable signal COMP_EN is activated, the third path selection unit 5034 may connect two lines selected as the first selection lines, among four first lines, and two partial lines of the third lines and connect two lines selected as the second selection lines, among four second lines, and two remaining lines of the third lines, regardless of a value of the first path selection signal PATH_SEL1.

The compression enable signal COMP_EN and the first path selection signal PATH_SEL1 may be generated by the controller 130.

Figure 7A:
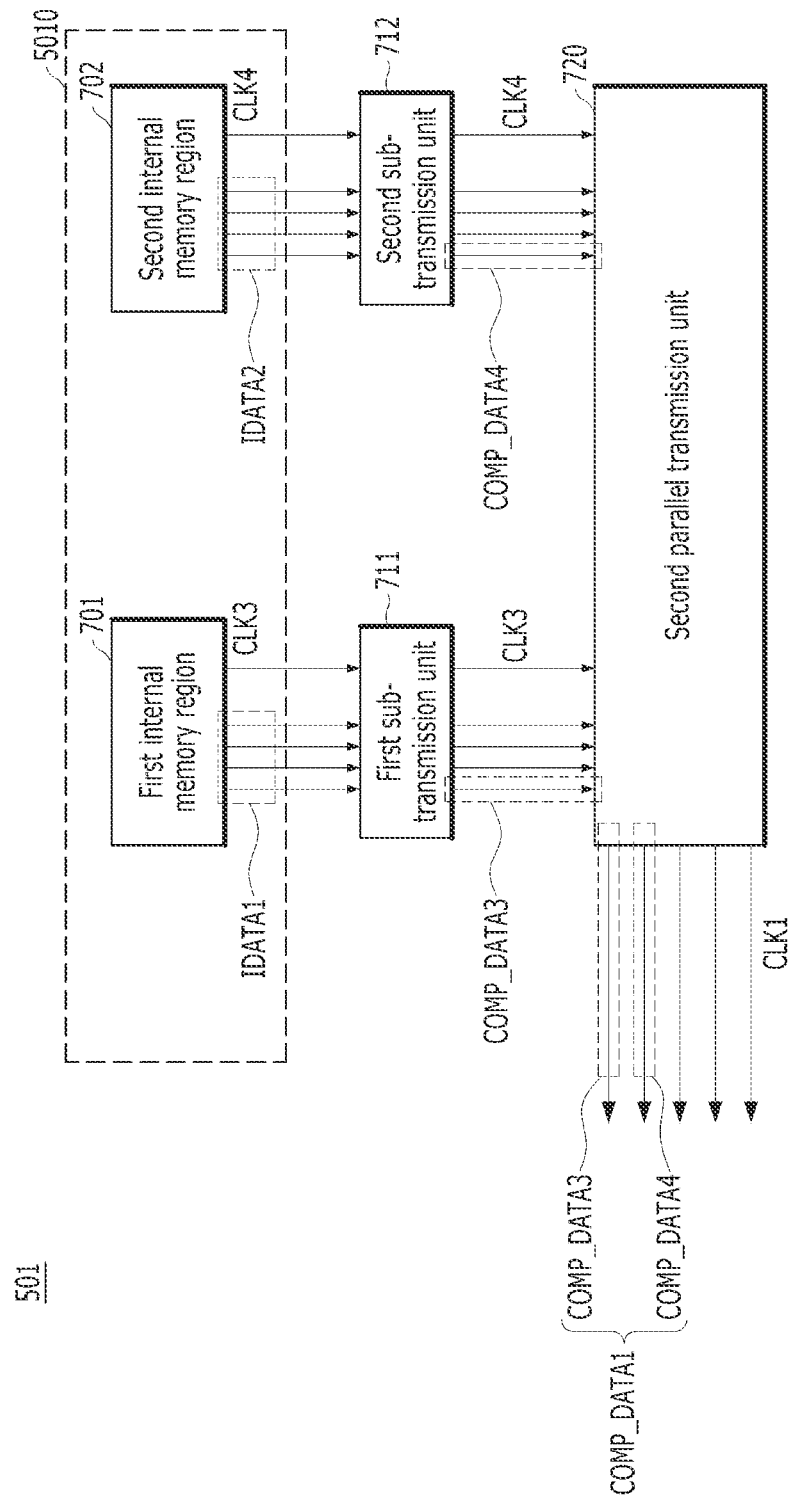
FIGS. 7A and 7B are diagrams for describing another example of the memory system according to the second embodiment of the present disclosure, which performs a compression read operation.
Figure 7B:
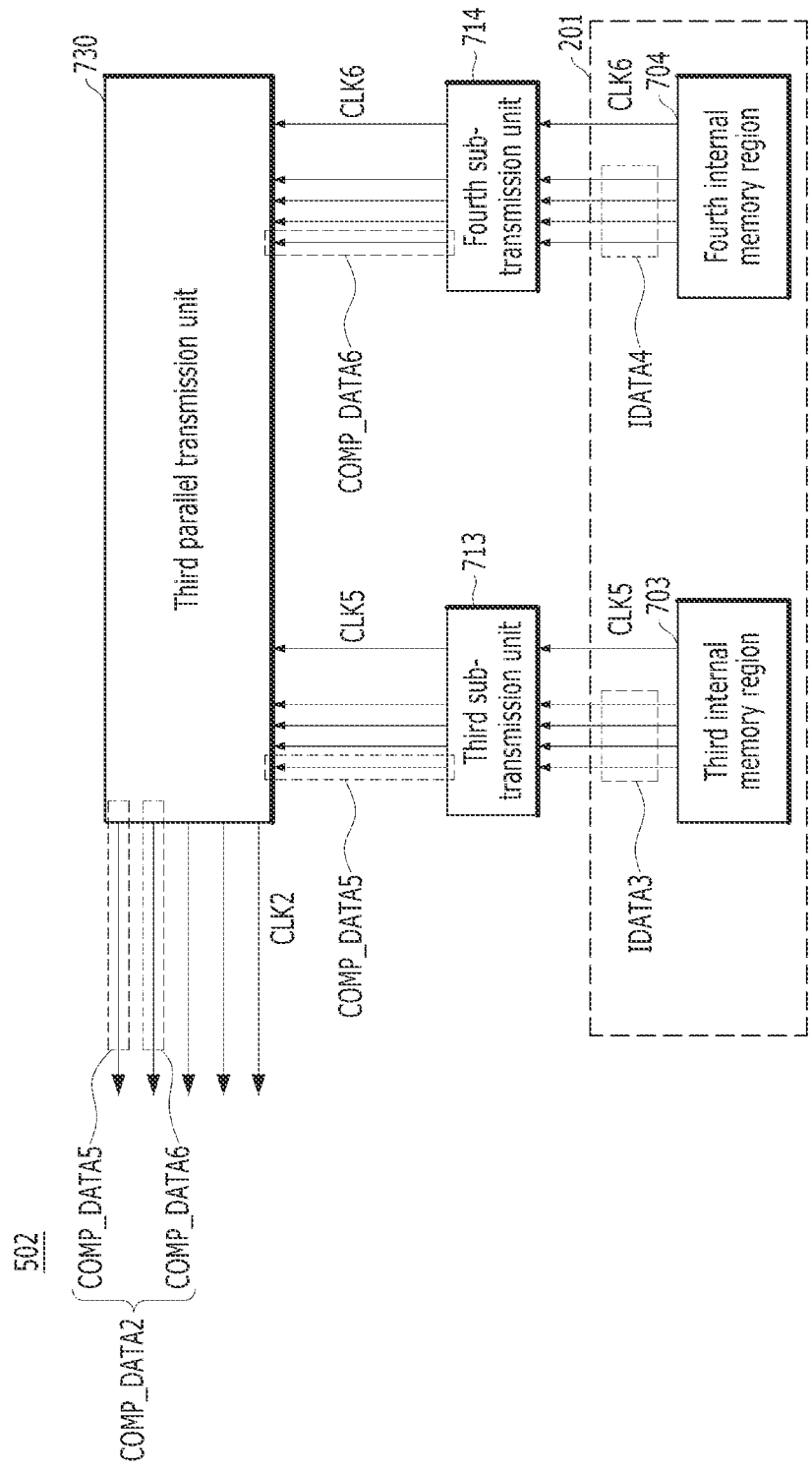

FIGS. 7A and 7B are diagrams for describing another example of the memory system according to the second embodiment of the present disclosure, which performs a compression read operation.

FIG. 7A illustrates a construction of the first memory device 501 having another form, among the components disclosed in FIG. 5. That is, the first memory device 501 disclosed in FIG. 5 may be substituted with components 701, 702, 711, 712, and 720 disclosed in FIG. 7A.

Furthermore, FIG. 7B illustrates a construction of the second memory device 502 having another form, among the components of the first memory device 501 disclosed in FIG. 5. That is, the second memory device 502 disclosed in FIG. 5 may be substituted with components 703, 704, 713, 714, and 730 disclosed in FIG. 7B.

First, referring to FIG. 7A along with FIG. 5, the first memory region 5010 included in the first memory device 501 in FIG. 5 may be substituted with a first internal memory region 701 and a second internal memory region 702 in FIG. 7A. Furthermore, the first memory device 501 disclosed in FIG. 7A may further include a first sub-transmission unit 711, a second sub-transmission unit 712, and a second parallel transmission unit 720 in addition to the first and second internal memory regions 701 and 702.

Furthermore, referring to FIG. 7B along with FIG. 5, the second memory region 5020 included in the first memory device 501 in FIG. 5 may be substituted with a third internal memory region 703 and a fourth internal memory region 704 in FIG. 7B. Furthermore, the second memory device 502 disclosed in FIG. 7B may further include a third sub-transmission unit 713, a fourth sub-transmission unit 714, and a third parallel transmission unit 730 in addition to the third and fourth internal memory regions 703 and 704.

Furthermore, it may be seen that data COMP_DATA1 and a clock CLK1 that are output by the second parallel transmission unit 720 in FIG. 7A are the same as the data COMP_DATA1 and the clock CLK1 that are transmitted from the first memory device 501 to the first parallel transmission unit 503 in FIG. 5. Furthermore, it may be seen that data COMP_DATA2 and a clock CLK2 that are output by the third parallel transmission unit 730 in FIG. 7B are the same as the data COMP_DATA2 and the clock CLK2 that are transmitted from the second memory device 502 to the first parallel transmission unit 503 in FIG. 5. That is, operations of the components 701, 702, 711, 712, and 720 disclosed in FIG. 7A, operations of the components 703, 704, 713, 714, and 730 disclosed in FIG. 7B, and an operation of the first parallel transmission unit 503 disclosed in FIG. 5 may be performed in a connected form. For reference, the detailed construction and operation of the first parallel transmission unit 503 has already been described with reference to FIG. 5, and thus will be omitted hereinafter.

Furthermore, in FIG. 7A, the first internal memory region 701 and the second internal memory region 702 may be disposed in regions that are physically divided. In FIG. 7B, the third internal memory region 703 and the second internal memory region 704 may be disposed in regions that are physically divided. For example, the first internal memory region 701 may be disposed on one side of the first memory region 5010, and the second internal memory region 702 may be disposed on the other side of the first memory region 5010. Likewise, the third internal memory region 703 may be disposed on one side of the second memory region 5020, and the fourth internal memory region 704 may be disposed on the other side of the second memory region 5020. In this case, one side and the other side may be regions that are physically divided. In this case, the two regions being physically divided and disposed may mean that the two regions that have been physically divided are in the state in which the two regions have at least a set interval or more. In this case, the set interval may mean an interval of a degree in which another physical component may be disposed and may be adjusted in any degree depending on the type or size of a memory device.

Specifically, data that have been stored in the first internal memory region 701 may be read from the first internal memory region 701 in response to a third clock CLK3, and the read data may be output through first sub-lines. Furthermore, data that have been stored in the second internal memory region 702 may be read from the second internal memory region 702 in response to a fourth clock CLK4, and the read data may be output through second sub-lines. Furthermore, data that have been stored in the third internal memory region 703 may be read from the third internal memory region 703 in response to a fifth clock CLK5, and the read data may be output through third sub-lines. Furthermore, data that have been stored in the fourth internal memory region 704 may be read from the fourth internal memory region 704 in response to a sixth clock CLK6, and the read data may be output through fourth sub-lines.

Furthermore, the first sub-transmission unit 711 may transmit data that are transmitted through the first sub-lines between the first internal memory region 701 and the second parallel transmission unit 720. Furthermore, the second sub-transmission unit 712 may transmit data that are transmitted through the second sub-lines between the second internal memory region 702 and the second parallel transmission unit 720. Furthermore, the third sub-transmission unit 713 may transmit data that are transmitted through the third sub-lines between the third internal memory region 703 and the third parallel transmission unit 730. Furthermore, the fourth sub-transmission unit 714 may transmit data that are transmitted through the fourth sub-lines between the fourth internal memory region 704 and the third parallel transmission unit 730.

More specifically, in a read operation included in the normal mode, the first sub-transmission unit 711 may transmit, to the second parallel transmission unit 720, data read from the first internal memory region 701 through the first sub-lines in response to the third clock CLK3. Furthermore, in a read operation included in the normal mode, the second sub-transmission unit 712 may transmit to the second parallel transmission unit 720, data read from the second internal memory region 702 through the second sub-lines in response to the fourth clock CLK4. Furthermore, in a read operation included in the normal mode, the third sub-transmission unit 713 may transmit to the third parallel transmission unit 730, data read from the third internal memory region 703 through the third sub-lines in response to the fifth clock CLK5. Furthermore, in a read operation included in the normal mode, the fourth sub-transmission unit 714 may transmit to the third parallel transmission unit 730, data read from the fourth internal memory region 704 through the fourth sub-lines in response to the sixth clock CLK6.

Furthermore, in the compression read mode, the first sub-transmission unit 711 may compress data IDATA1 read from the first internal memory region 701 into third compression data COMP_DATA3, and may transmit the third compression data COMP_DATA3 to the second parallel transmission unit 720 through third selection lines, among the first sub-lines, in response to the third clock CLK3. Furthermore, in the compression read mode, the second sub-transmission unit 712 may compress data IDATA2 read from the second internal memory region 702 into fourth compression data COMP_DATA4, and may transmit fourth compression data COMP_DATA4 to the second parallel transmission unit 720 through fourth selection lines, among the second sub-lines, in response to the fourth clock CLK4. Furthermore, in the compression read mode, the third sub-transmission unit 713 may compress data IDATA3 read from the third internal memory region 703 into fifth compression data COMP_DATA5, and may transmit the fifth compression data COMP_DATA5 to the third parallel transmission unit 730 through fifth selection lines, among the third sub-lines, in response to the fifth clock CLK5. Furthermore, in the compression read mode, the fourth sub-transmission unit 714 may compress data IDATA4 read from the fourth internal memory region 704 into sixth compression data COMP_DATA6, and may transmit the sixth compression data COMP_DATA6 to the third parallel transmission unit 730 through sixth selection lines, among the fourth sub-lines, in response to the sixth clock CLK6.

In this case, in the compression read mode, each of the first to fourth sub-transmission units 711, 712, 713, and 714 may generate each of the third to sixth compression data COMP_DATA3, COMP_DATA4, COMP_DATA5, and COMP_DATA6 by compressing each of the data IDATA1, IDATA2, IDATA3, and IDATA4 read from the internal memory regions 701, 702, 703, and 704 that have been connected to the first to fourth sub-transmission units 711, 712, 713, and 714, respectively, at a compression ratio of 1 to M, and may transmit each of the third to sixth compression data COMP_DATA3, COMP_DATA4, COMP_DATA5, and COMP_DATA6 through each of the third to sixth selection lines by selecting a 1/M number of each of the first to fourth sub-lines as each of the third to sixth selection lines. In this case, M may be a natural number greater than N, and N may be a natural number equal to or greater than 2. In this case, considering that each of the first and second compression units 5012 and 5022 disclosed in FIGS. 6A and 6B has generated each of the first and second compression data COMP_DATA1 and COMP_DATA2 by compressing each of the data read from the first and second memory regions 5010 and 5020, respectively, at the compression ratio of 1 to N, it may be seen that the compression ratio of each of the first to fourth sub-transmission units 711, 712, 713, and 714 disclosed in FIGS. 7A and 7B is higher than the compression ratio of each of the first and second compression units 5012 and 5022 disclosed in FIGS. 6A and 6B. For example, when N is 2 and M is 4, in the compression read mode, each of the first to fourth sub-transmission units 711, 712, 713, and 714 may generate each of the third to sixth compression data COMP_DATA3, COMP_DATA4, COMP_DATA5, and COMP_DATA6 by compressing each of the data IDATA1, IDATA2, IDATA3, and IDATA4 read from the internal memory regions 701, 702, 703, and 704 that have been connected to the first to fourth sub-transmission units 711, 712, 713, and 714, respectively, at a compression ratio of 1 to 4, that is, 25%, and may transmit each of the third to sixth compression data COMP_DATA3, COMP_DATA4, COMP_DATA5, and COMP_DATA6 through each of the first to fourth sub-lines by selecting one sub-line from each of the first to fourth sub-lines, each one having four sub-lines, as each of the third to sixth selection lines.

Furthermore, the construction and operation of the first parallel transmission unit 503 disclosed in FIG. 5 may be similar to a construction and operation of each of the second parallel transmission unit 720 disclosed in FIG. 7A and the third parallel transmission unit 730 disclosed in FIG. 7B.

Specifically, analogous to the first parallel transmission unit 503 disclosed in FIG. 5 being connected to the first lines, the second lines, and the third lines and having the third lines selectively coupled to the first lines and the second lines, the second parallel transmission unit 720 may be connected to the first sub-lines, the second sub-lines, and the first lines and have the first lines selectively coupled to the first sub-lines and the second sub-lines, and the third parallel transmission unit 730 may be connected to the third sub-lines, the fourth sub-lines, and the second lines and have the second lines selectively coupled to the third sub-lines and the fourth sub-lines. In this case, it has been described that the number of first lines, the number of second lines, and the number of third lines are the same in FIG. 5. Accordingly, the number of first sub-lines, the number of second sub-lines, the number of third sub-lines, the number of fourth sub-lines, the number of first lines, the number of second lines, and the number of third lines may be the same number, that is, at least two lines. For example, as illustrated in FIGS. 5, 7A, and 7B, each of the number of first sub-lines, the number of second sub-lines, the number of third sub-lines, the number of fourth sub-lines, the number of first lines, the number of second lines, and the number of third lines may be four.

More specifically, in a read operation included in the normal mode, the second parallel transmission unit 720 may output data that have been read from the first internal memory region 701 and that have been transmitted through the first sub-lines, to the first parallel transmission unit 503 through the first lines, by connecting the first sub-lines and the first lines and simultaneously not connecting the second sub-lines and the first lines. Furthermore, in a read operation included in the normal mode, the second parallel transmission unit 720 may output data that have been read from the second internal memory region 702 and that have been transmitted through the second sub-lines, to the first parallel transmission unit 503 through the first lines, by connecting the second sub-lines and the first lines and simultaneously not connecting the first sub-lines and the first lines. That is, in the read operation included in the normal mode, the second parallel transmission unit 720 may operate in a time division form so that an interval in which the first sub-lines are connected to the first lines and an interval in which the second sub-lines are connected to the first lines do not overlap. Accordingly, the first lines can be selectively coupled to the first sub-lines and the second sub-lines.

Furthermore, in the compression read mode, the second parallel transmission unit 720 may connect the partial lines of the first selection lines, among the first lines, and the third selection lines and simultaneously connect the remaining lines of the first selection lines, among the first lines, and the fourth selection lines, may select, as the first clock CLK1, one having a lagging phase to the other between the third clock CLK3 and the fourth clock CLK4, and may transmit the third compression data COMP_DATA3 and the fourth compression data COMP_DATA4 in parallel through the first selection lines, among the first lines, in response to the first clock CLK1. That is, the second parallel transmission unit 720 may transmit the third compression data COMP_DATA3 that have been transmitted through the third selection lines and the fourth compression data COMP_DATA4 that have been transmitted through the fourth selection lines in parallel through the first selection lines, among the first lines. Accordingly, the third compression data COMP_DATA3 and the fourth compression data COMP_DATA4 may be data corresponding to the first compression data COMP_DATA1 described with reference to FIG. 5. That is, the first compression data COMP_DATA1 may be data in which the third compression data COMP_DATA3 and the fourth compression data COMP_DATA4 have been combined in parallel. In this case, the number of third selection lines, the number of fourth selection lines, the number of the partial lines, among the first selection lines, and the number of the remaining lines, among the first selection lines, may be the same number. For example, each of the number of third selection lines, the number of fourth selection lines, the number of the partial lines, among the first selection lines, and the number of the remaining lines, among the first selection lines, may be one.

In particular, the second parallel transmission unit 720 may compare the phase of the third clock CLK3 that has been used to load the third compression data COMP_DATA3 onto the third selection lines and the phase of the fourth clock CLK4 that has been used to load the fourth compression data COMP_DATA4 onto the fourth selection lines, may select, as the first clock CLK1, one having a lagging phase to the other between the third clock CLK3 and the fourth clock CLK4, and may then transmit the third compression data COMP_DATA3 to the partial lines of the first selection lines, among the first lines, in response to the first clock CLK1 and transmit the fourth compression data COMP_DATA4 to the remaining lines of the first selection lines, among the first lines, in response to the first clock CLK1. That is, the second parallel transmission unit 720 may load the first compression data COMP_DATA1 in which the third compression data COMP_DATA3 and the fourth compression data COMP_DATA4 have been combined in parallel onto the first selection lines, among the first lines, in response to the first clock CLK1.

Furthermore, when the third clock CLK3 is selected as the first clock CLK1, the second parallel transmission unit 720 may delay timing at which the fourth compression data COMP_DATA4 are loaded onto the remaining lines of the first selection lines, among the first lines, by the third amount. That is, when the third clock CLK3 is selected as the first clock CLK1, the second parallel transmission unit 720 may load the third compression data COMP_DATA3 that have been transmitted through the third selection lines onto the partial lines of the first selection lines, among the first lines, in response to the first clock CLK1, may delay the fourth compression data COMP_DATA4 that have been transmitted through the fourth selection lines by a third amount, and may then load the delayed fourth compression data onto the remaining lines of the first selection lines, among the first lines, in response to the first clock CLK1. In this case, the third amount may correspond to a difference between the phases of the third clock CLK3 and the fourth clock CLK4 or may be predetermined.

Furthermore, when the fourth clock CLK4 is selected as the first clock CLK1, the second parallel transmission unit 720 may delay timing at which the third compression data COMP_DATA3 are loaded onto the partial lines of the first selection lines, among the first lines, by a fourth amount. That is, when the fourth clock CLK4 is selected as the first clock CLK1, the second parallel transmission unit 720 may load the fourth compression data COMP_DATA4 that have been transmitted through the fourth selection lines onto the remaining lines of the first selection lines, among the first lines, in response to the first clock CLK1, may delay the third compression data COMP_DATA3 that have been transmitted through the third selection lines by the fourth amount, and may then load the delayed third compression data onto the partial lines of the first selection lines, among the first lines, in response to the first clock CLK1. In this case, the fourth amount may correspond to a difference between the phases of the third clock CLK3 and the fourth clock CLK4 or may be predetermined.

Furthermore, in a read operation included in the normal mode, the third parallel transmission unit 730 may output data that have been read from the third internal memory region 703 and that have been transmitted through the third sub-lines, to the first parallel transmission unit 503 through the second lines, by connecting the third sub-lines and the second lines and simultaneously not connecting the fourth sub-lines and the second lines. Furthermore, in a read operation included in the normal mode, the third parallel transmission unit 730 may output data that have been read from the fourth internal memory region 704 and that have been transmitted through the fourth sub-lines, to the first parallel transmission unit 503 through the second lines, by connecting the fourth sub-lines and the second lines and simultaneously not connecting the third sub-lines and the second lines. That is, in the read operation included in the normal mode, the third parallel transmission unit 730 may operate in a time division form so that an interval in which the third sub-lines are connected to the second lines and an interval in which the fourth sub-lines are connected to the second lines do not overlap. Accordingly, the second lines can be selectively coupled to the third sub-lines and the fourth sub-lines.

Furthermore, in the compression read mode, the third parallel transmission unit 730 may connect the partial lines of the second selection lines, among the second lines, and the fifth selection lines and simultaneously connect the remaining lines of the second selection lines, among the second lines, and the sixth selection lines, may select, as the second clock CLK2, one having a lagging phase to the other between the fifth clock CLK5 and the sixth clock CLK6, and may transmit the fifth compression data COMP_DATA5 and the sixth compression data COMP_DATA6 in parallel through the second selection lines, among the second lines, in response to the second clock CLK2. That is, the third parallel transmission unit 730 may transmit the fifth compression data COMP_DATA5 that have been transmitted through the fifth selection lines and the sixth compression data COMP_DATA6 that have been transmitted through the sixth selection lines in parallel through the second selection lines, among the second lines. Accordingly, the fifth compression data COMP_DATA5 and the sixth compression data COMP_DATA6 may be data corresponding to the second compression data COMP_DATA2 described with reference to FIG. 5. That is, the second compression data COMP_DATA2 may be data in which the fifth compression data COMP_DATA5 and the sixth compression data COMP_DATA6 have been combined in parallel. In this case, the number of fifth selection lines, the number of sixth selection lines, the number of the partial lines, among the second selection lines, and the number of the remaining lines, among the second selection lines, may be the same number. For example, each of the number of fifth selection lines, the number of sixth selection lines, the number of the partial lines, among the second selection lines, and the number of the remaining lines, among the second selection lines, may be one.

In particular, the third parallel transmission unit 730 may compare the phase of the fifth clock CLK5 that has been used to load the fifth compression data COMP_DATA5 onto the fifth selection lines and the phase of the sixth clock CLK6 that has been used to load the sixth compression data COMP_DATA6 onto the sixth selection lines, may select, as the second clock CLK2, one having a lagging phase to the other between the fifth clock CLK5 and the sixth clock CLK6, and may then transmit the fifth compression data COMP_DATA5 to the partial lines of the second selection lines, among the second lines, in response to the second clock CLK2 and transmit the sixth compression data COMP_DATA6 to the remaining lines of the second selection lines, among the second lines, in response to the second clock CLK2. That is, the third parallel transmission unit 730 may load the second compression data COMP_DATA2 in which the fifth compression data COMP_DATA5 and the sixth compression data COMP_DATA6 have been combined in parallel onto the second selection lines, among the second lines, in response to the second clock CLK2.

Furthermore, when the fifth clock CLK5 is selected as the second clock CLK2, the third parallel transmission unit 730 may delay timing at which the sixth compression data COMP_DATA6 is loaded onto the remaining lines of the second selection lines, among the second lines, by the third amount. That is, when the fifth clock CLK5 is selected as the second clock CLK2, the third parallel transmission unit 730 may load the fifth compression data COMP_DATA5 that have been transmitted through the fifth selection lines onto the partial lines of the second selection lines, among the second lines, in response to the second clock CLK2, may delay the sixth compression data COMP_DATA6 that have been transmitted through the sixth selection lines by the third amount, and may then load the delayed fourth compression data onto the remaining lines of the second selection lines, among the second lines, in response to the second clock CLK2. In this case, the third amount may correspond to a difference between the phases of the fifth clock CLK5 and the sixth clock CLK6 or may be predetermined.

Furthermore, when the sixth clock CLK6 is selected as the second clock CLK2, the third parallel transmission unit 730 may delay timing at which the fifth compression data COMP_DATA5 are loaded onto the partial lines of the second selection lines, among the second lines, by the fourth amount. That is, when the sixth clock CLK6 is selected as the second clock CLK2, the third parallel transmission unit 730 may load the sixth compression data COMP_DATA6 that have been transmitted through the sixth selection lines onto the remaining lines of the second selection lines, among the second lines, in response to the second clock CLK2, may delay the fifth compression data COMP_DATA5 that have been transmitted through the fifth selection lines by the fourth amount, and may then load the delayed third compression data onto the partial lines of the second selection lines, among the second lines, in response to the second clock CLK2. In this case, the fourth amount may correspond to a difference between the phases of the fifth clock CLK5 and the sixth clock CLK6 or may be predetermined.

The first memory device 501 may further include a third clock generation unit (not illustrated) for generating the third clock CLK3 and a fourth clock generation unit (not illustrated) for generating the fourth clock CLK4. Furthermore, the second memory device 502 may further include a fifth clock generation unit (not illustrated) for generating the fifth clock CLK5 and a sixth clock generation unit (not illustrated) for generating the sixth clock CLK6. In this case, the third clock generation unit may be disposed within the first internal memory region 701 or in a region that is physically adjacent to the first internal memory region 701. Furthermore, the fourth clock generation unit may be disposed within the second internal memory region 702 or in a region that is physically adjacent to the second internal memory region 702. In this case, the fifth clock generation unit may be disposed within the third internal memory region 703 or in a region that is physically adjacent to the third internal memory region 703. Furthermore, the sixth clock generation unit may be disposed within the fourth internal memory region 704 or in a region that is physically adjacent to the fourth internal memory region 704.

For example, if the third clock generation unit is disposed within the first internal memory region 701, as illustrated in FIG. 7A, the third clock CLK3 that has been generated by the first internal memory region 701 may be transmitted to the first sub-transmission unit 711 and the second parallel transmission unit 720. Likewise, if the fourth clock generation unit is disposed within the second internal memory region 702, as illustrated in FIG. 7A, the fourth clock CLK4 that has been generated by the second internal memory region 702 may be transmitted to the second sub-transmission unit 712 and the second parallel transmission unit 720. Furthermore, if the fifth clock generation unit is disposed within the third internal memory region 703, as illustrated in FIG. 7B, the fifth clock CLK5 that has been generated by the third internal memory region 703 may be transmitted to the third sub-transmission unit 713 and the third parallel transmission unit 730. Likewise, if the sixth clock generation unit is disposed within the fourth internal memory region 704, as illustrated in FIG. 7B, the sixth clock CLK6 that has been generated by the fourth internal memory region 704 may be transmitted to the fourth sub-transmission unit 714 and the third parallel transmission unit 730.

As another example, if the third clock generation unit is disposed in the region that is physically adjacent to the first internal memory region 701, unlike in FIG. 7A, the third clock CLK3 that has been generated by the third clock generation unit that is disposed to be physically adjacent to the first internal memory region 701 may be input to the first internal memory region 701, the first sub-transmission unit 711, and the second parallel transmission unit 720. Likewise, if the fourth clock generation unit is disposed in the region that is physically adjacent to the second internal memory region 702, unlike in FIG. 7A, the fourth clock CLK4 that has been generated by the fourth clock generation unit that is disposed to be physically adjacent to the second internal memory region 702 may be input to the second internal memory region 702, the second sub-transmission unit 712, and the second parallel transmission unit 720. Furthermore, if the fifth clock generation unit is disposed in the region that is physically adjacent to the third internal memory region 703, unlike in FIG. 7B, the fifth clock CLK5 that has been generated by the fifth clock generation unit that is disposed to be physically adjacent to the third internal memory region 703 may be input to the third internal memory region 703, the third sub-transmission unit 713, and the third parallel transmission unit 730. Likewise, if the sixth clock generation unit is disposed in the region that is physically adjacent to the fourth internal memory region 704, unlike in FIG. 7B, the sixth clock CLK6 that has been generated by the sixth clock generation unit that is disposed to be physically adjacent to the fourth internal memory region 704 may be input to the fourth internal memory region 704, the fourth sub-transmission unit 714, and the third parallel transmission unit 730.

For example, each of the first to fourth internal memory regions 301, 302, 303, and 304 disclosed in FIGS. 7A and 7B may be a plane including multiple memory blocks (not illustrated). Furthermore, each of the first to fourth sub-lines that are connected to the first to fourth internal memory regions 301, 302, 303, and 304, respectively, may be a data line that is connected to one plane. Furthermore, each of the first lines that are selectively coupled to the first and second sub-lines and the second lines that are selectively coupled to the third and fourth sub-lines may be a way that is selectively coupled to at least two data lines.

Figure 8A:
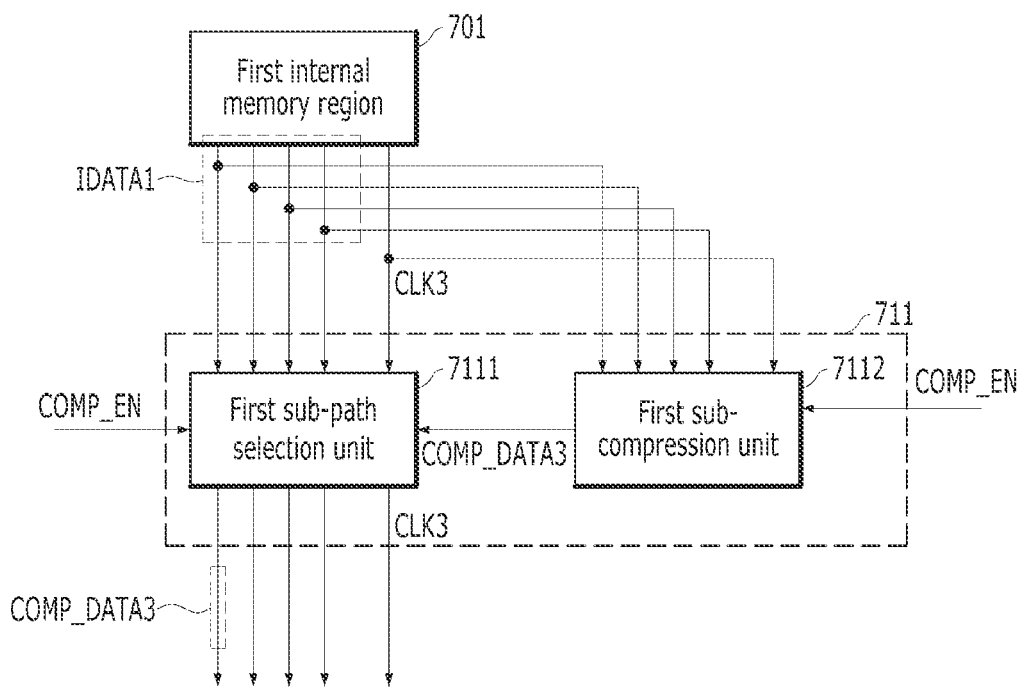
FIG. 8A is a diagram for describing a detailed construction of a first sub-transmission unit, among the components of the memory system according to the second embodiment of the present disclosure, which is disclosed in FIG. 7A.

FIG. 8A is a diagram for describing a detailed construction of the first sub-transmission unit, among the components of the memory system according to the second embodiment of the present disclosure, which is disclosed in FIG. 7A.

Figure 8B:
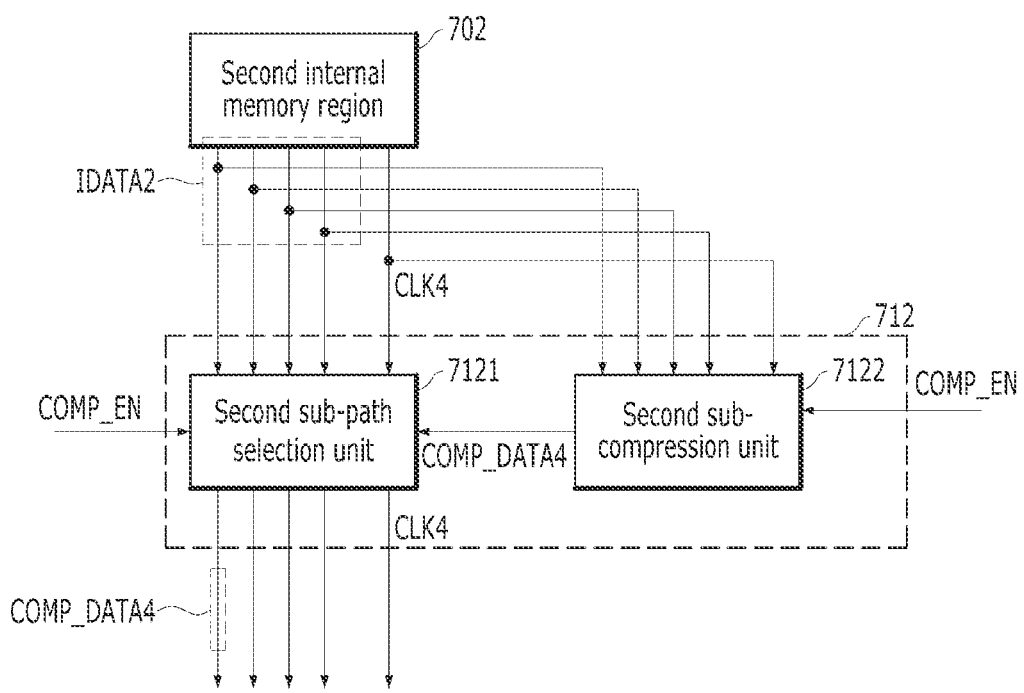
FIG. 8B is a diagram for describing a detailed construction of a second sub-transmission unit, among the components of the memory system according to the second embodiment of the present disclosure, which is disclosed in FIG. 7A.

FIG. 8B is a diagram for describing a detailed construction of the second sub-transmission unit, among the components of the memory system according to the second embodiment of the present disclosure, which is disclosed in FIG. 7A.

Figure 8C:
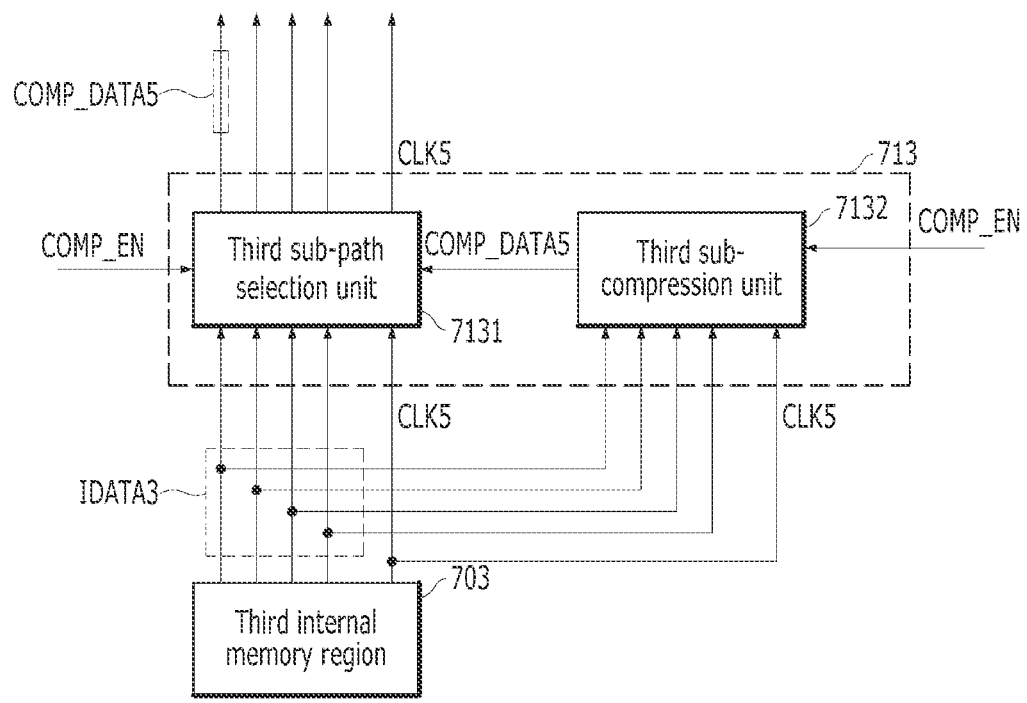
FIG. 8C is a diagram for describing a detailed construction of a third sub-transmission unit, among the components of the memory system according to the second embodiment of the present disclosure, which is disclosed in FIG. 7B.

FIG. 8C is a diagram for describing a detailed construction of the third sub-transmission unit, among the components of the memory system according to the second embodiment of the present disclosure, which is disclosed in FIG. 7B.

Figure 8D:
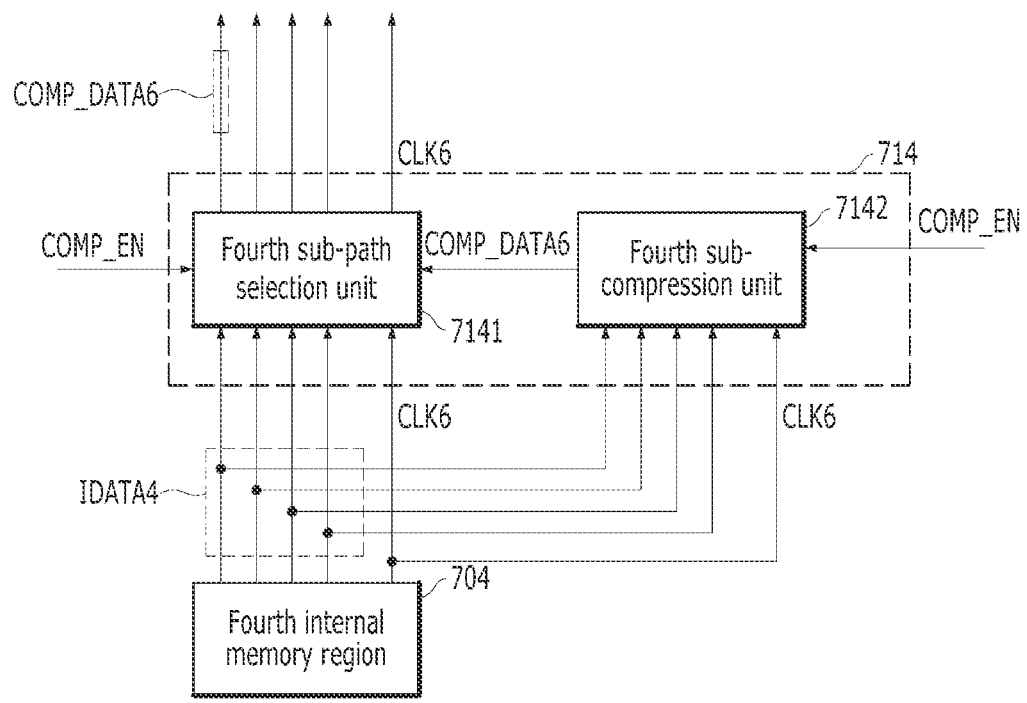
FIG. 8D is a diagram for describing a detailed construction of a fourth sub-transmission unit, among the components of the memory system according to the second embodiment of the present disclosure, which is disclosed in FIG. 7B.

FIG. 8D is a diagram for describing a detailed construction of the fourth sub-transmission unit, among the components of the memory system according to the second embodiment of the present disclosure, which is disclosed in FIG. 7B.

Referring to FIGS. 8A to 8D, the first sub-transmission unit 711 may include a first sub-path selection unit 7111 and a first sub-compression unit 7112. Furthermore, the second sub-transmission unit 712 may include a second sub-path selection unit 7121 and a second sub-compression unit 7122. Furthermore, the third sub-transmission unit 713 may include a third sub-path selection unit 7131 and a first sub-compression unit 7132. Furthermore, the fourth sub-transmission unit 714 may include a fourth sub-path selection unit 7141 and a first sub-compression unit 7142.

Specifically, the first to fourth sub-compression units 7112, 7122, 7132, and 7142 may each be activated in the compression read mode in which the compression enable signal COMP_EN is activated, and may output the third to sixth compression data COMP_DATA3, COMP_DATA4, COMP_DATA5, and COMP_DATA6 to the first to fourth sub-path selection units 7111, 7121, 7131, and 7141, respectively, by compressing the data IDATA1, IDATA2, IDATA3, and IDATA4 read from the first to fourth internal memory regions 701, 702, 703, and 704, respectively, into the third to sixth compression data COMP_DATA3, COMP_DATA4, COMP_DATA5, and COMP_DATA6, respectively, in the activated state. That is, in the compression read mode, each of the first to fourth sub-compression units 7112, 7122, 7132, and 7142 may generate each of the third to sixth compression data COMP_DATA3, COMP_DATA4, COM- P_DATA5, and COMP_DATA6 by compressing each of the data IDATA1, IDATA2, IDATA3, and IDATA4 read from the first to fourth internal memory regions 701, 702, 703, and 704, respectively, at a compression ratio of 1 to M, and may output each of the generated third to sixth compression data COMP_DATA3, COMP_DATA4, COMP_DATA5, and COMP_DATA6 to each of the first to fourth sub-path selection units 7111, 7121, 7131, and 7141. In this case, N may be a natural number equal to or greater than 2, and M may be a natural number greater than N. In this case, considering that each of the first and second compression units 5011 and 2051 disclosed in FIGS. 6A and 6B has generated each of the first and second compression data COMP_DATA1 and COMP_DATA2 by compressing each of the data DATA1 and DATA2 read from the memory regions 201 and 202 that have been connected to the first and second compression units 5011 and 2051, respectively, at a compression ratio of 1 to N, it may be seen that the compression ratio of each of the first to fourth sub-transmission units 711, 712, 713, and 714 disclosed in FIGS. 8A to 8D is higher than the compression ratio of each of the first and second compression units 5011 and 2051 disclosed in FIGS. 6A and 6B. For example, when N is 2 and M is 4, in the compression read mode, each of the first to fourth sub-compression units 7112, 7122, 7132, and 7142 may generate each of the third to sixth compression data COMP_DATA3, COMP_DATA4, COMP_DATA5, and COMP_DATA6 by compressing each of the data IDATA1, IDATA2, IDATA3, and IDATA4 read from the first to fourth internal memory regions 701, 702, 703, and 704, respectively, at a compression ratio of 1 to 4, that is, 25%.

Furthermore, the first to fourth sub-compression units 7112, 7122, 7132, and 7142 may each be deactivated in the normal mode in which the compression enable signal COMP_EN is deactivated.

Furthermore, in a read operation included in the normal mode in which the compression enable signal COMP_EN is deactivated, the first and second sub-path selection units 7111 and 7121 and the third and fourth sub-path selection units 7131 and 7141 may transmit the data IDATA1 and IDATA2 and the data IDATA3 and IDATA4 read from the first and second internal memory regions 701 and 702 and the third and fourth internal memory regions 703 and 704, respectively, to the second and third parallel transmission units 720 and 730, respectively, through the first and second sub-lines and the third and fourth sub-lines, respectively, in response to the third and fourth clocks CLK3 and CLK4 and the fifth and sixth clocks CLK5 and CLK6, respectively. For example, in a read operation included in the normal mode in which the compression enable signal COMP_EN is deactivated, the first and second sub-path selection units 7111 and 7121 and the third and fourth sub-path selection units 7131 and 7141 may transmit the data IDATA1 and IDATA2 and the data IDATA3 and IDATA4 that are read from the first and second internal memory regions 701 and 702 and the third and fourth internal memory regions 703 and 704, respectively, and that are output through the first and second sub-lines, each one having four lines, and the third and fourth sub-lines, each one having four lines, respectively, to the second and third parallel transmission units 720 and 730, respectively, through the first and second sub-lines each one having four lines, and the third and fourth sub-lines, each one having four lines, respectively.

Furthermore, in the compression read mode in which the compression enable signal COMP_EN is activated, the first and second sub-path selection units 7111 and 7121 and the third and fourth sub-path selection units 7131 and 7141 may transmit the third and fourth compression data COMP_DATA3 and COMP_DATA4 and the fifth and sixth compression data COMP_DATA5 and COMP_DATA6 transmitted by the first and second sub-compression units 7112 and 7122 and the third and fourth sub-compression units 7132 and 7142, respectively, to the second and third parallel transmission units 720 and 730, respectively, through the third and fourth selection lines and the fifth and sixth selection lines, among the first to fourth sub-lines, respectively, in response to the third and fourth clocks CLK3 and CLK4 and the fifth and sixth clocks CLK5 and CLK6, respectively. That is, in the compression read mode, the first and second sub-path selection units 7111 and 7121 and the third and fourth sub-path selection units 7131 and 7141 may each select a 1/M number of each of the third and fourth selection lines and the fifth and sixth selection lines as each of the third and fourth selection lines and the fifth and sixth selection lines, and may load the third and fourth compression data COMP_DATA3 and COMP_DATA4 and the fifth and sixth compression data COMP_DATA5 and COMP_DATA6 transmitted by the first and second sub-compression units 7112 and 7122 and the third and fourth sub-compression units 7132 and 7142, respectively, onto the third and fourth selection lines and the fifth and sixth selection lines, respectively, in response to the third and fourth clocks CLK3 and CLK4 and the fifth and sixth clocks CLK5 and CLK6, respectively. In this case, N may be a natural number equal to or greater than 2, and M may be a natural number greater than N. For example, when N is 2 and M is 4, the first and second sub-path selection units 7111 and 7121 and the third and fourth sub-path selection units 7131 and 7141 may each select one line from each of the third and fourth selection lines and the fifth and sixth selection lines, each one having four lines, as each of the third and fourth selection lines and the fifth and sixth selection lines, and may load the third and fourth compression data COMP_DATA3 and COMP_DATA4 and the fifth and sixth compression data COMP_DATA5 and COMP_DATA6 onto the third and fourth selection lines and the fifth and sixth selection lines, respectively.

Figure 8E:
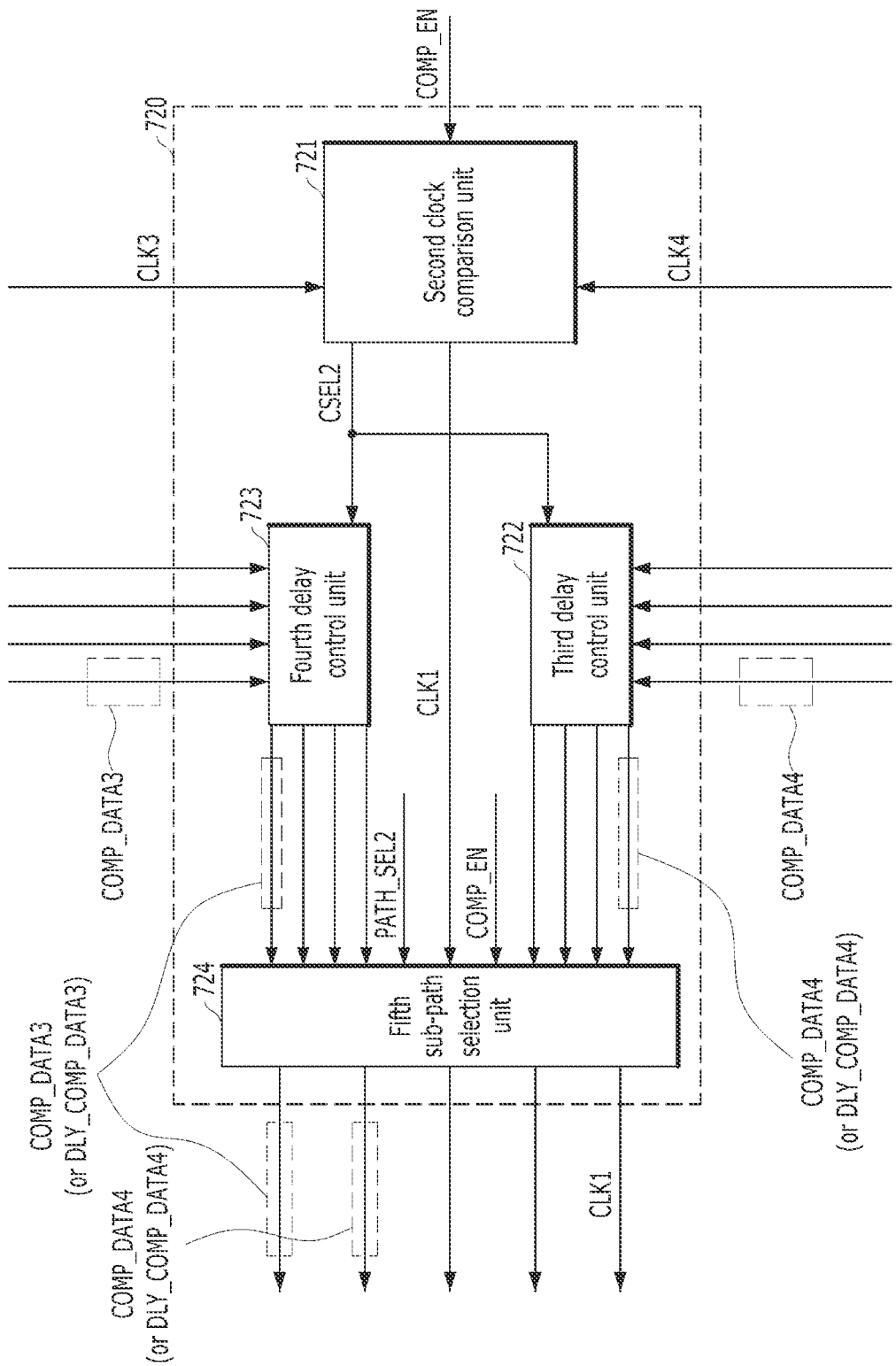
FIG. 8E is a diagram for describing a detailed construction of a second parallel transmission unit, among the components of the memory system according to the second embodiment of the present disclosure, which is disclosed in FIG. 7A.

FIG. 8E is a diagram for describing a detailed construction of the second parallel transmission unit, among the components of the memory system according to the second embodiment of the present disclosure, which is disclosed in FIG. 7A.

FIG. 8F is a diagram for describing a detailed construction of the third parallel transmission unit, among the components of the memory system according to the second embodiment of the present disclosure, which is disclosed in FIG. 7B.

As described with reference to FIGS. 7A and 7B, the construction and operation of each of the second parallel transmission unit 720 disclosed in FIG. 7A and the third parallel transmission unit 730 disclosed in FIG. 7B may be similar to the construction and operation of the first parallel transmission unit 503 disclosed in FIG. 5. Accordingly, a construction and operation of each of the second parallel transmission unit 720 that has been materialized in FIG. 8E and the third parallel transmission unit 730 disclosed in FIG. 8F may be similar to the construction and operation of the first parallel transmission unit 503 that has been materialized in FIG. 6C.

Referring to FIGS. 8E and 8F, the second parallel transmission unit 720 may include a second clock comparison unit 721, a third delay control unit 722, a fourth delay control unit 723, and a fifth sub-path selection unit 724. Furthermore, the second parallel transmission unit 730 may include a third clock comparison unit 731, a fifth delay control unit 732, a sixth delay control unit 733, and a sixth sub-path selection unit 734.

Specifically, in the compression read mode in which the compression enable signal COMP_EN is activated, the second and third clock comparison units 721 and 731 may compare the phases of the third and fifth clocks CLK3 and CLK5 and the phases of the fourth and sixth clocks CLK4 and CLK6, respectively, may respectively select, as the first and second clocks CLK1 and CLK2, ones having lagging phases to the others between the third clock CLK3 and the fourth clock CLK4 and between the fifth clock CLK5 and the sixth clock CLK6, and may output the first and second clocks CLK1 and CLK2 to the fifth and sixth sub-path selection units 724 and 734, respectively. That is, in the compression read mode, the second and third clock comparison units 721 and 731 may compare the phases of the third and fifth clocks CLK3 and CLK5 that have been used to load the third and fifth compression data COMP_DATA3 and COMP_DATA5 onto the third and fifth selection lines, respectively, and the phases of the fourth and sixth clocks CLK4 and CLK6 that have been used to load the fourth and sixth compression data COMP_DATA4 and COMP_DATA6 onto the fourth and sixth selection lines, respectively, and may select, as the first and second clocks CLK1 and CLK2, ones having lagging phases to the others between the third clock CLK3 and the fourth clock CLK4 and between the fifth clock CLK5 and the sixth clock CLK6. In this case, the second and third clock comparison units 721 and 731 may control operations of the third and fifth delay control units 722 and 732 and operations of the fourth and sixth delay control units 723 and 733, respectively, by generating the second and third selection result signals CSEL2 and CSEL3, respectively. According to an embodiment, the second and third clock comparison units 721 and 731 may generate the second and third selection result signals CSEL2 and CSEL3 the values of which are adjusted, respectively, depending on which one of the third and fifth clocks CLK3 and CLK5 has been selected as the first clock CLK1 and which one of the fourth and sixth clocks CLK4 and CLK6 has been selected as the second clock CLK2, respectively, and may output the first and second clocks CLK1 and CLK2 to the third and fifth delay control units 722 and 732 and the fourth and sixth delay control units 723 and 733, respectively. According to another embodiment, the second and third clock comparison units 721 and 731 may generate the second and third selection result signals CSEL2 and CSEL3 the values of which are adjusted based on which one of the third and fifth clocks CLK3 and CLK5 has been selected as the first clock CLK1 and which one of the fourth and sixth clocks CLK4 and CLK6 has been selected as the second clock CLK2, respectively, and a difference between the phases of the third and fifth clocks CLK3 and CLK5 and a difference between the phases of the fourth and sixth clocks CLK4 and CLK6, respectively, and may output the second and third selection result signals CSEL2 and CSEL3 to the third and fifth delay control units 722 and 732 and the fourth and sixth delay control units 723 and 733, respectively.

Furthermore, the second and third clock comparison units 721 and 731 may each be deactivated in the normal mode in which the compression enable signal COMP_EN is deactivated, may generate the second and third selection result signals CSEL2 and CSEL3 each having an initial value, respectively, in the deactivated state, and may output the second and third selection result signals CSEL2 and CSEL3 to the third and fifth delay control units 722 and 732 and the fourth and sixth delay control units 723 and 733, respectively.

Furthermore, the third and fifth delay control units 722 and 732 may output the fourth and sixth compression data COMP_DATA4 and COMP_DATA6, respectively, by delaying the fourth and sixth compression data COMP_DATA4 and COMP_DATA6 by the third and fifth amounts, respectively, in response to the second and third selection result signals CSEL2 and CSEL3, respectively. Specifically, the third and fifth delay control units 722 and 732 may delay the fourth and sixth compression data COMP_DATA4 and COMP_DATA6 that have been transmitted through the fourth and sixth selection lines, respectively, by the third and fifth amounts, respectively, in response to the second and third selection result signals CSEL2 and CSEL3 having values corresponding to the third and fifth clocks CLK3 and CLK5 being selected as the first and second clocks CLK1 and CLK2, respectively, and may then output the delayed fourth and sixth compression data DLY_COMP_DATA4 and DLY_COMP_DATA6 to the fifth and sixth sub-path selection units 724 and 734, respectively. Furthermore, the third and fifth delay control units 722 and 732 may output the fourth and sixth compression data COMP_DATA4 and COMP_DATA6 that have been transmitted through the fourth and sixth selection lines, respectively, to the fifth and sixth sub-path selection units 724 and 734, respectively, in response to the second and third selection result signals CSEL2 and CSEL3 having values corresponding to the fourth and sixth clocks CLK4 and CLK6 being selected as the first and second clocks CLK1 and CLK2, respectively. According to an embodiment, the third and fifth delay control units 722 and 732 may delay the fourth and sixth compression data COMP_DATA4 and COMP_DATA6 by the third and fifth amounts. According to another embodiment, the third and fifth delay control units 722 and 732 may adjust the third and fifth amounts in response to the second and third selection result signals CSEL2 and CSEL3, respectively, and may delay the fourth and sixth compression data COMP_DATA4 and COMP_DATA6, respectively, by the adjusted third and fifth amounts, respectively. Furthermore, the third and fifth delay control units 722 and 732 may output data that have been transmitted through the first and third sub-lines, respectively, to the fifth and sixth sub-path selection units 724 and 734, respectively, in response to the second and third selection result signals CSEL2 and CSEL3 each having an initial value, respectively.

Furthermore, the fourth and sixth delay control units 723 and 733 may output the third and fifth compression data COMP_DATA3 and COMP_DATA5, respectively, by delaying the third and fifth compression data COMP_DATA3 and COMP_DATA5 by the fourth and sixth amounts, respectively, in response to the second and third selection result signals CSEL2 and CSEL3, respectively. That is, the fourth and sixth delay control units 723 and 733 may delay the third and fifth compression data COMP_DATA3 and COMP_DATA5 that have been transmitted through the third and fifth selection lines, respectively, by the third and fifth amounts, respectively, in response to the second and third selection result signals CSEL2 and CSEL3 having values corresponding to the fourth and sixth clocks CLK4 and CLK6 being selected as the first and second clocks CLK1 and CLK2, respectively, and may output the delayed third and fifth compression data DLY_COMP_DATA3 and DLY_COMP_DATA5 to the fifth and sixth sub-path selection units 724 and 734, respectively.

Furthermore, the fourth and sixth delay control units 723 and 733 may output the third and fifth compression data COMP_DATA3 and COMP_DATA5 that have been transmitted through the third and fifth selection lines, respectively, to the fifth and sixth sub-path selection units 724 and 734, respectively, in response to the second and third selection result signals CSEL2 and CSEL3 having values corresponding to the third and fifth clocks CLK3 and CLK5 being selected as the first and second clocks CLK1 and CLK2, respectively. According to an embodiment, the fourth and sixth delay control units 723 and 733 may delay the third and fifth compression data COMP_DATA3 and COMP_DATA5, respectively, by the fourth and sixth amounts, respectively. According to another embodiment, the fourth and sixth delay control units 723 and 733 may adjust the fourth and sixth amounts in response to the second and third selection result signals CSEL2 and CSEL3, respectively, and may delay the third and fifth compression data COMP_DATA3 and COMP_DATA5, respectively, by the adjusted fourth and sixth amounts. Furthermore, the fourth and sixth delay control units 723 and 733 may output data that have been transmitted through the second and fourth sub-lines, respectively, to the fifth and sixth sub-path selection units 724 and 734, respectively, in response to the second and third selection result signals CSEL2 and CSEL3 each having an initial value.

Furthermore, in a read operation included in the normal mode in which the compression enable signal COMP_EN is deactivated, the fifth and sixth sub-path selection units 724 and 734 may connect the first and third sub-lines and the first and second lines, respectively, and might not connect the second and fourth sub-lines and the first and second lines, respectively, in response to the second and third path selection signals PATH_SEL2 and PATH_SEL3, each one having the first value, respectively. For example, in a read operation included in the normal mode in which the compression enable signal COMP_EN is deactivated, the fifth and sixth sub-path selection units 724 and 734 may connect the first and third sub-lines, each one having four sub-lines, and the first and second lines, each one having four lines, respectively, and simultaneously might not connect the second and fourth sub-lines, each one having four sub-lines, and the first and second lines, each one having four lines, respectively, in response to the second and third path selection signals PATH_SEL2 and PATH_SEL3, each one having the first value, respectively.

Furthermore, in a read operation included in the normal mode in which the compression enable signal COMP_EN is deactivated, the fifth and sixth sub-path selection units 724 and 734 may connect the second and fourth sub-lines and the first and second lines, respectively, and might not connect the first and third sub-lines and the first and second lines, respectively, in response to the second and third path selection signals PATH_SEL2 and PATH_SEL3, each one having the second value, respectively. For example, in a read operation included in the normal mode in which the compression enable signal COMP_EN is deactivated, the fifth and sixth sub-path selection units 724 and 734 may connect the second and fourth sub-lines, each one having four sub-lines, and the first and second lines, each one having four lines, respectively, and simultaneously might not connect the first and third sub-lines, each one having four sub-lines, and the first and second lines, each one having four lines, respectively, in response to the second and third path selection signals PATH_SEL2 and PATH_SEL3, each one having the second value, respectively.

Furthermore, in the compression read mode in which the compression enable signal COMP_EN is activated, the fifth and sixth sub-path selection units 724 and 734 may connect the partial lines, among the third and fifth selection lines, and the partial lines, among the first and second selection lines, respectively, and may connect the remaining lines, among the fourth and sixth selection lines, and the remaining lines, among the first and second selection lines, respectively, regardless of values of the second and third path selection signals PATH_SEL2 and PATH_SEL3, respectively. For example, in the compression read mode in which the compression enable signal COMP_EN is activated, the fifth and sixth sub-path selection units 724 and 734 may connect the third selection lines and the fifth selection lines, and the partial lines, among the first selection lines and the partial lines, among the second selection lines, respectively, and may connect the fourth selection lines and the sixth selection lines and the remaining lines, among the first selection lines and the remaining lines, among the second selection lines, regardless of values of the second and third path selection signals PATH_SEL2 and PATH_SEL3, respectively.

For reference, the compression enable signal COMP_EN and the second and third path selection signals PATH_SEL2 and PATH_SEL3 may be signals that are generated by the controller 130.

It will be evident to a person having ordinary knowledge in the art to which the present disclosure pertains that the present disclosure described above is not limited by the aforementioned embodiments and the accompanying drawings and that the present disclosure may be substituted, modified, and changed in various ways without departing from the technical spirit of the present disclosure and the following claims. Furthermore, the embodiments may be combined to from additional embodiments.

What is claimed is:

1. A memory device comprising:
   a first memory region connected to first lines and configured to read data from the first memory region in response to a first clock;
   a second memory region connected to second lines and configured to read data from the second memory region in response to a second clock;
   a first transmission unit configured to:
   compress the data read from the first memory region into first compression data, and
   transmit, in response to the first clock, the first compression data through first selection lines among the first lines;
   a second transmission unit configured to:
   compress the data read from the second memory region into second compression data, and
   transmit, in response to the second clock, the second compression data through second selection lines among the second lines; and
   a first parallel transmission unit electrically connected to third lines, configured to:
   simultaneously connect the first and second selection lines to the third lines,
   select, as a selection clock, one having a lagging phase to the other between the first and second clocks, and
   transmit the first and second compression data in parallel through the third lines in response to the selection clock.

2. The memory device of claim 1, wherein the first to third lines respectively have the same number of lines.

3. The memory device of claim 2, wherein:
the first transmission unit is configured to:
generate the first compression data by compressing the data read from the first memory region at a compression ratio of 1 to N, and
transmit the first compression data through the first selection lines by selecting, as the first selection lines, a 1/N number of the first lines, and
wherein the second transmission unit is configured to:
generate the second compression data by compressing the data read from the second memory region at the compression ratio of 1 to N, and
transmit the second compression data through the second selection lines by selecting, as the second selection lines, a 1/N number of the second lines, where N is a natural number equal to or greater than 2.

4. The memory device of claim 1, wherein the first parallel transmission unit comprises:
a first clock comparison unit configured to select the selection clock;
a first delay control unit configured to delay, by a first amount and when the first clock is selected as the selection clock, a timing at which the second compression data from the second selection lines are loaded onto the third lines; and
a second delay control unit configured to delay, by a second amount and when the second clock is selected as the selection clock, a timing at which the first compression data from the first selection lines are loaded onto the third lines.

5. The memory device of claim 3,
further comprising:
a first internal memory region connected to first sub-lines and configured to read data therefrom in response to a third clock; and
a second internal memory region connected to second sub-lines and configured to read data therefrom in response to a fourth clock,
wherein the first transmission unit comprises:
a first sub-transmission unit configured to:
compress the data read from the first internal memory region into third compression data, and
transmit the third compression data through third selection lines among the first sub-lines in response to the third clock;
a second sub-transmission unit configured to:
compress data read from the second internal memory region into fourth compression data, and
transmit the fourth compression data through fourth selection lines among the second sub-lines in response to the fourth clock; and
a second parallel transmission unit configured to:
simultaneously connect the third and fourth selection lines to the first selection lines,
select, as the first clock, one having a lagging phase to the other between the third clock and the fourth clock, and
transmit, through the first selection lines and in response to the first clock, the first compression data in which the third and fourth compression data have been combined in parallel.

6. The memory device of claim 5,
further comprising:
a third internal memory region connected to third sub-lines and configured to read data therefrom in response to a fifth clock; and
a fourth internal memory region connected to fourth sub-lines and configured to read data therefrom in response to a sixth clock,
wherein the second transmission unit comprises:
a third sub-transmission unit configured to:
compress the data read from the third internal memory region into fifth compression data, and
transmit the fifth compression data through fifth selection lines among the third sub-lines in response to the fifth clock;
a fourth sub-transmission unit configured to:
compress the data read from the fourth internal memory region into sixth compression data, and
transmit the sixth compression data through sixth selection lines among the fourth sub-lines in response to the sixth clock; and
a third parallel transmission unit configured to:
simultaneously connect the fifth and sixth selection lines to the second selection lines,
select, as the second clock, one having a lagging phase to the other between the fifth clock and the sixth clock, and
transmit, through the second selection lines and in response to the second clock, the second compression data in which the fifth and sixth compression data have been combined in parallel.

7. The memory device of claim 6, wherein the first to fourth sub-lines respectively have the same number of lines as any of the first to third lines.

8. The memory device of claim 7, wherein:
the first sub-transmission unit is configured to:
generate the third compression data by compressing the data read from the first internal memory region at a compression ratio of 1 to M, and
transmit the third compression data through the third selection lines by selecting, as the third selection lines, a 1/M number of the first sub-lines,
the second sub-transmission unit is configured to:
generate the fourth compression data by compressing the data read from the second internal memory region at the compression ratio of 1 to M, and
transmit the fourth compression data through the fourth selection lines by selecting, as the fourth selection lines, a 1/M number of the second sub-lines,
the third sub-transmission unit is configured to:
generate the fifth compression data by compressing the data read from the third internal memory region at the compression ratio of 1 to M, and
transmit the fifth compression data through the fifth selection lines by selecting, as the fifth selection lines, a 1/M number of the third sub-lines,
the fourth sub-transmission unit is configured to:
generate the sixth compression data by compressing the data read from the fourth internal memory region at the compression ratio of 1 to M, and
transmit the sixth compression data through the sixth selection lines by selecting, as the sixth selection lines, a 1/M number of the fourth sub-lines, where
M is a natural number greater than N.

9. The memory device of claim 6, wherein the second parallel transmission unit comprises:
a second clock comparison unit configured to select the first clock;
a third delay control unit configured to delay, by a third amount and when the third clock is selected as the first clock, a timing at which the fourth compression data from the fourth selection lines are loaded onto the first selection lines; and a fourth delay control unit configured to delay, by a fourth amount and when the fourth clock is selected as the first clock, a timing at which the third compression data from the third selection lines are loaded onto the first selection lines.

10. The memory device of claim 9, wherein the third parallel transmission unit comprises:

a third clock comparison unit configured to select the second clock;

a fifth delay control unit configured to delay, by a fifth amount and when the fifth clock is selected as the second clock, a timing at which the sixth compression data from the sixth selection lines are loaded onto the second selection lines; and a sixth delay control unit configured to delay, by a sixth amount and when the sixth clock is selected as the second clock, a timing at which the fifth compression data from the fifth selection lines are loaded onto the second selection lines.

11. A memory system comprising:

a first memory device configured to:

compress, into first compression data, data read from a first memory region included therein, and output the first compression data through first selection lines among first output lines in response to a first clock;

a second memory device configured to:

compress, into second compression data, data read from a second memory region included therein, and output the second compression data through second selection lines among second output lines in response to a second clock; and a first parallel transmission unit electrically connected to third output lines, configured to:

simultaneously connect the first and second selection lines to the third output lines, select, as a selection clock, one having a lagging phase to the other between the first clock and the second clock, and transmit the first and second compression data in parallel through the third output lines in response to the selection clock.

12. The memory system of claim 11, wherein the first to third output lines respectively have the same number of lines.

13. The memory system of claim 12, wherein:

the first memory device is configured to:

generate the first compression data by compressing the data read from the first memory region at a compression ratio of 1 to N, and output the first compression data through the first selection lines by selecting, as the first selection lines, a 1/N number of the first output lines, the second memory device is configured to:

generate the second compression data by compressing the data read from the second memory region at the compression ratio of 1 to N, and output the second compression data through the second selection lines by selecting, as the second selection lines, a 1/N number of the second output lines, where N is a natural number equal to or greater than 2.

14. The memory system of claim 11, wherein the first parallel transmission unit comprises:

a first clock comparison unit configured to select the selection clock;

a first delay control unit configured to delay, by a first amount and when the first clock is selected as the selection clock, a timing at which the second compression data from the second selection lines are loaded onto the third output lines; and a second delay control unit configured to delay, by a second amount and when the second clock is selected as the selection clock, a timing at which the first compression data from the first selection lines are loaded onto the third output lines.

15. The memory system of claim 13, wherein the first memory device comprises:

a first internal memory region connected to first sub-lines and configured to read data therefrom in response to a third clock; and a second internal memory region connected to second sub-lines and configured to read data therefrom in response to a fourth clock;

a first sub-transmission unit configured to:

compress the data read from the first internal memory region into third compression data, and transmit the third compression data through third selection lines among the first sub-lines in response to the third clock;

a second sub-transmission unit configured to:

compress data read from the second internal memory region into fourth compression data, and transmit the fourth compression data through fourth selection lines among the second sub-lines in response to the fourth clock; and a second parallel transmission unit configured to:

simultaneously connect the third and fourth selection lines to the first selection lines, select, as the first clock, one having a lagging phase to the other between the third clock and the fourth clock, and transmit, through the first selection lines and in response to the first clock, the first compression data in which the third and fourth compression data have been combined in parallel.

16. The memory system of claim 15, wherein the second memory device comprises:

a third internal memory region connected to third sub-lines and configured to read data therefrom in response to a fifth clock;

a fourth internal memory region connected to fourth sub-lines, and configured to read data therefrom in response to a sixth clock;

a third sub-transmission unit configured to:

compress the data read from the third internal memory region into fifth compression data, and transmit the fifth compression data through fifth selection lines among the third sub-lines in response to the fifth clock;

a fourth sub-transmission unit configured to:

compress the data read from the fourth internal memory region into sixth compression data, and transmit the sixth compression data through sixth selection lines among the fourth sub-lines in response to the sixth clock; and a third parallel transmission unit configured to:

simultaneously connect the fifth and sixth selection lines to the second selection lines, select, as the second clock, one having a lagging phase to the other between the fifth clock and the sixth clock, and transmit, through the second selection lines and in response to the second clock, the second compression data in which the fifth and sixth compression data have been combined in parallel.

17. The memory system of claim 16, wherein the first to fourth sub-lines respectively have the same number of lines as any of the first to third output lines.

18. The memory system of claim 17, wherein:
the first sub-transmission unit is configured to:
generate the third compression data by compressing the data read from the first internal memory region at a compression ratio of 1 to M, and
transmit the third compression data through the third selection lines by selecting, as the third selection lines, a 1/M number of the first sub-lines,
the second sub-transmission unit is configured to:
generate the fourth compression data by compressing the data read from the second internal memory region at the compression ratio of 1 to M, and
transmit the fourth compression data through the fourth selection lines by selecting, as the fourth selection lines, a 1/M number of the second sub-lines,
the third sub-transmission unit is configured to:
generate the fifth compression data by compressing the data read from the third internal memory region at the compression ratio of 1 to M, and
transmit the fifth compression data through the fifth selection lines by selecting, as the fifth selection lines, a 1/M number of the third sub-lines, and
the fourth sub-transmission unit is configured to:
generate the sixth compression data by compressing the data read from the fourth internal memory region at the compression ratio of 1 to M, and
transmit the sixth compression data through the sixth selection lines by selecting, as the sixth selection lines, a 1/M number of the fourth sub-lines, where M is a natural number greater than N.

19. The memory system of claim 16, wherein the second parallel transmission unit comprises:
a second clock comparison unit configured to select the first clock;
a third delay control unit configured to delay, by a third amount and when the third clock is selected as the first clock, a timing at which the fourth compression data from the fourth selection lines are loaded onto the first selection lines; and
a fourth delay control unit configured to delay, by a fourth amount and when the fourth clock is selected as the first clock, a timing at which the third compression data from the third selection lines are loaded onto the first selection lines.

20. The memory system of claim 19, wherein the third parallel transmission unit comprises:
a third clock comparison unit configured to select the second clock;
a fifth delay control unit configured to delay, by a fifth amount and when the fifth clock is selected as the second clock, a timing at which the sixth compression data from the sixth selection lines are loaded onto the second selection lines; and
a sixth delay control unit configured to delay, by a sixth amount and when the sixth clock is selected as the second clock, a timing at which the fifth compression data from the fifth selection lines are loaded onto the second selection lines.

* * * * *